(12) United States Patent
Harris et al.

(10) Patent No.: US 8,318,864 B2
(45) Date of Patent: *Nov. 27, 2012

(54) FUNCTIONALIZED ETHYLENE/α-OLEFIN INTERPOLYMER COMPOSITIONS

(75) Inventors: William J. Harris, Lake Jackson, TX (US); John D. Weaver, Lake Jackson, TX (US); Brian W. Walther, Clute, TX (US); Stephen F. Hahn, Lake Jackson, TX (US); Yunwa W. Cheung, Lake Jackson, TX (US); Pankaj Gupta, Lake Jackson, TX (US); Thoi H. Ho, Lake Jackson, TX (US); Kenneth N. Reichek, Lake Jackson, TX (US); Selim Yalvac, Pearland, TX (US); Teresa P. Karjala, Lake Jackson, TX (US); Benjamin R. Rozenblat, Belle Mead, NJ (US); Cynthia L. Rickey, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/031,339

(22) Filed: Feb. 21, 2011

(65) Prior Publication Data
US 2011/0144240 A1 Jun. 16, 2011

Related U.S. Application Data

(60) Division of application No. 11/376,863, filed on Mar. 15, 2006, now Pat. No. 7,897,689, which is a continuation-in-part of application No. PCT/US2005/008917, filed on Mar. 17, 2005.

(60) Provisional application No. 60/553,906, filed on Mar. 17, 2004.

(51) Int. Cl.
*C08F 10/02* (2006.01)
*C08F 230/08* (2006.01)
*C08L 53/00* (2006.01)

(52) U.S. Cl. .......... 525/288; 524/12; 524/543; 524/547; 524/588; 525/63; 525/69; 525/70; 525/72; 525/88; 525/242; 525/319

(58) Field of Classification Search .......... 524/12, 524/288, 528, 505, 35, 324, 503, 28, 543, 524/547, 588; 525/63, 70, 88, 242, 285, 525/288, 319, 324, 69, 72

See application file for complete search history.

(56) References Cited

U.S. PATENT DOCUMENTS

| | | | |
|---|---|---|---|
| 2,973,344 A | 2/1961 | Fasce | |
| 2,997,432 A | 8/1961 | Koble et al. | |
| 3,873,642 A | 3/1975 | Jezl | |
| 3,947,368 A | 3/1976 | Sweeney | |
| 4,146,492 A | 3/1979 | Cusano et al. | |
| 4,299,931 A | 11/1981 | Coran et al. | |
| 4,429,079 A | 1/1984 | Shibata et al. | |
| 4,510,031 A | 4/1985 | Matsumura et al. | |
| 4,621,115 A | 11/1986 | Morita et al. | |
| 4,668,752 A | 5/1987 | Tominari et al. | |
| 4,780,228 A | 10/1988 | Gardiner et al. | |
| 4,798,081 A | 1/1989 | Hazlitt et al. | |
| 5,068,047 A | 11/1991 | Chung et al. | |
| 5,266,626 A | 11/1993 | Hert et al. | |
| 5,322,728 A | 6/1994 | Davey et al. | |
| 5,391,629 A | 2/1995 | Turner et al. | |
| 5,468,810 A | 11/1995 | Hayakawa et al. | |
| 5,476,905 A | 12/1995 | Schwager et al. | |
| 5,594,080 A | 1/1997 | Waymouth et al. | |
| 5,597,881 A | 1/1997 | Winter et al. | |
| 5,610,253 A | 3/1997 | Hatke et al. | |
| 5,624,991 A | 4/1997 | Harada et al. | |
| 5,733,980 A | 3/1998 | Cozewith et al. | |
| 5,783,531 A | 7/1998 | Andrew et al. | |
| 5,798,420 A | 8/1998 | Cozewith et al. | |
| 5,824,759 A | 10/1998 | Watanabe et al. | |
| 5,868,984 A | 2/1999 | Winter et al. | |
| 5,892,076 A | 4/1999 | Nickias | |
| 5,916,953 A | 6/1999 | Jacoby et al. | |
| 5,969,070 A | 10/1999 | Waymouth et al. | |
| 5,994,255 A | 11/1999 | Nickias et al. | |
| 6,008,262 A | 12/1999 | McKay et al. | |
| 6,025,448 A | 2/2000 | Swindoll et al. | |
| 6,096,668 A | 8/2000 | Abuto et al. | |

(Continued)

FOREIGN PATENT DOCUMENTS

EP 0274906 A2 7/1988

(Continued)

OTHER PUBLICATIONS

Rosato, D.V. Injection Molding Handbook 3rd Edition Kluwer Academic Publishers Norwell, MA (2000) pp. 527-532.*
Petrie, E. M. Handbook of Adhesives and Sealants Mc-Graw Hill, New York et al (2000) pp. 319-336.*
International Search Report and Written Opinion of the International Searching Authority, mailed Jul. 4, 2007 (PCT/US2006/009591).
Moad G.: "Synthesis of polyolefin graft copolymers by reactive extrusion"; Prog Polym Sci (Oxford); Progress in Polymer Science (Oxford) 1999 Elsevier Science Ltd, Exeter, Engl., vol. 24, No. 1, 1999.

*Primary Examiner* — Irina S Zemel
*Assistant Examiner* — Jeffrey Lenihan
(74) *Attorney, Agent, or Firm* — Whyte Hirschboeck Dudek SC

(57) ABSTRACT

The invention relates to functionalized interpolymers derived from base olefin interpolymers, which are prepared by polymerizing one or more monomers or mixtures of monomers, such as ethylene and one or more comonomers, to form an interpolymer products having unique physical properties. The functionalized olefin interpolymers contain two or more differing regions or segments (blocks), resulting in unique processing and physical properties.

18 Claims, 18 Drawing Sheets

U.S. PATENT DOCUMENTS

| | | | |
|---|---|---|---|
| 6,114,457 | A | 9/2000 | Markel et al. |
| 6,121,402 | A | 9/2000 | Machida et al. |
| 6,136,937 | A | 10/2000 | Lai et al. |
| 6,143,828 | A | 11/2000 | Chee et al. |
| 6,147,180 | A | 11/2000 | Markel et al. |
| 6,160,029 | A | 12/2000 | Chaudhary et al. |
| 6,187,424 | B1 | 2/2001 | Kjellqvist et al. |
| 6,197,404 | B1 | 3/2001 | Varona |
| 6,262,203 | B1 | 7/2001 | Chien et al. |
| 6,362,252 | B1 | 3/2002 | Prutkin |
| 6,429,175 | B1 | 8/2002 | Stuart, Jr. et al. |
| 6,455,638 | B2 | 9/2002 | Laughner et al. |
| 6,537,472 | B2 | 3/2003 | Masubuchi |
| 6,566,446 | B1 | 5/2003 | Parikh et al. |
| 6,566,544 | B1 | 5/2003 | Waymouth et al. |
| 6,759,474 | B1 | 7/2004 | Keener et al. |
| 6,815,023 | B1 | 11/2004 | Tatarka et al. |
| 7,005,395 | B2 | 2/2006 | Zafiroglu et al. |
| 7,608,668 | B2 | 10/2009 | Li Pi Shan et al. |
| 2003/0027954 | A1 | 2/2003 | Becke et al. |
| 2003/0195128 | A1 | 10/2003 | Deckman et al. |
| 2003/0216518 | A1 | 11/2003 | Tau et al. |
| 2004/0082750 | A1 | 4/2004 | Tau et al. |
| 2004/0092662 | A1 | 5/2004 | Goto et al. |
| 2004/0121922 | A1 | 6/2004 | Okada et al. |
| 2004/0158011 | A1 | 8/2004 | Jain et al. |
| 2004/0192147 | A1 | 9/2004 | Smith et al. |
| 2005/0009993 | A1 | 1/2005 | Morioka et al. |
| 2005/0075441 | A1 | 4/2005 | Onoe et al. |
| 2006/0030667 | A1 | 2/2006 | Yalvac et al. |
| 2008/0299857 | A1 | 12/2008 | Harding et al. |

FOREIGN PATENT DOCUMENTS

| | | |
|---|---|---|
| EP | 0317359 | 5/1989 |
| EP | 0679684 A1 | 11/1995 |
| EP | 0877050 | 11/1998 |
| EP | 1026184 | 8/2000 |
| EP | 0958313 B1 | 9/2002 |
| EP | 1262498 A2 | 12/2002 |
| EP | 1308470 A2 | 5/2003 |
| EP | 1403315 A1 | 3/2004 |
| GB | 1234034 A * | 6/1971 |
| GB | 1436930 | 5/1976 |
| JP | 2002-206007 | 7/2002 |
| JP | 2004-204058 | 7/2004 |
| WO | 65/27746 A1 | 10/1995 |
| WO | 95/27745 A1 | 10/1995 |
| WO | 97/12919 A1 | 4/1997 |
| WO | WO-9733921 A * | 9/1997 |
| WO | 98/34970 A1 | 8/1998 |
| WO | 99/35171 A1 | 7/1999 |
| WO | 00/37514 A1 | 6/2000 |
| WO | 02/066540 A2 | 8/2002 |
| WO | 02/079322 | 10/2002 |
| WO | 03/014046 A1 | 2/2003 |
| WO | 2005/073283 A1 | 8/2005 |
| WO | 2005/090425 A1 | 9/2005 |
| WO | 2005/090426 A1 | 9/2005 |
| WO | 2005/090427 A2 | 9/2005 |
| WO | 2005/090655 A1 | 9/2005 |

* cited by examiner

FUNCTIONALIZED ETHYLENE/α-OLEFIN INTERPOLYMER COMPOSITIONS

CROSS-REFERENCE TO RELATED APPLICATIONS

This application is a divisional application of U.S. application Ser. No. 11/376,863 filed on Mar. 15, 2006 now U.S. Pat. No. 7,897,689 which claims priority to PCT Application No. PCT/US2005/008917, filed on Mar. 17, 2005, which in turn claims priority to U.S. Provisional Application No. 60/553,906, filed Mar. 17, 2004. The application further claims priority to U.S. Provisional Application Ser. No. 60/718,184 filed Sep. 16, 2005 and 60/718,000 filed Sep. 16, 2005. For purposes of United States patent practice, the content of each foregoing application is incorporated by reference herein in its entirety.

FIELD OF THE INVENTION

This invention relates to functionalized ethylene/α-olefin interpolymer compositions.

BACKGROUND AND SUMMARY OF THE INVENTION

Base interpolymers have been prepared by polymerizing one or more monomers or mixtures of monomers such as ethylene and one or more comonomers, to form interpolymer products having unique physical properties such as two or more differing regions or segments (blocks), which provide unique physical properties. Such olefin interpolymers are described in PCT Application No. 2005/08917, filed Mar. 17, 2005, which is incorporated herein, in its entirety, by reference.

Despite the discovery of the multi-block interpolymers as discussed above, there remains a need to develop olefin interpolymers, which are well suited as compatibilizing agents for compatibilizing incompatible polymer blends; and thus, which can be used to develop new polymer alloys. There is also a need to develop olefin interpolymers for use in the development of products with targeted differentiated properties. For example, there is a need to develop olefin interpolymers for compounding or polymer modification formulations, each used to improve the processibilty and performance of the resulting polymer composition, and/or to improve the properties of the final polymer product and/or to improve the cost-efficiency of producing the final product. There is a need for improved polymers for the modification of engineering thermoplastics and polyolefins, resulting in new resins with improvements in one or more of the following properties: viscosity, heat resistance, impact resistance, toughness, flexibility, tensile strength, compression set, stress relaxation, creep resistance, tear strength, blocking resistance, solidification temperature, abrasion resistance, retractive force, oil retention, pigment retention and filler capacity. It would be useful if such olefin interpolymers could be blended into thermoset systems, such as epoxies, unsaturated polyesters, and the like, prior to curing, or during curing, to improve the performance of the cured thermoset in properties, such as, for example, impact resistance, toughness and flexibility.

In addition, there is a need to develop olefin interpolymers for use in coatings, adhesive and tie layer applications, where such polyolefins provide strong adhesion to polar and/or non-polar substrates, improve paintability an/or printability, provide good flexibility, and provide structural and chemical stability over a broad service temperature range. Substrates may include, but are not limited to, other polyolefins, polyamides, polyesters, polycarbonate, other engineering thermoplastics, polyvinylidene chloride, polyvinyl chloride, polyvinyl alcohol, cellulose, glass, and metals. At least some of the aforementioned needs and other are met by the following invention.

The invention provides functionalized derivatives of the segmented or multi-block interpolymers, as described herein, and provides for compositions comprising the same. The functionalized interpolymers of this invention often exhibit lower viscosities for better melt flows and lower operating temperatures in various processing applications. The invention also relates to methods of using these functionalized interpolymers in applications requiring unique combinations of processing elements and unique physical properties in the final product. In still another aspect, the invention relates to the articles prepared from these functionalized interpolymers. These functionalized multi-block interpolymers and polymeric blends, containing the same, may be employed in the preparation of solid articles, such as moldings, films, sheets, and foamed objects. These articles may be prepared by molding, extruding, or other processes. The functionalized interpolymers are useful in adhesives, tie layers, laminates, polymeric blends, and other end uses. The resulting products may be used in the manufacture of components for automobiles, such as profiles, bumpers and trim parts, or may be used in the manufacture of packaging materials, electric cable insulation, coatings and other applications.

In one aspect, the invention provides a composition, comprising at least one functionalized olefin interpolymer, and wherein the functionalized olefin interpolymer is formed from an olefin interpolymer having at least one melting point, $T_m$, in degrees Celsius, and a density, $d^*$, in grams/cubic centimeter, and wherein the numerical values of the variables correspond to the relationship:

$$T_m > -2002.9 + 4538.5(d^*) - 2422.2(d^*)^2, \text{and}$$

wherein the interpolymer has a $M_w/M_n$ from 1.7 to 3.5.

In another aspect, the invention provides a composition, comprising at least one functionalized olefin interpolymer, and wherein the functionalized olefin interpolymer is formed from an olefin interpolymer having the following:

a) a Mw/Mn from 1.7 to 3.5, b) a delta quantity (tallest DSC peak minus tallest CRYSTAF peak) greater than the quantity, y*, defined by the equation: $y^* > -0.1299(\Delta H) + 62.81$, and c) a heat of fusion up to 130 J/g, and wherein the CRYSTAF peak is determined using at least 5 percent of the cumulative polymer, and if less than 5 percent of the polymer has an identifiable CRYSTAF peak, then the CRYSTAF temperature is 30° C., and wherein ΔH is the numerical value of the heat of fusion in J/g.

In another aspect, the invention provides a composition comprising at least one functionalized olefin interpolymer, and wherein the functionalized olefin interpolymer is formed from an olefin interpolymer that has a delta quantity (tallest DSC peak (measured from the baseline) minus tallest CRYSTAF peak) greater than 48° C., and a heat of fusion greater than, or equal to, 130 J/g, and wherein the CRYSTAF peak is determined using at least 5 percent of the cumulative polymer, and if less than 5 percent of the polymer has an identifiable CRYSTAF peak, then the CRYSTAF temperature is 30° C.

In another aspect, the invention provides a composition comprising at least one functionalized olefin interpolymer, and wherein the functionalized olefin interpolymer is formed from an olefin interpolymer that has a mole percent of at least one commoner in a TREF fraction between 40° C. and 130° C., as determined according to the following formula:

$y \geq \{-0.2013(\text{TREF Elution Temp.})+21.07\}$, wherein "$y$" is the mole percent comonomer(s) in the TREF fraction between 40° C. and 130° C.

In another aspect, the invention provides a composition, comprising at least one functionalized multi-block interpolymer, and wherein the functionalized multi-block interpolymer is prepared from a multi-block interpolymer that comprises, in polymerized form, ethylene and one or more copolymerizable comonomers, and wherein said multi-block interpolymer comprises two or more segments, or blocks, differing in comonomer content, crystallinity, density, melting point or glass transition temperature, and wherein the multi-block interpolymer is functionalized with at least one compound, selected from the group consisting of unsaturated compounds containing at least one heteroatom.

In yet another aspect, the invention provides a process for preparing a functionalized multi-block interpolymer of the invention, said process comprising, reacting the multi-block interpolymer with the at least one compound, and at least one initiator, and wherein the at least one initiator generates 0.01 millimoles to 10 millimoles radicals per 100 grams of the multi-block interpolymer, and wherein the at least one compound is present in an amount from 0.05 to 10 parts per hundred gram of the multi-block interpolymer.

In another aspect, the invention provides a composition, comprising at least one functionalized olefin interpolymer, and wherein the functionalized olefin interpolymer is formed from an olefin interpolymer comprising ethylene and one or more copolymerizable comonomers in polymerized form, and wherein said olefin interpolymer comprises multiple blocks or segments of two or more polymerized monomer units, said blocks or segments differing in chemical or physical properties (blocked interpolymer), and wherein the olefin interpolymer has a molecular fraction which elutes between 40° C. and 130° C., when fractionated using TREF increments, and wherein said fraction has a molar comonomer content higher than that of a comparable random ethylene interpolymer fraction eluting between the same temperatures, and wherein said comparable random ethylene interpolymer comprises the same comonomer(s), and has a melt index, density, and molar comonomer content (based on the whole polymer) within 10 percent of that of the blocked interpolymer, and wherein the olefin interpolymer is functionalized with at least one unsaturated compound containing at least one heteroatom.

In another aspect, the invention provides a composition, comprising at least one functionalized olefin interpolymer, and wherein the functionalized olefin interpolymer is formed from an olefin interpolymer comprising ethylene and one or more copolymerizable comonomers in polymerized form, and wherein the olefin interpolymer comprises multiple blocks or segments of two or more polymerized monomer units, said blocks or segments differing in chemical or physical properties (blocked interpolymer), and wherein the olefin interpolymer has a peak (but not just a molecular fraction) which elutes between 40° C. and 130° C. (but without collecting and/or isolating individual fractions), and wherein said peak, has an average comonomer content, determine by infra-red spectroscopy when expanded using a full width/half maximum (FWHM) area calculation, higher than that of a comparable random ethylene interpolymer peak at the same elution temperature and expanded using a full width/half maximum (FWHM) area calculation, and wherein said comparable random ethylene interpolymer comprises the same comonomer(s), and has a melt index, density, and molar comonomer content (based on the whole polymer) within 10 percent of that of the blocked interpolymer, and wherein the olefin interpolymer is functionalized with at least one unsaturated compound containing at least one heteroatom.

In another aspect, the invention provides a composition, comprising at least one functionalized olefin interpolymer, and wherein the functionalized olefin interpolymer is formed from an olefin interpolymer comprising ethylene and one or more copolymerizable comonomers in polymerized form, and wherein the olefin interpolymer comprises multiple blocks or segments of two or more polymerized monomer units, said blocks or segments differing in chemical or physical properties (blocked interpolymer), and wherein the olefin interpolymer has a molecular fraction which elutes between 40° C. and 130° C., when fractionated using TREF increments, and wherein those fractions that have a comonomer content of at least about 6 mole percent, have a melting point greater than about 100° C., and wherein those fractions having a comonomer content from about 3 mole percent to about 6 mole percent, have a DSC melting point of about 110° C. or higher, and wherein the olefin interpolymer is functionalized with at least one unsaturated compound containing at least one heteroatom.

In another aspect, the invention provides a composition, comprising at least one functionalized olefin interpolymer, and wherein the functionalized olefin interpolymer is formed from an olefin interpolymer comprising ethylene and one or more copolymerizable comonomers in polymerized form, and wherein the olefin interpolymer comprises multiple blocks or segments of two or more polymerized monomer units, said blocks or segments differing in chemical or physical properties (blocked interpolymer), and wherein the olefin interpolymer has a molecular fraction which elutes between 40° C. and 130° C., when fractionated using TREF increments, and wherein every fraction that has an ATREF elution temperature greater than, or equal to, about 76° C., has a melt enthalpy (heat of fusion) as measured by DSC, corresponding to the equation: Heat of fusion (J/gm)$\leq$(3.1718)(ATREF elution temperature in Celsius)−136.58, and wherein every fraction that has an ATREF elution temperature between 40° C. and less than about 76° C., has a melt enthalpy (heat of fusion) as measured by DSC, corresponding to the equation: Heat of fusion (J/gm)$\leq$(1.1312)(ATREF elution temperature in Celsius)+22.97, and wherein the olefin interpolymer is functionalized with at least one unsaturated compound containing at least one heteroatom.

The invention also provides for crosslinked derivatives of the aforementioned functionalized olefin interpolymers. The invention also provides for additional embodiments of the above compositions, functionalized interpolymers, and processes, all as described herein, and for combinations of two or more of these embodiments. The invention further provides for articles, each comprising at least one component that comprises, or is formed from, a composition as described herein, and provides for processes for preparing the same.

DETAILED DESCRIPTION OF THE INVENTION

General Definitions

Figure 1:
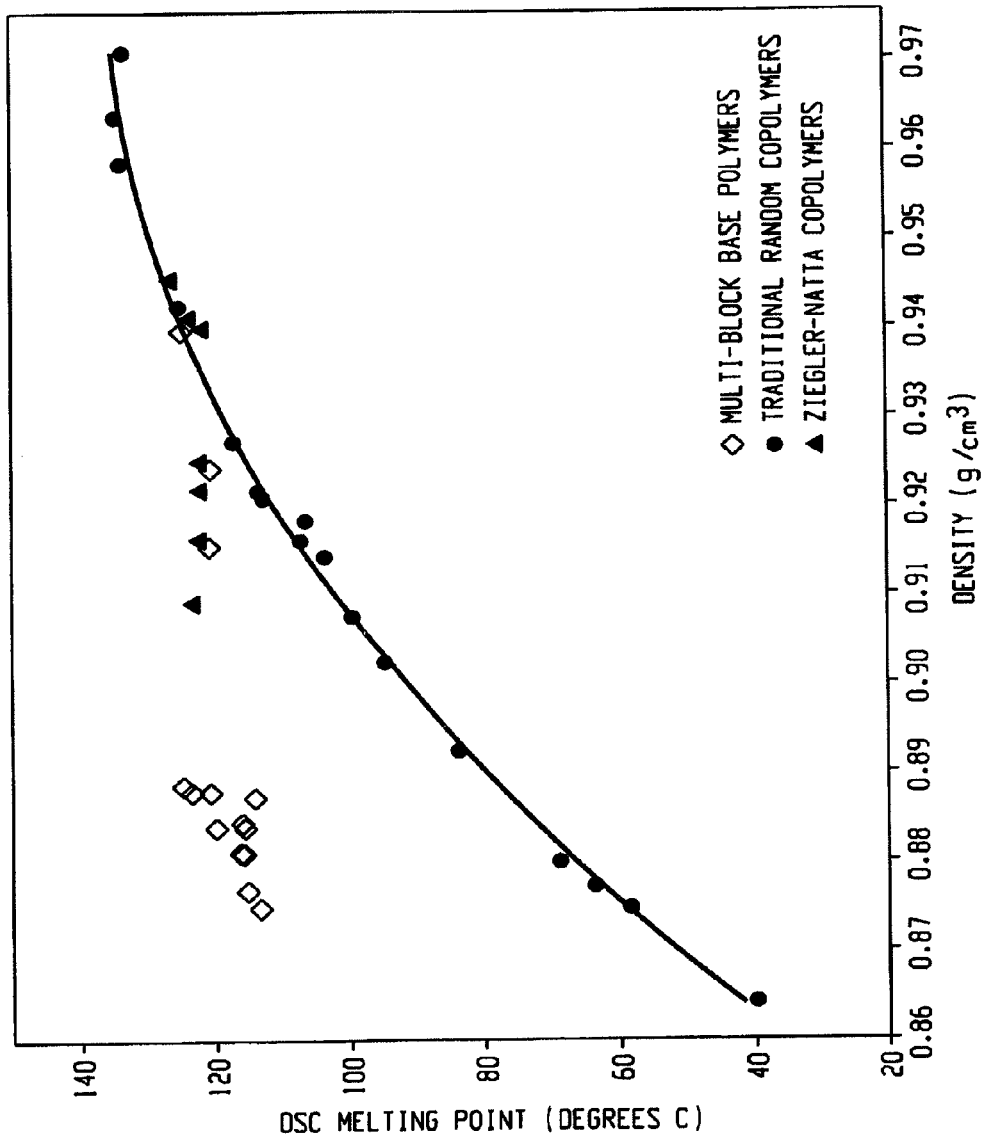
FIG. 1 shows the melting point/density relationship for the inventive polymers (represented by diamonds) as compared to traditional random copolymers (represented by circles) and Ziegler-Natta copolymers (represented by triangles).

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer" are used interchangeably herein. In some embodiments, the multi-block copolymer can be represented by the following formula:

(AB)$_n$ where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprises all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376,835 (insert when known), entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

"Impact-modifying amount of ethylene/α-olefin multi-block interpolymer" is a quantity of ethylene/α-olefin multi-block interpolymer added to a given polymer composition such that the composition's notched Izod impact strength at room temperature or below is maintained or increased as compared to said given composition's notched Izod impact strength at the same temperature without the added ethylene/α-olefin multi-block interpolymer.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

Ethylene/α-Olefin Interpolymers

The ethylene/α-olefin interpolymers used in embodiments of the invention (also referred to as "inventive interpolymer" or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$$T_m > -2002.9 + 4538.5(d) - 2422.2(d)^2, \text{and preferably}$$

$$T_m \geq -6288.1 + 13141(d) - 6720.3(d)^2, \text{and more preferably}$$

$$T_m \geq 858.91 - 1825.3(d) + 1112.8(d)^2.$$

Such melting point/density relationship is illustrated in FIG. 1. Unlike the traditional random copolymers of ethylene/α-olefins whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc.

Figure 2:
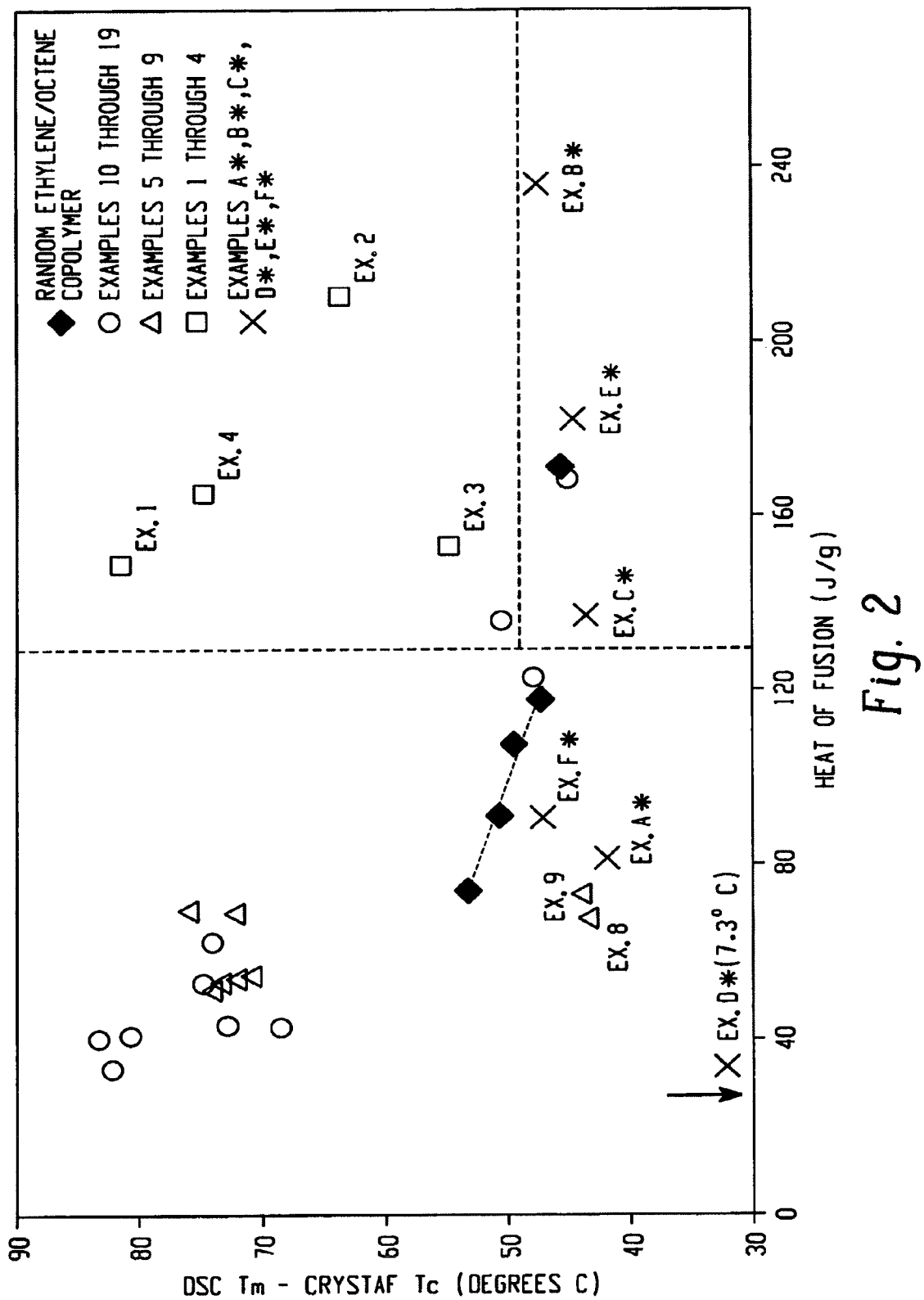
FIG. 2 shows plots of delta DSC-CRYSTAF as a function of DSC Melt Enthalpy for various polymers. The diamonds represent random ethylene/octene copolymers; the squares represent polymer examples 1-4; the triangles represent polymer examples 5-9; and the circles represent polymer examples 10-19. The "X" symbols represent polymer examples A*-F*.

In another aspect, the ethylene/α-olefin interpolymers comprise, in polymerized form, ethylene and one or more α-olefins and are characterized by a ΔT, in degree Celsius, defined as the temperature for the tallest Differential Scanning calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81, \text{and preferably}$$

$$\Delta T \geq -0.1299(\Delta H) + 64.38, \text{and more preferably}$$

$$\Delta T \geq -0.1299(\Delta H) + 65.95,$$

for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer. FIG. 2 shows plotted data for inventive polymers as well as comparative examples. Integrated peak areas and peak temperatures are calculated by the computerized drawing program supplied by the instrument maker. The diagonal line shown for the random ethylene octene comparative polymers corresponds to the equation ΔT=−0.1299 (ΔH)+62.81.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{and preferably}$$

$$Re \geq 1491 - 1629(d); \text{and more preferably}$$

$$Re \geq 1501 - 1629(d); \text{and even more preferably}$$

$$Re \geq 1511 - 1629(d).$$

Figure 3:
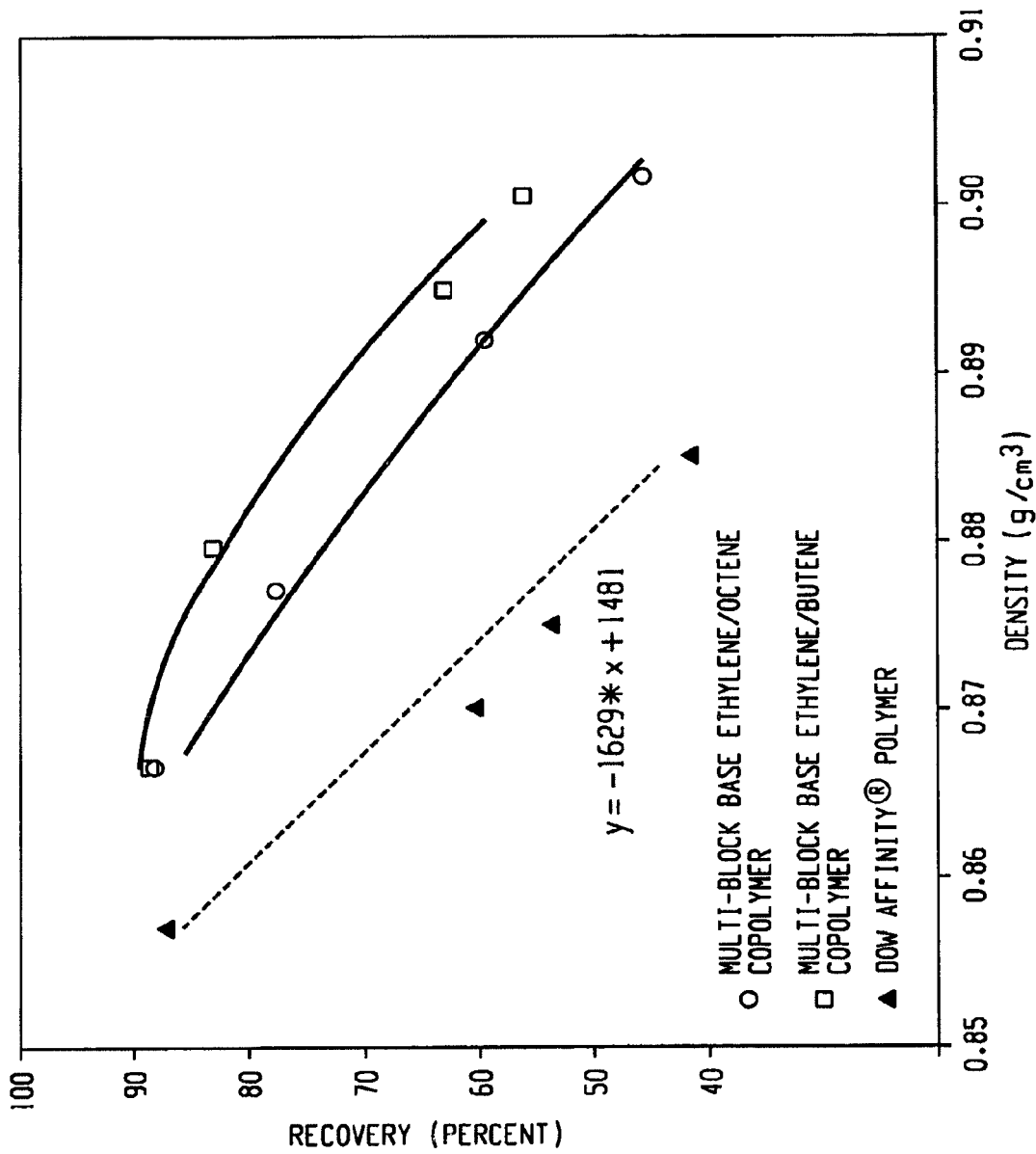
FIG. 3 shows the effect of density on elastic recovery for unoriented films made from inventive interpolymers (represented by the squares and circles) and traditional copolymers (represented by the triangles which are various Dow AFFINITY® polymers). The squares represent inventive ethylene/butene copolymers; and the circles represent inventive ethylene/octene copolymers.

FIG. 3 shows the effect of density on elastic recovery for unoriented films made from certain inventive interpolymers and traditional random copolymers. For the same density, the inventive interpolymers have substantially higher elastic recoveries.

In some embodiments, the ethylene/α-olefin interpolymers have a tensile strength above 10 MPa, preferably a tensile strength≧11 MPa, more preferably a tensile strength≧13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot² (4800 Pa), preferably equal to or less than 50 lbs/ft² (2400 Pa), especially equal to or less than 5 lbs/ft² (240 Pa), and as low as 0 lbs/ft² (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area $[CH_3/CH_2]$ from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl: methylene area ratio $[CH_3/CH_2]$ of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

Figure 4:
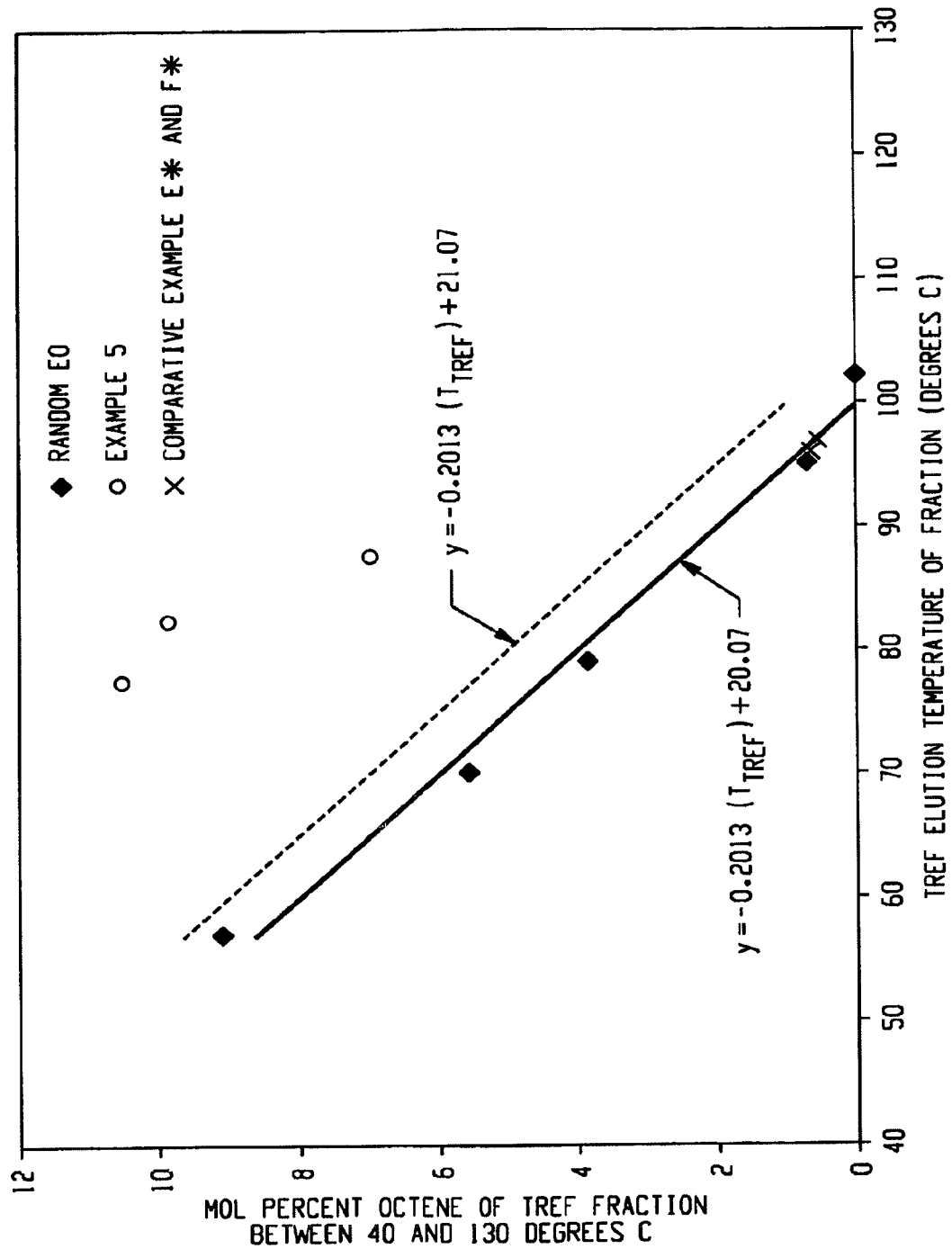
FIG. 4 is a plot of octene content of TREF fractionated ethylene/1-octene copolymer fractions versus TREF elution temperature of the fraction for the polymer of Example 5 (represented by the circles) and comparative polymers E and F (represented by the "X" symbols). The diamonds represent traditional random ethylene/octene copolymers.

FIG. 4 graphically depicts an embodiment of the block interpolymers of ethylene and 1-octene where a plot of the comonomer content versus TREF elution temperature for several comparable ethylene/1-octene interpolymers (random copolymers) are fit to a line representing (−0.2013) T+20.07 (solid line). The line for the equation (−0.2013) T+21.07 is depicted by a dotted line. Also depicted are the comonomer contents for fractions of several block ethylene/1-octene interpolymers of the invention (multi-block copolymers). All of the block interpolymer fractions have significantly higher 1-octene content than either line at equivalent elution temperatures. This result is characteristic of the inventive interpolymer and is believed to be due to the presence of differentiated blocks within the polymer chains, having both crystalline and amorphous nature.

Figure 5:
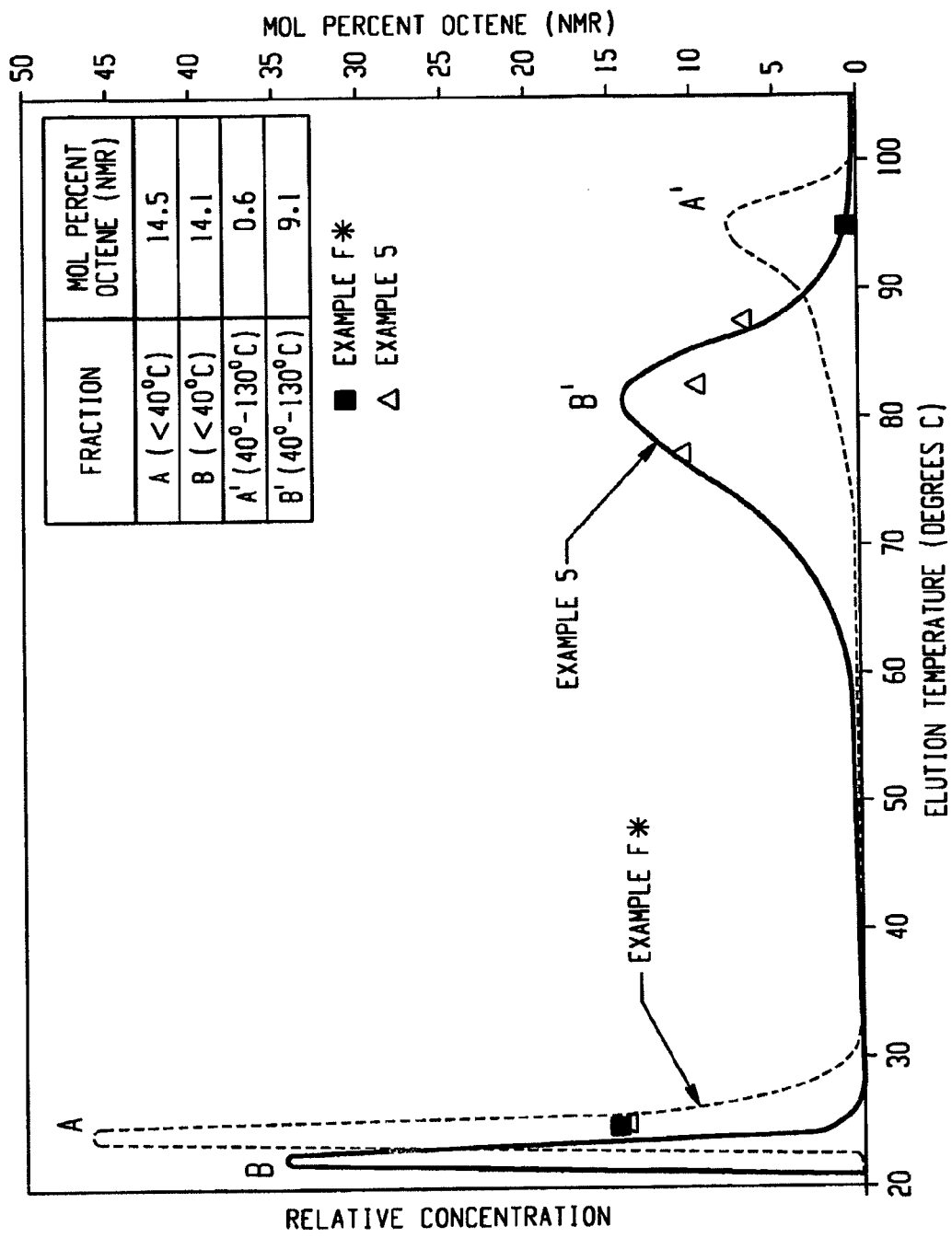
FIG. 5 is a plot of octene content of TREF fractionated ethylene/1-octene copolymer fractions versus TREF elution temperature of the fraction for the polymer of Example 5 (curve 1) and for comparative F (curve 2). The squares represent Example F*; and the triangles represent Example 5.

FIG. 5 graphically displays the TREF curve and comonomer contents of polymer fractions for Example 5 and comparative F to be discussed below. The peak eluting from 40 to 130° C., preferably from 60° C. to 95° C. for both polymers is fractionated into three parts, each part eluting over a temperature range of less than 10° C. Actual data for Example 5 is represented by triangles. The skilled artisan can appreciate that an appropriate calibration curve may be constructed for interpolymers containing different comonomers and a line used as a comparison fitted to the TREF values obtained from comparative interpolymers of the same monomers, preferably random copolymers made using a metallocene or other homogeneous catalyst composition. Inventive interpolymers are characterized by a molar comonomer content greater than the value determined from the calibration curve at the same TREF elution temperature, preferably at least 5 percent greater, more preferably at least 10 percent greater.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin, especially those interpolymers having a whole polymer density from about 0.855 to about 0.935 g/cm³, and more especially for polymers having more than about 1 mole percent comonomer, the blocked interpolymer has a comonomer content of the TREF fraction eluting between 40 and 130° C. greater than or equal to the quantity (−0.1356) T+13.89, more preferably greater than or equal to the quantity (−0.1356) T+14.93, and most preferably greater than or equal to the quantity (−0.2013) T+21.07, where T is the numerical value of the peak ATREF elution temperature of the TREF fraction being compared, measured in ° C.

Preferably, for the above interpolymers of ethylene and at least one alpha-olefin especially those interpolymers having a whole polymer density from about 0.855 to about 0.935 g/cm³, and more especially for polymers having more than about 1 mole percent comonomer, the blocked interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

In still another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multiblock copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$Tm \geq (-5.5926)$(mol percent comonomer in the fraction)+135.90.

In yet another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multiblock copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

Heat of fusion(J/gm)<(3.1718)(ATREF elution temperature in Celsius)−136.58,

The inventive block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

Heat of fusion(J/gm)≤(1.1312)(ATREF elution temperature in Celsius)+22.97.

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 cm$^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying a the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170., both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$ABI = \Sigma(w_i BI_i)$ where $BI_i$ is the block index for the ith fraction of the inventive ethylene/α-olefin interpolymer obtained in preparative TREF, and $w_i$ is the weight percentage of the ith fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{\text{Ln}P_X - \text{Ln}P_{XO}}{\text{Ln}P_A - \text{Ln}P_{AB}}$$

where $T_X$ is the preparative ATREF elution temperature for the ith fraction (preferably expressed in Kelvin), $P_X$ is the ethylene mole fraction for the ith fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K, $P_A$ is 1.

$T_{AB}$ is the ATREF temperature for a random copolymer of the same composition and having an ethylene mole fraction of $P_{AB}$. $T_{AB}$ can be calculated from the following equation:

$$\operatorname{Ln} P_{AB} = \alpha/T_{AB} + \beta$$

where $\alpha$ and $\beta$ are two constants which can be determined by calibration using a number of known random ethylene copolymers. It should be noted that $\alpha$ and $\beta$ may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$\operatorname{Ln} P = -237.83/T_{ATREF} + 0.639$$

$T_{XO}$ is the ATREF temperature for a random copolymer of the same composition and having an ethylene mole fraction of $P_X$. $T_{XO}$ can be calculated from $\operatorname{Ln} P_X = \alpha/T_{XO} + \beta$. Conversely, $P_{XO}$ is the ethylene mole fraction for a random copolymer of the same composition and having an ATREF temperature of $T_X$, which can be calculated from $\operatorname{Ln} P_{XO} = \alpha/T_X + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Figure 6:
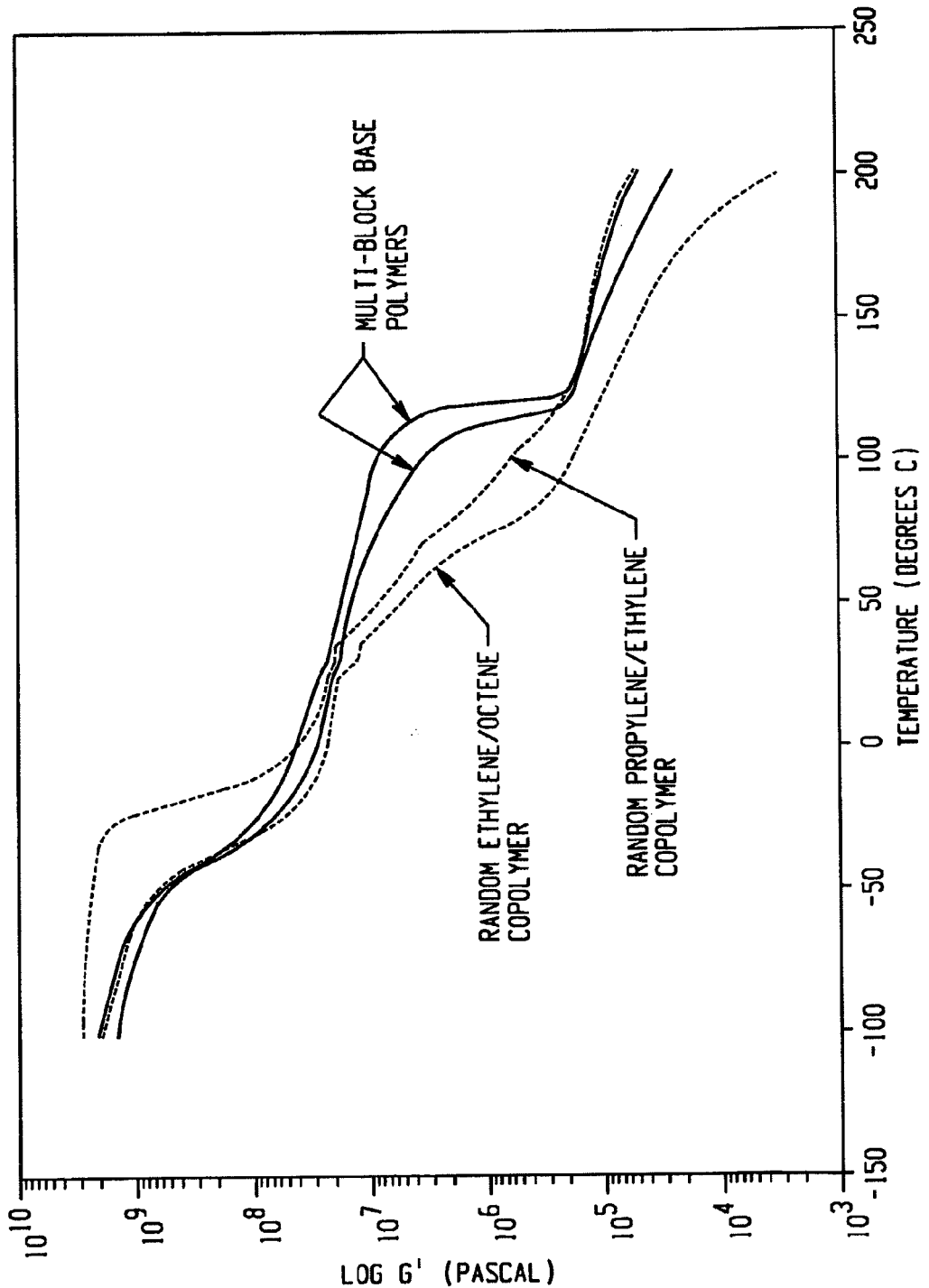
FIG. 6 is a graph of the log of storage modulus as a function of temperature for comparative ethylene/1-octene copolymer (curve 2) and propylene/ethylene-copolymer (curve 3) and for two ethylene/1-octene block copolymers of the invention made with differing quantities of chain shuttling agent (curves 1).

Further, the inventive polymers can have, alone or in combination with any other properties disclosed herein, a storage modulus, G', such that log (G') is greater than or equal to 400 kPa, preferably greater than or equal to 1.0 MPa, at a temperature of 100° C. Moreover, the inventive polymers possess a relatively flat storage modulus as a function of temperature in the range from 0 to 100° C. (illustrated in FIG. 6) that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

Figure 7:
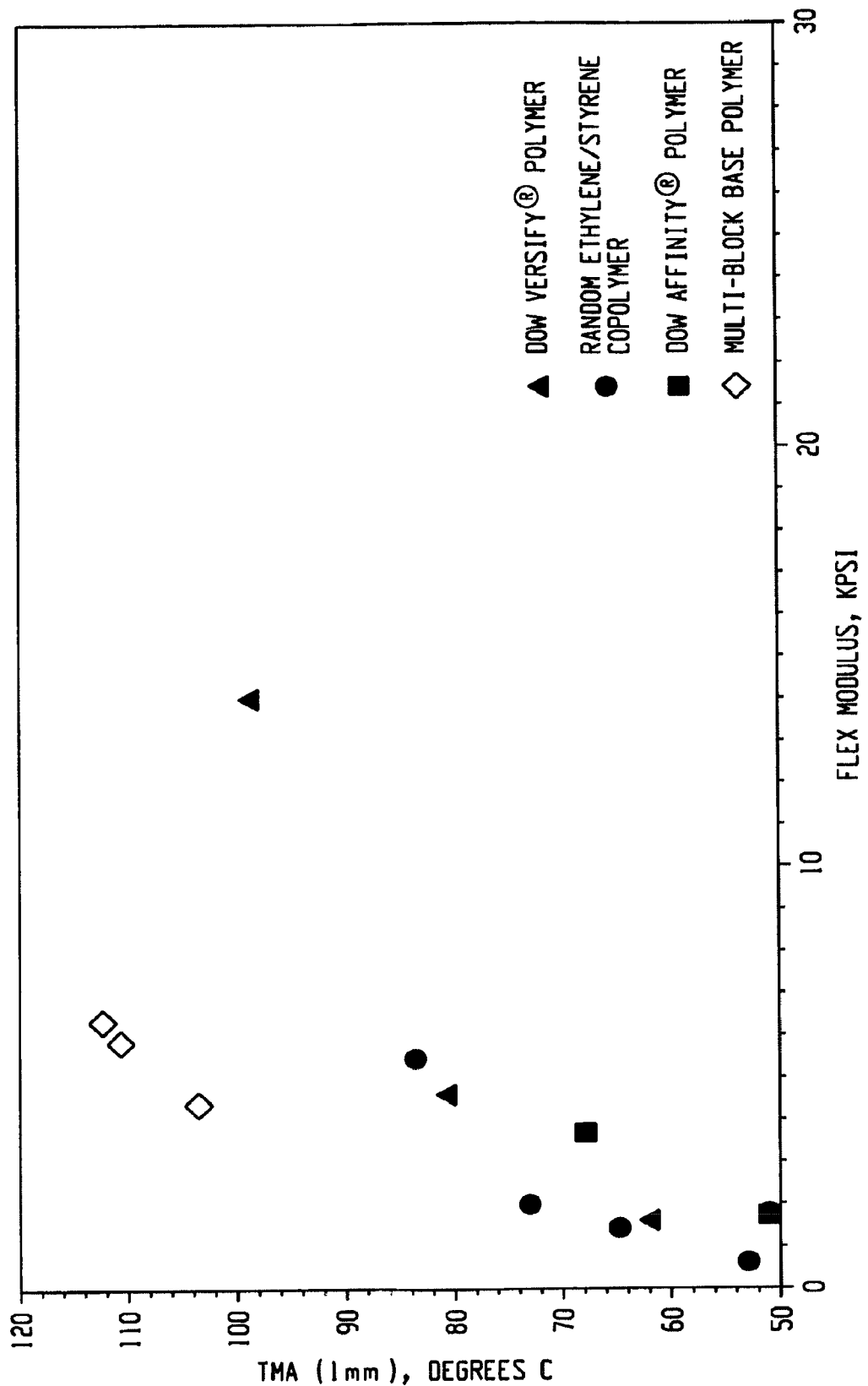
FIG. 7 shows a plot of TMA (1 mm) versus flex modulus for some inventive polymers (represented by the diamonds), as compared to some known polymers. The triangles represent various Dow VERSIFY® polymers; the circles represent various random ethylene/styrene copolymers; and the squares represent various Dow AFFINITY® polymers.
Figure 8:
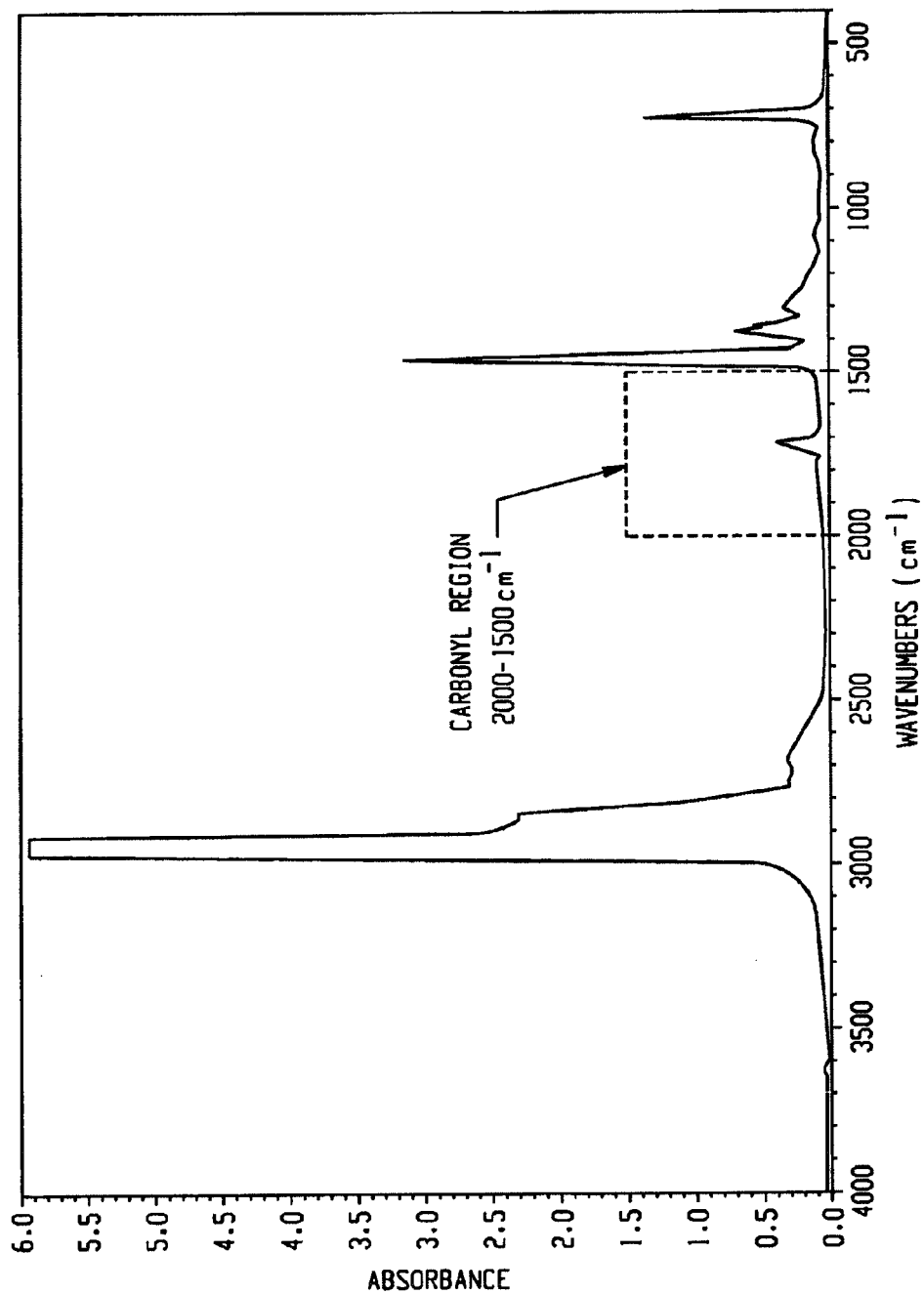
FIG. 8 is an FTIR spectrum of Multi-block R22 grafted with 0.77 wt % maleic anhydride. The boxed portion of the spectrum indicates the carbonyl region of the spectrum (2000-1500 cm$^1$).
Figure 9:
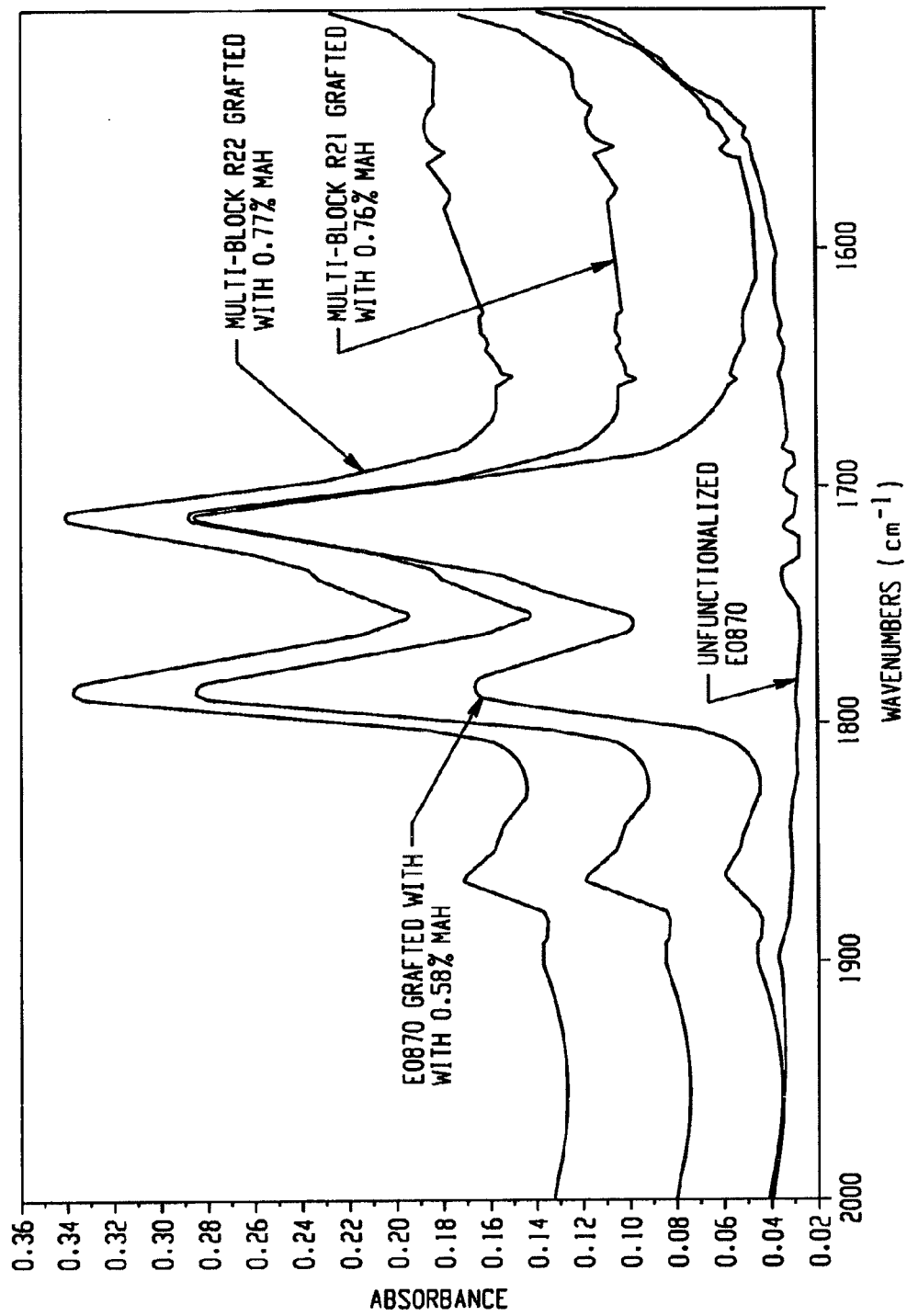
FIG. 9 represents an overlay of the carbonyl regions of the FTIR spectra of, from top to bottom, Multi-block R22 grafted with 0.77% MAH; Multi-block R21 grafted with 0.76% MAH; EO870 grafted with 0.58% MAH; and unfunctionalized EO870.

The inventive interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the inventive interpolymers can have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 mm³. FIG. 7 shows the TMA (1 mm) versus flex modulus for the inventive polymers, as compared to other known polymers. The inventive polymers have significantly better flexibility-heat resistance balance than the other polymers.

Additionally, the ethylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm³ and preferably for ethylene containing polymers from 0.85 g/cm³ to 0.97 g/cm³. In certain embodiments, the density of the ethylene/α-olefin polymers ranges from 0.860 to 0.925 g/cm³ or 0.867 to 0.910 g/cm³.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/566,2938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido) (2-isopropylphenyl)(α-naphthalen-2-diyl(6-pyridin-2-diyl) methane)]hafnium dimethyl, prepared according to the teachings of WO 03/40195, 2003US0204017, U.S. Ser. No. 10/429,024, filed May 2, 2003, and WO 04/24740.

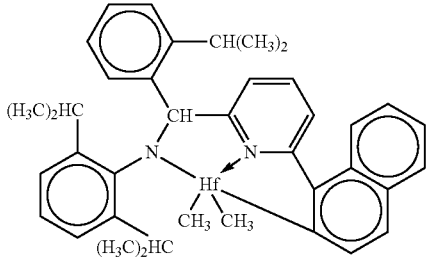

Catalyst (A2) is [N-(2,6-di(1-methylethyl)phenyl)amido) (2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

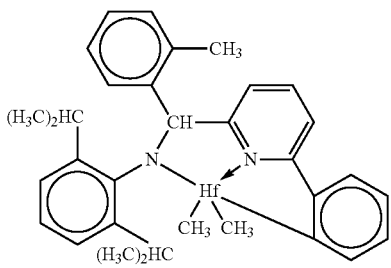

Catalyst (A3) is bis[N,N'''-(2,4,6-tri(methylphenyl)amido) ethylenediamine]hafnium dibenzyl.

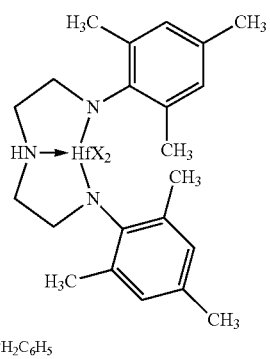

X = CH$_2$C$_6$H$_5$

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

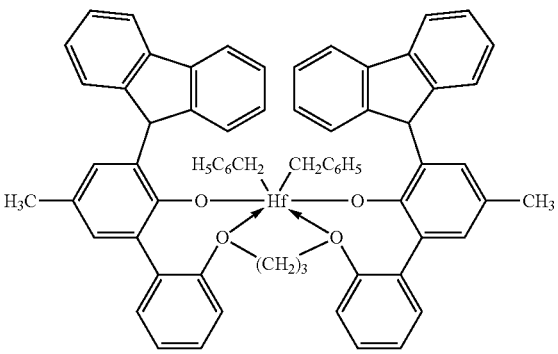

Catalyst (B1) is 1,2-bis-(3,5-di-t-butylphenylene)(1-(N-(1-methylethyl)immino)methyl)(2-oxoyl)zirconium dibenzyl

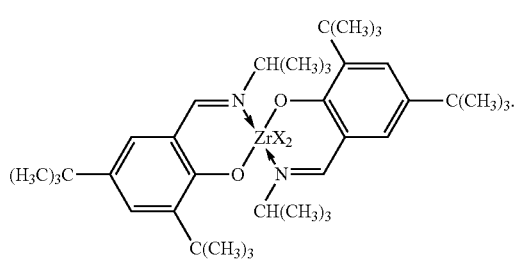

X = CH$_2$C$_6$H$_5$

Catalyst (B2) is 1,2-bis-(3,5-di-t-butylphenylene)(1-(N-(2-methylcyclohexyl)-immino)methyl)(2-oxoyl)zirconium dibenzyl

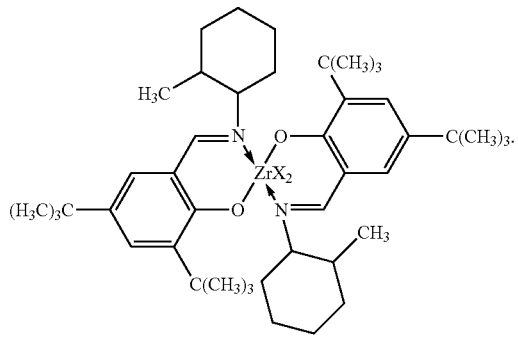

X = CH$_2$C$_6$H$_5$

Catalyst (C1) is (t-butylamido)dimethyl(3-N-pyrrolyl-1,2, 3,3a,7a-η-inden-1-yl)silanetitanium dimethyl prepared substantially according to the techniques of U.S. Pat. No. 6,268, 444:

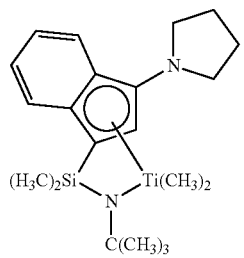

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

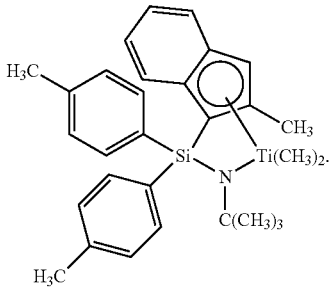

Catalyst (C3) is (t-butylamido)di(4-methylphenyl)(2-methyl-1,2,3,3a,8a-η-s-indacen-1-yl)silanetitanium dimethyl prepared substantially according to the teachings of US-A-2003/004286:

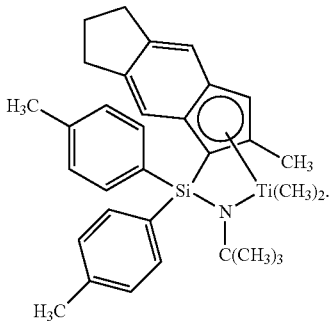

Catalyst (D1) is bis(dimethyldisiloxane)(indene-1-yl)zirconium dichloride available from Sigma-Aldrich:

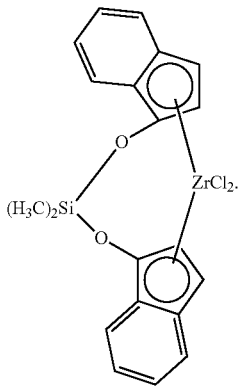

Shuttling Agents. The shuttling agents employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis (trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That, is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the inventive interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the inventive interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

Testing Methods

In the examples that follow, the following analytical techniques are employed:

GPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (μm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400–600 kPa) $N_2$. The polymer samples are heated to 160° C. and each sample injected into a 250 μl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)):
$M_{polyethylene} = 0.431 (M_{polystyrene})$.

Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min⁻¹ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min⁻¹ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min⁻¹. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min⁻¹ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Melt Index

Melt index, or $I_2$, is measured in accordance with ASTM D 1238, Condition 190° C./2.16 kg. Melt index, or $I_{10}$ is also measured in accordance with ASTM D 1238, Condition 190° C./10 kg.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-$d^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×1.2 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat #Z50WP04750). The filtrated fractions are dried overnight in a vacuum oven at 60° C. and weighed on an analytical balance before further testing.

Melt Strength

Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec². The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

The preparation of catalyst (B1) is conducted as follows.

a) Preparation of (1-methylethyl)(2-hydroxy-3,5-di(t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene) (1-(N-(1-methylethyl)immino)methyl)(2-oxoyl)zirconium dibenzyl A solution of (1-methylethyl)(2-hydroxy-3,5-di(t-butyl)phenyl)imine (605 mg, 2.2 mmol) in 5 mL toluene is slowly added to a solution of $Zr(CH_2Ph)_4$ (500 mg, 1.1 mmol) in 50 mL toluene. The resulting dark yellow solution is stirred for 30 min. Solvent is removed under reduced pressure to yield the desired product as a reddish-brown solid.

The preparation of catalyst (B2) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1H$ NMR is consistent with the desired product as a mixture of isomers.

b) Preparation of bis-(1-(2-methylcyclohexyl)ethyl) (2-oxoyl-3,5-di(t-butyl)phenyl)immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of $Zr(CH_2Ph)_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Cocatalyst 1 A mixture of methyldi($C_{14-18}$alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and $Li[B(C_6F_5)_4]$, substantially as disclosed in U.S. Pat. No. 5,919,9883, Ex. 2.

Cocatalyst 2 Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents. The shuttling agents employed include diethylzinc (DEZ, SA1), di(i-butyl)zinc (SA2), di(n-hexyl)zinc (SA3), triethylaluminum (TEA, SA4), trioctylaluminum (SA5), triethylgallium (SA6), i-butylaluminum bis(dimethyl(t-butyl)siloxane) (SA7), i-butylaluminum bis(di(trimethylsilyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis(t-butyldimethylsiloxide) (SA14), ethylaluminum di(bis(trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide(SA18), ethylzinc (2,6-diphenylphenoxide) (SA19), and ethylzinc (t-butoxide) (SA20).

EXAMPLES 1-4

Comparative A-C

General High Throughput Parallel Polymerization Conditions

Polymerizations are conducted using a high throughput, parallel polymerization reactor (PPR) available from Symyx technologies, Inc. and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) contained of 48 individual reactor cells in a 6×8 array that are fitted with a pre-weighed glass tube. The working volume in each reactor cell is 6000 μL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1 or cocatalyst 1/MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1. In Table 1 and elsewhere in the application, comparative compounds are indicated by an asterisk (*).

Examples 1-4 demonstrate the synthesis of linear block copolymers by the present invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers of the invention are distinguishable based on branching or density.

TABLE 1

| Ex. | Cat. (A1) (μmol) | Cat (B1) (μmol) | Cocat (μmol) | MMAO (μmol) | shuttling agent (μmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |

TABLE 1-continued

| Ex. | Cat. (A1) (μmol) | Cat (B1) (μmol) | Cocat (μmol) | MMAO (μmol) | shuttling agent (μmol) | Yield (g) | Mn | Mw/Mn | hexyls[1] |
|---|---|---|---|---|---|---|---|---|---|
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1]C6 or higher chain content per 1000 carbons
[2]Bimodal molecular weight distribution It may be seen the polymers produced according to the invention have a relatively narrow polydispersity (Mw/Mn) and larger block-copolymer content (trimer, tetramer, or larger) than polymers prepared in the absence of the shuttling agent.

Further characterizing data for the polymers of Table 1 are determined by reference to the figures. More specifically DSC and ATREF results show the following:

The DSC curve for the polymer of example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

The DSC curve for the polymer of example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of example 3 shows a peak with a 120.7° C. melting point (Tm) with a heat of fusion of 160.1 J/g. The corresponding CRYSTAF curve shows the tallest peak at 66.1° C. with a peak area of 71.8 percent. The difference between the DSC Tm and the Tcrystaf is 54.6° C.

The DSC curve for the polymer of example 4 shows a peak with a 104.5° C. melting point (Tm) with a heat of fusion of 170.7 J/g. The corresponding CRYSTAF curve shows the tallest peak at 30° C. with a peak area of 18.2 percent. The difference between the DSC Tm and the Tcrystaf is 74.5° C.

The DSC curve for comparative A shows a 90.0° C. melting point (Tm) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

The DSC curve for comparative B shows a 129.8° C. melting point (Tm) with a heat of fusion of 237.0 J/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for comparative C shows a 125.3° C. melting point (Tm) with a heat of fusion of 143.0 J/g. The corresponding CRYSTAF curve shows the tallest peak at 81.8° C. with a peak area of 34.7 percent as well as a lower crystalline peak at 52.4° C. The separation between the two peaks is consistent with the presence of a high crystalline and a low crystalline polymer. The difference between the DSC Tm and the Tcrystaf is 43.5° C.

EXAMPLES 5-19

Comparatives D-F, Continuous Solution Polymerization, Catalyst A1/B2+DEZ

Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of exemplary polymers

| Ex. | C8H16 kg/hr | Solv. kg/hr | H2 sccm[1] | T °C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | [C2H4]/[DEZ][4] | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | — | " | 0.11 | — | 1.55 | 88.5 | 10.3 | 257.7 |
| 5 | " | " | — | " | " | 0.14 | 30.8 | 0.13 | 0.17 | 0.43 | " | 0.26 | 419 | 1.64 | 89.6 | 11.1 | 118.3 |

TABLE 2-continued

Process details for preparation of exemplary polymers

| Ex. | C$_8$H$_{16}$ kg/hr | Solv. kg/hr | H$_2$ sccm[1] | T °C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | [C$_2$H$_4$]/ [DEZ][4] | Poly Rate[5] kg/hr | Conv %[6] | Solids % | Eff.[7] |
|---|---|---|---|---|---|---|---|---|---|---|---|---|---|---|---|---|---|
| 6 | " | " | 4.92 | " | " | 0.10 | 30.4 | 0.08 | 0.17 | 0.32 | " | 0.18 | 570 | 1.65 | 89.3 | 11.1 | 172.7 |
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 261.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative, not an example of the invention
[1] standard cm$^3$/min
[2] [N-(2,6-di(1-methylethyl)phenyl)amido)(2-isopropylphenyl)(α-naphthalen-2-diyl)(6-pyridin-2-diyl)methane)]hafnium dimethyl
[3] bis-(1-(2-methylcyclohexyl)ethyl)(2-oxoyl-3,5-di(t-butyl)phenyl)immino) zirconium dibenzyl
[4] molar ratio in reactor
[5] polymer production rate
[6] percent ethylene conversion in reactor
[7] efficiency, kg polymer/g M where g M = g Hf + g Zr

TABLE 3

Properties of exemplary polymers

| Ex. | Density (g/cm$^3$) | I$_2$ | I$_{10}$ | I$_{10}$/I$_2$ | Mw (g/mol) | Mn (g/mol) | Mw/Mn | Heat of Fusion (J/g) | T$_m$ (°C.) | T$_c$ (°C.) | T$_{CRYSTAF}$ (°C.) | Tm-T$_{CRYSTAF}$ (°C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

The resulting polymers are tested by DSC and ATREF as with previous examples. Results are as follows:

The DSC curve for the polymer of example 5 shows a peak with a 119.6° C. melting point (Tm) with a heat of fusion of 60.0 J/g. The corresponding CRYSTAF curve shows the tallest peak at 47.6° C. with a peak area of 59.5 percent. The delta between the DSC Tm and the Tcrystaf is 72.0° C.

The DSC curve for the polymer of example 6 shows a peak with a 115.2° C. melting point (Tm) with a heat of fusion of 60.4 J/g. The corresponding CRYSTAF curve shows the tallest peak at 44.2° C. with a peak area of 62.7 percent. The delta between the DSC Tm and the Tcrystaf is 71.0° C.

The DSC curve for the polymer of example 7 shows a peak with a 121.3° C. melting point with a heat of fusion of 69.1 J/g. The corresponding CRYSTAF curve shows the tallest peak at 49.2° C. with a peak area of 29.4 percent. The delta between the DSC Tm and the Tcrystaf is 72.1° C.

The DSC curve for the polymer of example 8 shows a peak with a 123.5° C. melting point (Tm) with a heat of fusion of 67.9 J/g. The corresponding CRYSTAF curve shows the tallest peak at 80.1° C. with a peak area of 12.7 percent. The delta between the DSC Tm and the Tcrystaf is 43.4° C.

The DSC curve for the polymer of example 9 shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

The DSC curve for the polymer of example 10 shows a peak with a 115.6° C. melting point (Tm) with a heat of fusion of 60.7 J/g. The corresponding CRYSTAF curve shows the tallest peak at 40.9° C. with a peak area of 52.4 percent. The delta between the DSC Tm and the Tcrystaf is 74.7° C.

The DSC curve for the polymer of example 11 shows a peak with a 113.6° C. melting point (Tm) with a heat of fusion of 70.4 J/g. The corresponding CRYSTAF curve shows the tallest peak at 39.6° C. with a peak area of 25.2 percent. The delta between the DSC Tm and the Tcrystaf is 74.1° C.

The DSC curve for the polymer of example 12 shows a peak with a 113.2° C. melting point (Tm) with a heat of fusion of 48.9 J/g. The corresponding CRYSTAF curve shows no peak equal to or above 30° C. (Tcrystaf for purposes of further calculation is therefore set at 30° C.). The delta between the DSC Tm and the Tcrystaf is 83.2° C.

The DSC curve for the polymer of example 13 shows a peak with a 114.4° C. melting point (Tm) with a heat of fusion of 49.4 J/g. The corresponding CRYSTAF curve shows the tallest peak at 33.8° C. with a peak area of 7.7 percent. The delta between the DSC Tm and the Tcrystaf is 84.4° C.

The DSC for the polymer of example 14 shows a peak with a 120.8° C. melting point (Tm) with a heat of fusion of 127.9 J/g. The corresponding CRYSTAF curve shows the tallest peak at 72.9° C. with a peak area of 92.2 percent. The delta between the DSC Tm and the Tcrystaf is 47.9° C.

The DSC curve for the polymer of example 15 shows a peak with a 114.3° C. melting point (Tm) with a heat of fusion of 36.2 J/g. The corresponding CRYSTAF curve shows the tallest peak at 32.3° C. with a peak area of 9.8 percent. The delta between the DSC Tm and the Tcrystaf is 82.0° C.

The DSC curve for the polymer of example 16 shows a peak with a 116.6° C. melting point (Tm) with a heat of fusion of 44.9 J/g. The corresponding CRYSTAF curve shows the tallest peak at 48.0° C. with a peak area of 65.0 percent. The delta between the DSC Tm and the Tcrystaf is 68.6° C.

The DSC curve for the polymer of example 17 shows a peak with a 116.0° C. melting point (Tm) with a heat of fusion of 47.0 J/g. The corresponding CRYSTAF curve shows the tallest peak at 43.1° C. with a peak area of 56.8 percent. The delta between the DSC Tm and the Tcrystaf is 72.9° C.

The DSC curve for the polymer of example 18 shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

The DSC curve for the polymer of example 19 shows a peak with a 124.8° C. melting point (Tm) with a heat of fusion of 174.8 J/g. The corresponding CRYSTAF curve shows the tallest peak at 79.9° C. with a peak area of 87.9 percent. The delta between the DSC Tm and the Tcrystaf is 45.0° C.

The DSC curve for the polymer of comparative D shows a peak with a 37.3° C. melting point (Tm) with a heat of fusion of 31.6 J/g. The corresponding CRYSTAF curve shows no peak equal to and above 30° C. Both of these values are consistent with a resin that is low in density. The delta between the DSC Tm and the Tcrystaf is 7.3° C.

The DSC curve for the polymer of comparative E shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

The DSC curve for the polymer of comparative F shows a peak with a 124.8° C. melting point (Tm) with a heat of fusion of 90.4 J/g. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing, pellet blocking strength, high temperature recovery, high temperature compression set and storage modulus ratio, G'(25° C.)/G'(100° C.). Several commercially available polymers are included in the tests: Comparative G* is a substantially linear ethylene/1-octene copolymer (AFFINITY®, available from The Dow Chemical Company), Comparative H* is an elastomeric, substantially linear ethylene/1-octene copolymer (AFFINITY®EG8100, available from The Dow Chemical Company), Comparative I is a substantially linear ethylene/1-octene copolymer (AFFINITY®PL1840, available from The Dow Chemical Company), Comparative J is a hydrogenated styrene/butadiene/styrene triblock copolymer (KRATON™ G1652, available from KRATON Polymers), Comparative K is a thermoplastic vulcanizate (TPV, a polyolefin blend containing dispersed therein a crosslinked elastomer). Results are presented in Table 4.

TABLE 4

High Temperature Mechanical Properties

| Ex. | TMA-1 mm penetration (° C.) | Pellet Blocking Strength lb/ft$^2$ (kPa) | G'(25° C.)/ G'(100° C.) | 300% Strain Recovery (80° C.) (percent) | Compression Set (70° C.) (percent) |
|---|---|---|---|---|---|
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative F (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, examples 10-19 all have a 1 mm penetration temperature of greater than 85° C., with most having 1 mm TMA temperature of greater than 90° C. or even greater than 100° C. This shows that the novel polymers have better dimensional stability at higher temperatures compared to a physical blend. Comparative J (a commercial SEBS) has a good 1 mm TMA temperature of about 107° C., but it has very poor (high temperature 70° C.) compression set of about 100 percent and it also failed to recover (sample broke) during a high temperature (80° C.) 300 percent strain recovery. Thus the exemplified polymers have a unique combination of properties unavailable even in some commercially available, high performance thermoplastic elastomers.

Similarly, Table 4 shows a low (good) storage modulus ratio, G'(25° C.)/G'(100° C.), for the inventive polymers of 6 or less, whereas a physical blend (Comparative F) has a storage modulus ratio of 9 and a random ethylene/octene copolymer (Comparative G) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers of the invention possess improved pellet blocking strength. In particular, Example 5 has a pellet blocking strength of 0 MPa, meaning it is free flowing under the conditions tested, compared to Comparatives F and G which show considerable blocking. Blocking strength is important since bulk shipment of polymers having large blocking strengths can result in product clumping or sticking together upon storage or shipping, resulting in poor handling properties.

High temperature (70° C.) compression set for the inventive polymers is generally good, meaning generally less than about 80 percent, preferably less than about 70 percent and especially less than about 60 percent. In contrast, Comparatives F, G, H and J all have a 70° C. compression set of 100 percent (the maximum possible value, indicating no recovery). Good high temperature compression set (low numerical values) is especially needed for applications such as gaskets, window profiles, o-rings, and the like.

Table 5 shows results for mechanical properties for the new polymers as well as for various comparison polymers at ambient temperatures. It may be seen that the inventive polymers have very good abrasion resistance when tested according to ISO 4649, generally showing a volume loss of less than about 90 mm$^3$, preferably less than about 80 mm$^3$, and especially less than about 50 mm$^3$. In this test, higher numbers indicate higher volume loss and consequently lower abrasion resistance.

Tear strength as measured by tensile notched tear strength of the inventive polymers is generally 1000 mJ or higher, as shown in Table 5. Tear strength for the inventive polymers can be as high as 3000 mJ, or even as high as 5000 mJ. Comparative polymers generally have tear strengths no higher than 750 mJ.

Table 5 also shows that the polymers of the invention have better retractive stress at 150 percent strain (demonstrated by higher retractive stress values) than some of the comparative samples. Comparative Examples F, G and H have retractive stress value at 150 percent strain of 400 kPa or less, while the inventive polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the inventive polymers as compared to, for example, Comparative G. Lower stress relaxation means that the polymer retains its force better in applications such as diapers and other garments where retention of elastic properties over long time periods at body temperatures is desired.

TABLE 5

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm$^3$) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|---|---|---|---|---|---|---|---|
| D* | 12 | 5 | — | — | 10 | 1074 | — | — | 91 | 83 | 760 | — | — |
| E* | 895 | 589 | — | — | 31 | 1029 | — | — | — | — | — | — | — |
| F* | 57 | 46 | — | — | 12 | 824 | 93 | 339 | 78 | 65 | 400 | 42 | — |
| 5 | 30 | 24 | 14 | 951 | 16 | 1116 | 48 | — | 87 | 74 | 790 | 14 | 33 |
| 6 | 33 | 29 | — | — | 14 | 938 | — | — | — | 75 | 861 | 13 | — |
| 7 | 44 | 37 | 15 | 846 | 14 | 854 | 39 | — | 82 | 73 | 810 | 20 | — |
| 8 | 41 | 35 | 13 | 785 | 14 | 810 | 45 | 461 | 82 | 74 | 760 | 22 | — |
| 9 | 43 | 38 | — | — | 12 | 823 | — | — | — | — | — | 25 | — |
| 10 | 23 | 23 | — | — | 14 | 902 | — | — | 86 | 75 | 860 | 12 | — |
| 11 | 30 | 26 | — | — | 16 | 1090 | — | 976 | 89 | 66 | 510 | 14 | 30 |
| 12 | 20 | 17 | 12 | 961 | 13 | 931 | — | 1247 | 91 | 75 | 700 | 17 | — |
| 13 | 16 | 14 | — | — | 13 | 814 | — | 691 | 91 | — | — | 21 | — |
| 14 | 212 | 160 | — | — | 29 | 857 | — | — | — | — | — | — | — |
| 15 | 18 | 14 | 12 | 1127 | 10 | 1573 | — | 2074 | 89 | 83 | 770 | 14 | — |
| 16 | 23 | 20 | — | — | 12 | 968 | — | — | 88 | 83 | 1040 | 13 | — |
| 17 | 20 | 18 | — | — | 13 | 1252 | — | 1274 | 13 | 83 | 920 | 4 | — |
| 18 | 323 | 239 | — | — | 30 | 808 | — | — | — | — | — | — | — |
| 19 | 706 | 483 | — | — | 36 | 871 | — | — | — | — | — | — | — |
| G* | 15 | 15 | — | — | 17 | 1000 | — | 746 | 86 | 53 | 110 | 27 | 50 |
| H* | 16 | 15 | — | — | 15 | 829 | — | 569 | 87 | 60 | 380 | 23 | — |
| I* | 210 | 147 | — | — | 29 | 697 | — | — | — | — | — | — | — |
| J* | — | — | — | — | 32 | 609 | — | — | 93 | 96 | 1900 | 25 | — |
| K* | — | — | — | — | — | — | — | — | — | — | — | 30 | — |

[1]Tested at 51 cm/minute
[2]measured at 38° C. for 12 hours

Optical Testing

TABLE 6

Polymer Optical Properties

| Ex. | Internal Haze (percent) | Clarity (percent) | 45° Gloss (percent) |
|---|---|---|---|
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |
| 14 | 59 | 15 | 62 |
| 15 | 11 | 74 | 66 |
| 16 | 39 | 70 | 65 |
| 17 | 29 | 73 | 66 |
| 18 | 61 | 22 | 60 |
| 19 | 74 | 11 | 52 |
| G* | 5 | 73 | 56 |

TABLE 6-continued

Polymer Optical Properties

| Ex. | Internal Haze (percent) | Clarity (percent) | 45° Gloss (percent) |
|---|---|---|---|
| H* | 12 | 76 | 59 |
| I* | 20 | 75 | 59 |

The optical properties reported in Table 6 are based on compression molded films substantially lacking in orientation. Optical properties of the polymers may be varied over wide ranges, due to variation in crystallite size, resulting from variation in the quantity of chain shuttling agent employed in the polymerization.

Extractions of Multi-Block Copolymers

Extraction studies of the polymers of examples 5, 7 and Comparative E are conducted. In the experiments, the polymer sample is weighed into a glass fritted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the ether begins to condense into the thimble, and the extraction is allowed to proceed under nitrogen for 24 hours. At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

[1]Determined by $^{13}$C NMR

ADDITIONAL POLYMER EXAMPLES 19A-J

Continuous Solution Polymerization, Catalyst A1/B2+DEZ

For Examples 19A-I

Continuous solution polymerizations are carried out in a computer controlled well-mixed reactor. Purified mixed alkanes solvent (Isopar™ E available from Exxon Mobil, Inc.), ethylene, 1-octene, and hydrogen (where used) are combined and fed to a 27 gallon reactor. The feeds to the reactor are measured by mass-flow controllers. The temperature of the feed stream is controlled by use of a glycol cooled heat exchanger before entering the reactor. The catalyst component solutions are metered using pumps and mass flow meters. The reactor is run liquid-full at approximately 550 psig pressure. Upon exiting the reactor, water and additive are injected in the polymer solution. The water hydrolyzes the catalysts, and terminates the polymerization reactions. The post reactor solution is then heated in preparation for a two-stage devolatization. The solvent and unreacted monomers are removed during the devolatization process. The polymer melt is pumped to a die for underwater pellet cutting.

For Example 19J

Continuous solution polymerizations are carried out in a computer controlled autoclave reactor equipped with an internal stirrer. Purified mixed alkanes solvent (Isopar™ E available from ExxonMobil, Inc.), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer.

Process details and results are contained in Table 8. Selected polymer properties are provided in Tables 9A-C.

In Table 9B, inventive examples 19F and 19G show low immediate set of around 65-70% strain after 500% elongation.

TABLE 8

Polymerization Conditions

| Ex. | $C_2H_4$ lb/hr | $C_8H_{16}$ lb/hr | Solv. lb/hr | $H_2$ sccm[1] | T °C. | Cat A1[2] Conc. ppm | Cat A1 Flow lb/hr | Cat B2[3] Conc. ppm | Cat B2 Flow lb/hr | DEZ Conc wt % | DEZ Flow lb/hr |
|---|---|---|---|---|---|---|---|---|---|---|---|
| 19A | 55.29 | 32.03 | 323.03 | 101 | 120 | 600 | 0.25 | 200 | 0.42 | 3.0 | 0.70 |
| 19B | 53.95 | 28.96 | 325.3 | 577 | 120 | 600 | 0.25 | 200 | 0.55 | 3.0 | 0.24 |
| 19C | 55.53 | 30.97 | 324.37 | 550 | 120 | 600 | 0.216 | 200 | 0.609 | 3.0 | 0.69 |
| 19D | 54.83 | 30.58 | 326.33 | 60 | 120 | 600 | 0.22 | 200 | 0.63 | 3.0 | 1.39 |
| 19E | 54.95 | 31.73 | 326.75 | 251 | 120 | 600 | 0.21 | 200 | 0.61 | 3.0 | 1.04 |
| 19F | 50.43 | 34.80 | 330.33 | 124 | 120 | 600 | 0.20 | 200 | 0.60 | 3.0 | 0.74 |
| 19G | 50.25 | 33.08 | 325.61 | 188 | 120 | 600 | 0.19 | 200 | 0.59 | 3.0 | 0.54 |
| 19H | 50.15 | 34.87 | 318.17 | 58 | 120 | 600 | 0.21 | 200 | 0.66 | 3.0 | 0.70 |
| 19I | 55.02 | 34.02 | 323.59 | 53 | 120 | 600 | 0.44 | 200 | 0.74 | 3.0 | 1.72 |
| 19J | 7.46 | 9.04 | 50.6 | 47 | 120 | 150 | 0.22 | 76.7 | 0.36 | 0.5 | 0.19 |

| Ex. | Cocat 1 Conc. ppm | Cocat 1 Flow lb/hr | Cocat 2 Conc. ppm | Cocat 2 Flow lb/hr | [Zn][4] in polymer ppm | Poly Rate[5] lb/hr | Conv[6] wt % | Polymer wt % | Eff.[7] |
|---|---|---|---|---|---|---|---|---|---|
| 19A | 4500 | 0.65 | 525 | 0.33 | 248 | 83.94 | 88.0 | 17.28 | 297 |
| 19B | 4500 | 0.63 | 525 | 0.11 | 90 | 80.72 | 88.1 | 17.2 | 295 |
| 19C | 4500 | 0.61 | 525 | 0.33 | 246 | 84.13 | 88.9 | 17.16 | 293 |
| 19D | 4500 | 0.66 | 525 | 0.66 | 491 | 82.56 | 88.1 | 17.07 | 280 |
| 19E | 4500 | 0.64 | 525 | 0.49 | 368 | 84.11 | 88.4 | 17.43 | 288 |
| 19F | 4500 | 0.52 | 525 | 0.35 | 257 | 85.31 | 87.5 | 17.09 | 319 |
| 19G | 4500 | 0.51 | 525 | 0.16 | 194 | 83.72 | 87.5 | 17.34 | 333 |
| 19H | 4500 | 0.52 | 525 | 0.70 | 259 | 83.21 | 88.0 | 17.46 | 312 |
| 19I | 4500 | 0.70 | 525 | 1.65 | 600 | 86.63 | 88.0 | 17.6 | 275 |
| 19J | — | — | — | — | — | — | — | — | — |

[1]standard $cm^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dimethyl
[4]ppm in final product calculated by mass balance
[5]polymer production rate
[6]weight percent ethylene conversion in reactor
[7]efficiency, kg polymer/g M where g M = g Hf + g Z

TABLE 9A

Polymer Physical Properties

| Ex. | Density (g/cc) | I2 | I10 | I10/I2 | Mw (g/mol) | Mn (g/mol) | Mw/Mn | Heat of Fusion (J/g) | Tm (° C.) | Tc (° C.) | TCRYSTAF (° C.) | Tm − TCRYSTAF (° C.) | CRYSTAF Peak Area (wt %) |
|---|---|---|---|---|---|---|---|---|---|---|---|---|---|
| 19A | 0.8781 | 0.9 | 6.4 | 6.9 | 123700 | 61000 | 2.0 | 56 | 119 | 97 | 46 | 73 | 40 |
| 19B | 0.8749 | 0.9 | 7.3 | 7.8 | 133000 | 44300 | 3.0 | 52 | 122 | 100 | 30 | 92 | 76 |
| 19C | 0.8753 | 5.6 | 38.5 | 6.9 | 81700 | 37300 | 2.2 | 46 | 122 | 100 | 30 | 92 | 8 |
| 19D | 0.8770 | 4.7 | 31.5 | 6.7 | 80700 | 39700 | 2.0 | 52 | 119 | 97 | 48 | 72 | 5 |
| 19E | 0.8750 | 4.9 | 33.5 | 6.8 | 81800 | 41700 | 2.0 | 49 | 121 | 97 | 36 | 84 | 12 |
| 19F | 0.8652 | 1.1 | 7.5 | 6.8 | 124900 | 60700 | 2.1 | 27 | 119 | 88 | 30 | 89 | 89 |

TABLE 9A-continued

Polymer Physical Properties

| Ex. | Density (g/cc) | I2 | I10 | I10/I2 | Mw (g/mol) | Mn (g/mol) | Mw/Mn | Heat of Fusion (J/g) | Tm (° C.) | Tc (° C.) | TCRYSTAF (° C.) | Tm − TCRYSTAF (° C.) | CRYSTAF Peak Area (wt %) |
|---|---|---|---|---|---|---|---|---|---|---|---|---|---|
| 19G | 0.8649 | 0.9 | 6.4 | 7.1 | 135000 | 64800 | 2.1 | 26 | 120 | 92 | 30 | 90 | 90 |
| 19H | 0.8654 | 1.0 | 7.0 | 7.1 | 131600 | 66900 | 2.0 | 26 | 118 | 88 | — | — | — |
| 19I | 0.8774 | 11.2 | 75.2 | 6.7 | 66400 | 33700 | 2.0 | 49 | 119 | 99 | 40 | 79 | 13 |
| 19J | 0.8995 | 5.6 | 39.4 | 7.0 | 75500 | 29900 | 2.5 | 101 | 122 | 106 | — | — | — |

TABLE 9B

Polymer Physical Properties of Compression Molded Film

| Example | Density (g/cm$^3$) | Melt Index (g/10 min) | Immediate Set after 100% Strain (%) | Immediate Set after 300% Strain (%) | Immediate Set after 500% Strain (%) | Recovery after 100% (%) | Recovery after 300% (%) | Recovery after 500% (%) |
|---|---|---|---|---|---|---|---|---|
| 19A | 0.878 | 0.9 | 15 | 63 | 131 | 85 | 79 | 74 |
| 19B | 0.877 | 0.88 | 14 | 49 | 97 | 86 | 84 | 81 |
| 19F | 0.865 | 1 | — | — | 70 | — | 87 | 86 |
| 19G | 0.865 | 0.9 | — | — | 66 | — | — | 87 |
| 19H | 0.865 | 0.92 | — | 39 | — | — | 87 | — |

TABLE 9C

Average Block Index For exemplary polymers[1]

| Example | Zn/C$_2$[2] | Average BI |
|---|---|---|
| Polymer F | 0 | 0 |
| Polymer 8 | 0.56 | 0.59 |
| Polymer 19a | 1.3 | 0.62 |
| Polymer 5 | 2.4 | 0.52 |
| Polymer 19b | 0.56 | 0.54 |
| Polymer 19h | 3.15 | 0.59 |

[1]Additional information regarding the calculation of the block indices for various polymers is disclosed in U.S. Patent Application Serial No. _____ (insert when known), entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.
[2]Zn/C$_2$ * 1000 = (Zn feed flow * Zn concentration/1000000/Mw of Zn)/(Total Ethylene feed flow * (1 − fractional ethylene conversion rate)/Mw of Ethylene) * 1000. Please note that "Zn" in "Zn/C$_2$ * 1000" refers to the amount of zinc in diethyl zinc ("DEZ") used in the polymerization process, and "C2" refers to the amount of ethylene used in the polymerization process.

Functionalized Ethylene/α-Olefin Interpolymers

The multi-block olefin interpolymers disclosed above may be modified by, for example, grafting, hydrogenation, nitrene insertion reactions, or other functionalization reactions such as those known to those skilled in the art. Preferred functionalizations are grafting reactions using a free radical mechanism.

A variety of radically graftable species may be attached to the polymer, either individually, or as relatively short grafts. These species include unsaturated molecules, each containing at least one heteroatom. These species include, but are not limited to, maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, and the respective esters, imides, salts, and Diels-Alder adducts of these compounds. These species also include silane compounds.

Radically graftable species of the silane class of materials may be attached to the polymer, either individually, or as relatively short grafts. These species include, but are not limited to, vinylalkoxysilanes, vinyltrimethoxysilane, vinyltriethoxysilane, vinyltriacetoxysilane, vinyltrichlorosilane, and the like. Generally, materials of this class include, but are not limited to, hydrolyzable groups, such as alkoxy, acyloxy, or halide groups, attached to silicon. Materials of this class also include non-hydrolyzable groups, such as alkyl and siloxy groups, attached to silicon.

Other radically graftable species may be attached to the polymer, individually, or as short-to-longer grafts. These species include, but are not limited to, methacrylic acid; acrylic acid; Diels-Alder adducts of acrylic acid; methacrylates including methyl, ethyl, butyl, isobutyl, ethylhexyl, lauryl, stearyl, hydroxyethyl, and dimethylaminoethyl; acrylates including methyl, ethyl, butyl, isobutyl, ethylhexyl, lauryl, stearyl, and hydroxyethyl; glycidyl methacrylate; trialkoxysilane methacrylates, such as 3-(methacryloxy)propyltrimethoxysilane and 3-(methacryloxy)propyl-triethoxysilane, methacryloxymethyltrimethoxysilane, methacryloxymethyltriethoxysilane; acrylonitrile; 2-isopropenyl-2-oxazoline; styrene; α-methylstyrene; vinyltoluene; dichlorostyrene; N-vinylpyrrolidinone, vinyl acetate, methacryloxypropyltrialkoxysilanes, methacryloxymethyltrialkoxysilanes and vinyl chloride.

Mixtures of radically graftable species that comprise at least one of the above species may be used, with styrene/maleic anhydride and styrene/acrylonitrile as illustrative examples.

A thermal grafting process is one method for reaction, however, other grafting processes may be used, such as photo initiation, including different forms of radiation, e-beam, or redox radical generation.

The functionalized interpolymers disclosed herein may also be modified by various chain extending or cross-linking processes, including, but not limited to peroxide-, silane-, sulfur-, radiation-, or azide-based cure systems. A full description of the various cross-linking technologies is described in U.S. Pat. Nos. 5,869,591 and 5,977,271, both of which are herein incorporated by reference in their entirety.

Suitable curing agents may include peroxides, phenols, azides, aldehyde-amine reaction products, substituted ureas, substituted guanidines; substituted xanthates; substituted dithiocarbamates; sulfur-containing compounds, such as thiazoles, imidazoles, sulfenamides, thiuramidisulfides, paraquinonedioxime, dibenzoparaquinonedioxime, sulfur; and combinations thereof. Elemental sulfur may be used as a crosslinking agent for diene containing polymers.

In some systems, for example, in silane grafted systems, crosslinking may be promoted with a crosslinking catalyst, and any catalyst that will provide this function can be used in this invention. These catalysts generally include acids and bases, especially organic bases, carboxylic acids and sulfonic acids, and organometallic compounds including organic titanates, organic zirconates, and complexes or carboxylates of lead, cobalt, iron, nickel, zinc and tin. Dibutyltin dilaurate, dioctyltin maleate, dibutyltin diacetate, dibutyltin dioctoate, stannous acetate, stannous octoate, lead naphthenate, zinc caprylate, cobalt naphthenate, and the like, are examples of suitable crosslinking catalysts.

Rather than employing a chemical crosslinking agent, crosslinking may be effected by use of radiation or by the use of electron beam. Useful radiation types include ultraviolet (UV) or visible radiation, beta ray, gamma rays, X-rays, or neutron rays. Radiation is believed to effect crosslinking by generating polymer radicals which may combine and crosslink.

Dual cure systems, which use a combination of heat, moisture cure, and radiation steps, may be effectively employed. Dual cure systems are disclosed in U.S. Pat. Nos. 5,911,940 and 6,124,370, which are incorporated herein by reference in their entirety. For example, it may be desirable to employ peroxide crosslinking agents in conjunction with silane crosslinking agents; peroxide crosslinking agents in conjunction with radiation; or sulfur-containing crosslinking agents in conjunction with silane crosslinking agents.

The functionalization may also occur at the terminal unsaturated group (e.g., vinyl group) or an internal unsaturation group, when such groups are present in the polymer. Such functionalization includes, but is not limited to, hydrogenation, halogenation (such as chlorination), ozonation, hydroxylation, sulfonation, carboxylation, epoxidation, and grafting reactions. Any functional groups, such as halogen, amine, amide, ester, carboxylic acid, ether, silane, siloxane, and so on, or functional unsaturated compounds, such as maleic anhydride, can be added across a terminal or internal unsaturation via known chemistry. Other functionalization methods include those disclosed in the following U.S. Pat. Nos. 5,849,828, entitled, "Metalation and Functionalization of Polymers and Copolymers;" 5,814,708, entitled, "Process for Oxidative Functionalization of Polymers Containing Alkylstyrene;" and 5,717,039, entitled, "Functionalization of Polymers Based on Koch Chemistry and Derivatives Thereof." Each of these patents is incorporated by reference, herein, in its entirety.

Free Radical Initiators Useful for Initiating Grafting Reactions

There are several types of compounds that can initiate grafting reactions by decomposing to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immergut, E. Grulke, eds. "Polymer Handbook," 4th ed., Wiley, New York, 1999, Section II, pp. 1-76.). It is preferable for the species that is formed by the decomposition of the initiator to be an oxygen-based free radical. It is more preferable for the initiator to be selected from carboxylic peroxyesters, peroxyketals, dialkyl peroxides, and diacyl peroxides. Some of the more preferable initiators, commonly used to modify the structure of polymers, are listed below. Also shown below, are the respective chemical structures and the theoretical radical yields. The theoretical radical yield is the theoretical number of free radicals that are generated per mole of initiator.

| Initiator Name | Initiator Structure | Theoretical Radical Yield |
|---|---|---|
| Benzoyl peroxide | Ph−C(=O)−O−O−C(=O)−Ph | 2 |
| Lauroyl peroxide | $CH_3(CH_2)_{10}$−C(=O)−O−O−C(=O)−$(CH_2)_{10}CH_3$ | 2 |
| Dicumyl peroxide | Ph−C($CH_3$)($CH_3$)−O−O−C($CH_3$)($CH_3$)−Ph | 2 |
| t-Butyl α-cumyl peroxide | Ph−C($CH_3$)($CH_3$)−O−O−C($CH_3$)($CH_3$)−$CH_3$ | 2 |
| Di-t-butyl peroxide | $H_3C$−C($CH_3$)($CH_3$)−O−O−C($CH_3$)($CH_3$)−$CH_3$ | 2 |

| Initiator Name | Initiator Structure | Theoretical Radical Yield |
|---|---|---|
| Di-t-amyl peroxide | H₃CH₂C−C(CH₃)(CH₃)−O−O−C(CH₃)(CH₃)−CH₂CH₃ | 2 |
| t-Butyl peroxybenzoate | Ph−C(=O)−O−O−C(CH₃)(CH₃)−CH₃ | 2 |
| t-Amyl peroxybenzoate | Ph−C(=O)−O−O−C(CH₃)(CH₃)−CH₂CH₃ | 2 |
| 1,1-Bis(t-butylperoxy)-3,3,5-trimethylcyclohexane | (trimethylcyclohexane with two O−O−C(CH₃)₃ groups on one ring carbon) | 4 |
| α,α'-Bis(t-butylperoxy)-1,3-diisopropylbenzene | (H₃C)₃C−O−O−C(CH₃)(CH₃)−[1,3-C₆H₄]−C(CH₃)(CH₃)−O−O−C(CH₃)₃ | 4 |
| α,α'-Bis(t-butylperoxy)-1,4-diisopropylbenzene | H₃C−C(CH₃)(CH₃)−O−O−C(CH₃)(CH₃)−[1,4-C₆H₄]−C(CH₃)(CH₃)−O−O−C(CH₃)(CH₃)−CH₃ | 4 |
| 2,5-Bis(t-butylperoxy)-2,5-dimethylhexane | H₃C−C(CH₃)(CH₃)−O−O−C(CH₃)(CH₃)−CH₂CH₂−C(CH₃)(CH₃)−O−O−C(CH₃)(CH₃)−CH₃ | 4 |
| 2,5-Bis(t-butylperoxy)-2,5-dimethyl-3-hexyne | H₃C−C(CH₃)(CH₃)−O−O−C(CH₃)(CH₃)−C≡C−C(CH₃)(CH₃)−O−O−C(CH₃)(CH₃)−CH₃ | 4 |

Maleic Anhydride Functionalized Olefin Interpolymers

The multi-block olefin interpolymers disclosed above may be modified by, for example, grafting with maleic anhydride. The grafted maleic anhydride olefin interpolymer may or may not contain small amounts of hydrolysis product and/or other derivatives. In one embodiment, the grafted maleic anhydride olefin interpolymers have a molecular weight distribution from about 1 to 7, preferably from 1.5 to 6, and more preferably from 2 to 5. All individual values and subranges from about 1 to 7 are included herein and disclosed herein.

In another embodiment, the grafted maleic anhydride olefin interpolymers have density from 0.855 g/cc to 0.955 g/cc, preferably from 0.86 g/cc to 0.90 g/cc, and more preferably from 0.865 g/cc to 0.895 g/cc. All individual values and subranges from 0.84 g/cc to 0.955 g/cc are included herein and disclosed herein.

In another embodiment, the amount of maleic anhydride used in the grafting reaction is less than, or equal to, 10 phr (parts per hundred, based on the weight of the olefin interpolymer), preferably less than 5 phr, and more preferably from 0.5 to 10 phr, and even more preferably from 0.5 to 5 phr. All individual values and subranges from 0.05 phr to 10 phr are included herein and disclosed herein.

In another embodiment, the amount of initiator used in the grafting reaction is less than, or equal to, 10 millimoles radicals per 100 grams olefin interpolymer, preferably, less than, or equal to, 6 millimoles radicals per 100 grams olefin interpolymer, and more preferably, less than, or equal to, 3 millimoles radicals per 100 grams olefin interpolymer. All individual values and subranges from 0.01 millimoles to 10 millimoles radicals per 100 grams olefin interpolymer are included herein and disclosed herein.

In another embodiment, the amount of maleic anhydride constituent grafted on the polyolefin chain is greater than 0.05 weight percent (based on the weight of the olefin interpolymer), as determined by titration analysis, FTIR analysis, or any other appropriate method. In a further embodiment, this amount is greater than 0.25 weight percent, and in yet a further embodiment, this amount is greater than 0.5 weight percent. In a preferred embodiment, 0.5 weight percent to 2.0 weight percent of maleic anhydride is grafted. All individual values and subranges greater than 0.05 weight percent are considered within the scope of this invention, and are disclosed herein.

The maleic anhydride, as well as many other unsaturated heteroatom containing species, may be grafted to the polymer by any conventional method, typically in the presence of a free radical initiator, for example the peroxide and azo classes of compounds, etc., or by ionizing radiation. Organic initiators are preferred, such as any one of the peroxide initiators, such as, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)hexane, 2,5-dimethyl-2,5-di(tert-butyl peroxy)-3-hexyne, lauryl peroxide, and tert-butyl peracetate. A suitable azo compound is 2,2'-azobis(isobutyronitrile). The organic initiators have varying reactivities at different temperatures, and may generate different types of free radicals for grafting. One skilled in the art may select the appropriate organic initiator as needed for the grafting conditions.

The amount and type of initiator, the amount of maleic anhydride, as well as reaction conditions, including temperature, time, shear, environment, additives, diluents, and the like, employed in the grafting process, may impact the final structure of the maleated polymer. For example, the degree of maleic anhydride/succinic anhydride, their oligomers, and their derivatives, including hydrolysis products, grafted onto the grafted polymer may be influenced by the aforementioned considerations. Additionally, the degree and type of branching, and the amount of crosslinking, may also be influenced by the reaction conditions and concentrations. In general, it is preferred that crosslinking during the maleation process be minimized. The composition of the base olefin interpolymer may also play a role in the final structure of the maleated polymer. The resulting structure, will in turn, affect the properties and use of the final product. Typically, the amount of initiator and maleic anhydride employed will not exceed that, which is determined to provide the desired level of maleation and desired melt flow, each required for the functionalized polymer and its subsequent use.

The grafting reaction should be performed under conditions that maximize grafts onto the polymer backbone, and minimize side reactions, such as the homopolymerization of the grafting agent, which is not grafted to the olefin interpolymer. It is not unusual that some fraction of the maleic anhydride (and/or its derivatives) does not graft onto the olefin interpolymer, and it is generally desired that the unreacted grafting agent be minimized. The grafting reaction may be performed in the melt, in solution, in the solid-state, in a swollen-state, and the like. The maleation may be performed in a wide-variety of equipments, such as, but not limited to, twin screw extruders, single screw extruders, Brabenders, batch reactors, and the like.

Additional embodiments of the invention provide for olefin interpolymers grafted with other carbonyl-containing compounds. In one embodiment, these grafted olefin interpolymers may have molecular weight distributions and/or densities the same as, or similar to, those described above for the grafted maleic anhydride olefin interpolymers. In another embodiment, these grafted olefin interpolymers are prepared using the same or similar amounts of grafting compound and initiator as those used for the grafted maleic anhydride olefin interpolymers, as described above. In another embodiment, these grafted olefin interpolymers contain the same or similar levels of grafted compound as for the grafted maleic anhydride, as described above.

Additional carbonyl-containing compounds include, but are not limited to, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, esters thereof, imides thereof, salts thereof, and Diels-Alder adducts thereof.

Silane Functionalized Olefin Interpolymers

The multi-block olefin interpolymers disclosed above may be modified by, for example, grafting with at least one silane compound. The grafted silane olefin interpolymer may or may not contain small amounts of hydrolysis product and/or other derivatives.

In one embodiment, the silane-grafted olefin interpolymers have a molecular weight distribution from about 1 to 7, preferably from 1.5 to 6, and more preferably from 2 to 5. All individual values and subranges from about 1 to 7 are included herein and disclosed herein.

In another embodiment, the silane-grafted olefin interpolymers have density from 0.855 g/cc to 0.955 g/cc, and preferably from 0.86 g/cc to 0.90 g/cc, and more preferably from 0.865 g/cc to 0.895 g/cc. All individual values and subranges from 0.84 g/cc to 0.955 g/cc are included herein and disclosed herein.

In another embodiment, the amount of silane used in the grafting reaction is greater than, or equal to, 0.05 phr (based on the amount of the olefin interpolymer), more preferably, from 0.5 phr to 6 phr, and even more preferably, from 0.5 phr to 4 phr. All individual values and subranges from 0.05 phr to 6 phr are included herein and disclosed herein.

In another embodiment, the amount of amount of initiator used in the grafting reaction is less than, or equal to, 4 millimoles radicals per 100 grams olefin interpolymer, preferably, less than, or equal to, 2 millimoles radicals per 100 grams olefin interpolymer, and more preferably, less than, or equal to, 1 millimoles radicals per 100 grams olefin interpolymer. All individual values and subranges from 0.01 millimoles to 4 millimoles radicals per 100 grams olefin interpolymer are included herein and disclosed herein.

In another embodiment, the amount of silane constituent grafted on the polyolefin chain is greater than, or equal to, 0.05 weight percent (based on the weight of the olefin interpolymer), as determined by FTIR analysis, or other appropriate method. In a further embodiment, this amount is greater than, or equal to, 0.5 weight percent, and in yet a further embodiment, this amount is greater than, or equal to, 1.2 weight percent. In a preferred embodiment, the amount silane constituent grafted on the olefin interpolymer is from 0.5 weight percent to 4.0 weight percent. All individual values and subranges greater than 0.05 weight percent are considered within the scope of this invention, and are disclosed herein.

Suitable silanes include, but are not limited to, those of the general formula (I):

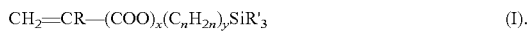

$$CH_2=CR-(COO)_x(C_nH_{2n})_y SiR'_3 \qquad (I).$$

In this formula, R is a hydrogen atom or methyl group; x and y are 0 or 1, with the proviso that when x is 1, y is 1; n is an integer from 1 to 12 inclusive, preferably 1 to 4, and each R' independently is an organic group, including, but not limited to, an alkoxy group having from 1 to 12 carbon atoms (e.g. methoxy, ethoxy, butoxy), an aryloxy group (e.g. phenoxy), an araloxy group (e.g. benzyloxy), an aliphatic or aromatic siloxy group, an aromatic acyloxyl group, an aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms.

In one embodiment, the silane compound is selected from vinyltrialkoxysilanes, vinyltriacyloxysilanes or vinyltrichlorosilane. In addition, any silane, or mixtures of silanes, which will effectively graft to, and/or crosslink, the olefin interpolymers can be used in the practice of this invention. Suitable silanes include unsaturated silanes that comprise both an ethylenically unsaturated hydrocarbyl group, such as a vinyl, allyl, isopropenyl, butenyl, cyclohexenyl or γ-(meth)acryloxy allyl group, and a hydrolyzable group, such as, a hydrocarbyloxy, hydrocarbonyloxy, or hydrocarbylamino group, or a halide. Examples of hydrolyzable groups include methoxy, ethoxy, formyloxy, acetoxy, proprionyloxy, chloro, and alkyl or arylamino groups. Preferred silanes are the unsaturated alkoxy silanes which can be grafted onto the polymer. These silanes and their method of preparation are more fully described in U.S. Pat. No. 5,266,627 to Meverden, et al., which is incorporated herein, in its entirety, by reference. Preferred silanes include vinyltrimethoxysilane, vinyltriethoxysilane, 3-(trimethoxysilyl)propyl methacrylate (γ-(meth)acryloxypropyl trimethoxysilane), and mixtures thereof.

The silane can be grafted to the polymer by any conventional method, typically in the presence of a free radical initiator, for example peroxides and azo compounds, etc., or by ionizing radiation. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy) hexane, lauryl peroxide, and tert-butyl peracetate. A suitable azo compound is 2,2'-azobis(isobutyronitrile).

The amount of initiator and silane employed will affect the final structure of the silane grafted polymer, such as, for example, the degree of grafting in the grafted polymer and the degree of crosslinking in the cured polymer. The resulting structure, will in turn, affect the physical and mechanical properties of the final product. Typically, the amount of initiator and silane employed will not exceed that which is determined to provide the desired level of crosslinking, and the resulting properties in the polymer.

The grafting reaction should be performed under conditions that maximize grafts onto the polymer backbone, and minimize side reactions, such as the homopolymerization of grafting agent, which is not grafted to the polymer. Some silane agents undergo minimal or no homopolymerization, due to steric features in the molecular structure, low reactivity and/or other reasons.

Cure (crosslinking) of a silanated graft is promoted with a crosslinking catalyst, and any catalyst that will effectively promote the crosslinking of the particular grafted silane can be used. These catalysts generally include acids and bases, and organometallic compounds, including organic titanates, organic zirconates, and complexes or carboxylates of lead, cobalt, iron, nickel, zinc and tin.

Dibutyltin dilaurate, dioctyltin maleate, dibutyltin diacetate, dibutyltin dioctoate, stannous acetate, stannous octoate, lead naphthenate, zinc caprylate, cobalt naphthenate, and the like, can be used. The amount of catalyst will depend on the particular system at issue.

In certain embodiments of the claimed invention, dual crosslinking systems, which use a combination of radiation, heat, moisture and crosslinking steps, may be effectively employed. For instance, it may be desirable to employ peroxide crosslinking agents in conjunction with silane crosslinking agents, peroxide crosslinking agents in conjunction with radiation, or sulfur-containing crosslinking agents in conjunction with silane crosslinking agents. Dual crosslinking systems are disclosed, and claimed in, U.S. Pat. Nos. 5,911,940 and 6,124,370, the entire contents of both are herein incorporated by reference.

The silane grafted interpolymers of the present invention are often useful in adhesive compositions. In this regard the functionalized interpolymers may be characterized by, for example, a Peel Adhesion Failure Temperature (PAFT) of greater than, or equal to, 110° F. (43° C.), or a Shear Adhesion Failure Temperature (SAFT) of greater than, or equal to, 140° F. (60° C.); or both wherein PAFT and SAFT are measured as follows:

Shear Adhesion Failure Temperature (SAFT)

Shear adhesion failure temperature (SAFT) of each sample was measured according to ASTM D 4498 with a 500 gram weight in the shear mode. The tests were started at room temperature (25° C./77° F.) and the oven temperature was ramped at an average rate of 0.5° C./minute. The temperature at which the specimen failed was recorded. This measurement was used as an indication of the heat resistance of the composition which is important for shipping.

Peel Adhesion Failure Temperature (PAFT)

Peel adhesion failure temperature (PAFT) was tested according to ASTM D 4498 with a 100 gram weight in the peel mode. The tests were started at room temperature (25° C./77° F.) and the temperature was increased at an average rate of 0.5° C./minute.

In addition, if the silane-grafted interpolymer is to be employed in, for example, an adhesive composition, it is often preferable that the silane-grafted ethylene/α-olefin polymer have a molecular weight distribution (Mw/Mn) from about 1 to about 3.5 and/or a number average molecular weight from 5,000 to 25,000.

Azide Modification

The multi-block olefin interpolymers disclosed above may be modified by, for example, azide modification. Compounds having at least two sulfonyl azide groups capable of C—H insertion under reaction conditions are referred to herein as coupling agents. For the purpose of the invention, the poly (sulfonyl azide) is any compound having at least two sulfonyl azide groups reactive with a polyolefin under reaction conditions. Preferably the poly(sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polyolefin and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 30, most preferably less than about 20 carbon, oxygen or silicon atoms. Within these limits, larger is better for reasons including thermal and shock stability. When R is straight-chain alkyl hydrocarbon, there are preferably less than 4 carbon atoms between the sulfonyl azide groups to reduce the propensity of the nitrene to bend back and react with itself. Silicon containing groups include silanes and siloxanes, preferably siloxanes. The term inertly substituted refers to substitution with atoms or groups which do not undesirably interfere with the desired reaction(s) or desired properties of the resulting coupled polymers. Such groups include fluorine, aliphatic or aromatic ether, siloxane as well as sulfonyl azide groups when more than two polyolefin chains are to be joined. Suitable structures include R as aryl, alkyl, aryl alkaryl, arylalkyl silane, siloxane or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis(sulfonyl azides). Poly(sulfonyl)azides include such compounds as 1,5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido)biphenyl, 4,4'-diphenyl ether bis(sulfonyl azide) and bis(4-sulfonyl azidophenyl)methane, and mixtures thereof.

Sulfonyl azides are conveniently prepared by the reaction of sodium azide with the corresponding sulfonyl chloride, although oxidation of sulfonyl hydrazines with various reagents (nitrous acid, dinitrogen tetraoxide, nitrosonium tetrafluoroborate) has been used.

Polyfunctional compounds capable of insertions into C—H bonds also include carbene-forming compounds such as salts of alkyl and aryl hydrazones and diazo compounds, and nitrene-forming compounds such as alkyl and aryl azides (R—N3), acyl azides (R—C(O)N3), azidoformates (R—O—C(O)—N3), sulfonyl azides (R—SO2-N3), phosphoryl azides ((RO)2—(PO)—N3), phosphinic azides (R2—P(O)—N3) and silyl azides (R3—Si—N3) Some of the coupling agents of the invention are preferred because of their propensity to form a greater abundance of carbon-hydrogen insertion products. Such compounds as the salts of hydrazones, diazo compounds, azidoformates, sulfonyl azides, phosphoryl azides, and silyl azides are preferred because they form stable single-state electron products (carbenes and nitrenes) which carry out efficient carbon-hydrogen insertion reactions, rather than substantially 1) rearranging via such mechanisms as the Curtius-type rearrangement, as is the case with acyl azides and phosphinic azides, or 2) rapidly converting to the triplet-state electron configuration which preferentially undergoes hydrogen atom abstraction reactions, which is the case with alkyl and aryl azides. Also, selection from among the preferred coupling agents is conveniently possible because of the differences in the temperatures at which the different classes of coupling agents are converted to the active carbene or nitrene products. For example, those skilled in the art will recognize that carbenes are formed from diazo compounds efficiently at temperatures less than 100° C., while salts of hydrazones, azidoformates and the sulfonyl azide compounds react at a convenient rate at temperatures above 100° C., up to temperatures of about 200° C. (By convenient rates it is meant that the compounds react at a rate that is fast enough to make commercial processing possible, while reacting slowly enough to allow adequate mixing and compounding to result in a final product with the coupling agent adequately dispersed and located substantially in the desired position in the final product. Such location and dispersion may be different from product to product depending on the desired properties of the final product.) Phosphoryl azides may be reacted at temperatures in excess of 180° C. up to about 300° C., while silyl azides react preferentially at temperatures of from about 250° C. to 400° C.

To modify rheology, also referred to herein as "to couple," the poly(sulfonyl azide) is used in a rheology modifying amount, that is an amount effective to increase the low-shear viscosity (at 0.1 rad/sec) of the polymer preferably at least about 5 percent as compared with the starting material polymer, but less than a crosslinking amount, that is an amount sufficient to result in at least about 10 weight percent gel as measured by ASTM D2765-procedure A. While those skilled in the art will recognize that the amount of azide sufficient to increase the low shear viscosity and result in less than about 10 weight percent gel will depend on molecular weight of the azide used and polymer the amount is preferably less than about 5 percent, more preferably less than about 2 percent, most preferably less than about 1 weight percent poly(sulfonyl azide) based on total weight of polymer when the poly (sulfonyl azide) has a molecular weight of from about 200 to about 2000. To achieve measurable rheology modification, the amount of poly(sulfonyl azide) is preferably at least about 0.01 weight percent, more preferably at least about 0.05 weight percent, most preferably at least about 0.10 weight percent based on total polymer. If crosslinking is desired than the azide will typically be used in a crosslinking amount.

For rheology modification and/or crosslinking, the sulfonyl azide is admixed with the polymer and heated to at least the decomposition temperature of the sulfonyl azide. By decomposition temperature of the azide it is meant that temperature at which the azide converts to the sulfonyl nitrene, eliminating nitrogen and heat in the process, as determined by differential scanning calorimetry (DSC). The poly(sulfonyl azide) begins to react at a kinetically significant rate (convenient for use in the practice of the invention) at temperatures of about 130° C. and is almost completely reacted at about 160° C. in a DSC (scanning at 10° C./min). Accelerated Rate Calorimetry (ARC) (scanning at 2° C./hr) shows onset of decomposition is about 100° C. Extent of reaction is a function of time and temperature. At the low levels of azide used in the practice of the invention, the optimal properties are not reached until the azide is essentially fully reacted. Temperatures for use in the practice of the invention are also determined by the softening or melt temperatures of the polymer starting materials. For these reasons, the temperature is advantageously greater than about 90° C., preferably greater than about 120° C., more preferably greater than about 150° C., most preferably greater than 180° C.

Preferred times at the desired decomposition temperatures are times that are sufficient to result in reaction of the coupling agent with the polymer(s) without undesirable thermal degradation of the polymer matrix. Preferred reaction times in terms of the half life of the coupling agent, that is the time required for about half of the agent to be reacted at a preselected temperature, which half life is determinable by DSC is about 5 half lives of the coupling agent. In the case of a bis(sulfonyl azide), for instance, the reaction time is preferably at least about 4 minutes at 200° C.

Admixing of the polymer and coupling agent is conveniently accomplished by any means within the skill in the art. Desired distribution is different in many cases, depending on what rheological properties are to be modified. In a homopolymer it is desirable to have as homogeneous a distribution as possible, preferably achieving solubility of the azide in the polymer melt. In a blend it is desirable to have low solubility in one or more of the polymer matrices such that the azide is preferentially in one or the other phase, or predominantly in the interfacial region between the two phases.

Preferred processes include at least one of (a) dry blending the coupling agent with the polymer, preferably to form a substantially uniform admixture and adding this mixture to melt processing equipment, e.g. a melt extruder to achieve the coupling reaction, at a temperature at least the decomposition temperature of the coupling agent; (b) introducing, e.g. by injection, a coupling agent in liquid form, e.g. dissolved in a solvent therefor or in a slurry of coupling agent in a liquid, into a device containing polymer, preferably softened, molten or melted polymer, but alternatively in particulate form, in solution or dispersion, more preferably in melt processing equipment; (c) forming a first admixture of a first amount of a first polymer and a coupling agent, advantageously at a temperature less than about the decomposition temperature of the coupling agent, preferably by melt blending, and then forming a second admixture of the first admixture with a second amount of a second polymer (for example a concentrate of a coupling agent admixed with at least one polymer and optionally other additives, is conveniently admixed into a second polymer or combination thereof optionally with other additives, to modify the second polymer(s)); (d) feeding at least one coupling agent, preferably in solid form, more preferably finely comminuted, e.g. powder, directly into softened or molten polymer, e.g. in melt processing equipment, e.g. in an extruder; or combinations thereof. Among processes (a) through (d), processes (b) and (c) are preferred, with (c) most preferred. For example, process (c) is conveniently used to make a concentrate with a first polymer composition having a lower melting temperature, advantageously at a temperature below the decomposition temperature of the coupling agent, and the concentrate is melt blended into a second polymer composition having a higher melting temperature to complete the coupling reaction. Concentrates are especially preferred when temperatures are sufficiently high to result in loss of coupling agent by evaporation or decomposition not leading to reaction with the polymer, or other conditions would result that effect. Alternatively, some coupling occurs during the blending of the first polymer and coupling agent, but some of the coupling agent remains unreacted until the concentrate is blended into the second polymer composition. Each polymer or polymer composition includes at least one homopolymer, copolymer, terpolymer, or interpolymer and optionally includes additives within the skill in the art. When the coupling agent is added in a dry form it is preferred to mix the agent and polymer in a softened or molten state below the decomposition temperature of the coupling agent then to heat the resulting admixture to a temperature at least equal to the decomposition temperature of the coupling agent.

The term "melt processing" is used to mean any process in which the polymer is softened or melted, such as extrusion, pelletizing, molding, thermoforming, film blowing, compounding in polymer melt form, fiber spinning, and the like.

The polyolefin(s) and coupling agent are suitably combined in any manner which results in desired reaction thereof, preferably by mixing the coupling agent with the polymer(s) under conditions which allow sufficient mixing before reaction to avoid uneven amounts of localized reaction then subjecting the resulting admixture to heat sufficient for reaction. Preferably, a substantially uniform admixture of coupling agent and polymer is formed before exposure to conditions in which chain coupling takes place. A substantially uniform admixture is one in which the distribution of coupling agent in the polymer is sufficiently homogeneous to be evidenced by a polymer having a melt viscosity after treatment according to the practice of the invention at least one of (a) higher at low angular frequency (e.g. 0.1 rad/sec) or (b) lower at higher angular frequency (e.g. 100 rad/sec) than that of the same polymer which has not been treated with the coupling agent but has been subjected to the same shear and thermal history. Thus, preferably, in the practice of the invention, decomposition of the coupling agent occurs after mixing sufficient to result in a substantially uniform admixture of coupling agent and polymer. This mixing is preferably attained with the polymer in a molten or melted state, that is above the crystalline melt temperature, or in a dissolved or finely dispersed condition rather than in a solid mass or particulate form. The molten or melted form is more preferred to insure homogeneity rather than localized concentrations at the surface.

Any equipment is suitably used, preferably equipment which provides sufficient mixing and temperature control in the same equipment, but advantageously practice of the invention takes place in such devices as an extruder or a static polymer mixing devise such as a Brabender blender. The term extruder is used for its broadest meaning to include such devices as a device which extrudes pellets or pelletizer. Conveniently, when there is a melt extrusion step between production of the polymer and its use, at least one step of the process of the invention takes place in the melt extrusion step. While it is within the scope of the invention that the reaction take place in a solvent or other medium, it is preferred that the reaction be in a bulk phase to avoid later steps for removal of the solvent or other medium. For this purpose, a polymer above the crystalline melt temperature is advantageous for even mixing and for reaching a reaction temperature (the decomposition temperature of the sulfonyl azide).

In a preferred embodiment the process of the present invention takes place in a single vessel, that is mixing of the coupling agent and polymer takes place in the same vessel as heating to the decomposition temperature of the coupling agent. The vessel is preferably a twin-screw extruder, but is also advantageously a single-screw extruder, a batch mixer, or a static mixing zone for mixing polymer at the back end of a production process. The reaction vessel more preferably has at least two zones of different temperatures into which a reaction mixture would pass, the first zone advantageously being at a temperature at least the crystalline melt temperature or the softening temperature of the polymer(s) and preferably less than the decomposition temperature of the coupling agents and the second zone being at a temperature sufficient for decomposition of the coupling agent. The first zone is preferably at a temperature sufficiently high to soften the polymer and allow it to combine with the coupling agent through distributive mixing to a substantially uniform admixture.

For polymers that have softening points above the coupling agent decomposition temperature (preferably greater than 200° C.), and especially when incorporation of a lower melting polymer (such as in a concentrate) is undesirable, the preferred embodiment for incorporation of coupling agent is to solution blend the coupling agent in solution or admixture into the polymer, to allow the polymer to imbibe (absorb or adsorb at least some of the coupling agent), and then to evaporate the solvent. After evaporation, the resulting mixture is extruded. The solvent is preferably a solvent for the coupling agent, and more preferably also for the polymer when the polymer is soluble such as in the case of polycarbonate. Such solvents include polar solvents such as acetone, THF (tetrahydrofuran) and chlorinated hydrocarbons such as methylene chloride. Alternatively other non-polar compounds such as mineral oils in which the coupling agent is sufficiently miscible to disperse the coupling agent in a polymer, are used.

To avoid the extra step and resultant cost of re-extrusion and to insure that the coupling agent is well blended into the polymer, in alternative preferred embodiments it is preferred that the coupling agent be added to the post-reactor area of a polymer processing plant. For example, in a slurry process of producing polyethylene, the coupling agent is added in either powder or liquid form to the powdered polyethylene after the solvent is removed by decantation and prior to the drying and densification extrusion process. In an alternative embodiment, when polymers are prepared, in a gas phase process, the coupling agent is preferably added in either powder or liquid form to the powdered polyethylene before the densification extrusion. In an alternative embodiment when a polymer is made in a solution process, the coupling agent is preferably added to the polymer melt stream after devolatilization and before the pelletizing extrusion process.

Practice of the process of the invention to rheology modify polymers yields rheology modified or chain coupled polymers, that is the polymers which have sulfonamide, amine, alkyl-substituted or aryl-substituted carboxamide, alkyl-substituted or aryl-substituted phosphoramide, alkyl-substituted or aryl-substituted methylene coupling between different polymer chains. Resulting compounds Advantageously show higher low shear viscosity than the original polymer due to coupling of long polymer chains to polymer backbones. Broad molecular weight monomodal distribution polymers (MWD of 3.0 and greater) and gel levels less than 10 percent as determined by xylene extraction show less improvement than the dramatic effect noted in narrow MWD polymer (e.g. MWD=about 2.0) with gel less than 10 percent as determined by xylene extraction. Alternatively, those skilled in the art will recognize that it is possible to prepare polymers with broader polydispersity (e.g. MWD greater than about 2.0) by blending polymers of low polydispersity, either by post-reactor compounding, or by preparing the polymers in a multi-reactor configuration wherein the conditions of each reactor are controlled to provide a polymer with the desired molecular weight and MWD for each specific component resin of the final product.

Rheology modification leads to polymers which have controlled rheological properties, specifically improved melt strength as evidenced by increased low shear viscosity, better ability to hold oil, improved scratch and mar resistance, improved tackiness, improved green strength (melt), higher orientation in high shear and high extensional processes such as injection molding, film extrusion (blown and cast), calendaring, rotomolding, fiber production, profile extrusion, foams, and wire and cable insulation as measured by tan delta as described hereinafter, elasticity by viscosity at 0.1 rad/sec and 100 rad/sec, respectively. It is also believed that this process can be used to produce dispersions having improved properties of higher low shear viscosity than the unmodified polymer as measured by Dynamic Mechanical Spectroscopy (DMS).

Rheology modified polymers are useful as large blow molded articles due to the higher low shear viscosity than unmodified polymer and the maintenance of the high shear viscosity for processability as indicated by high shear viscosity, foams for stable cell structure as measured by low shear viscosity, blown film for better bubble stability as measured by low shear viscosity, fibers for better spinnability as measured by high shear viscosity, cable and wire insulation for green strength to avoid sagging or deformation of the polymer on the wire as measured by low shear viscosity which are aspects of the invention.

Polymers rheology modified according to the practice of the invention are superior to the corresponding unmodified polymer starting materials for these applications due to the elevation of viscosity, of preferably at least about 5 percent at low shear rates (0.1 rad/sec), sufficiently high melt strengths to avoid deformation during thermal processing (e.g. to avoid sag during thermoforming or profile extrusion) or to achieve bubble strength during blow molding, and sufficiently low high shear rate viscosities to facilitate molding and extrusion. Compositions comprising rheology modified multi-block copolymer preferably have a viscosity ratio (ratio of shear viscosity at 0.1 rad/sec to shear viscosity at 100 rad/sec measured at 190° C.) of greater than 5, preferably greater than 10 and more preferably greater than 20, and most preferably greater than 30. These rheological attributes enable faster filling of injection molds at high rates than the unmodified starting materials, the setup of foams (stable cell structure) as indicated by formation of lower density closed cell foam, preferably with higher tensile strength, insulation properties, and/or compression set than attained in the use of coupling or rheology modification using coupling agents which generate free radicals, because of high melt viscosity. Advantageously toughness and tensile strength of the starting material is maintained. Additionally, compression set (particularly high temperature such as about 70° C. or higher) property is improved.

Polymers resulting from the practice of the invention are different from those resulting from practice of prior art processes as shown in CA 797,917. The polymers of the present invention show improved melt elasticity, that is higher tan delta as measured by DMS, better drawability, that is higher melt strength as measured by melt tension, less swelling as measured by blow molding die swell, and less shrinkage as measured by mold shrinkage than the unmodified polymer and the broad MWD (greater than about 3.0 Mw/Mn) counterpart in thermoforming and large part blow molding.

Compositions and Blends Containing the Functionalized Olefin Interpolymers

The functionalized olefin interpolymers of the invention may be blended with one or more other polymers to improve the performance, processibility and/or cost of the resultant blend.

Suitable polymers for blending with the functionalized olefin interpolymers of the invention, include non-functionalized multi-block copolymers, other functionalized multi-block copolymers, thermoplastic and non-thermoplastic polymers, including natural and synthetic polymers. Exemplary polymers for blending include polypropylene, (both impact modifying polypropylene, isotactic polypropylene, atactic polypropylene, and random ethylene/propylene copolymers), various types of polyethylene (PE), including high pressure, free-radical Low Density Polyethylene (LDPE), Ziegler Natta Linear Low Density Polyethylene (LLDPE), metallocene PE, including multiple reactor PE ("in reactor" blends of Ziegler-Natta PE and metallocene PE, such as products disclosed in U.S. Pat. Nos. 6,545,088, 6,538,070, 6,566,446, 5,844,045, 5,869,575, and 6,448,341, ethylene-vinyl acetate (EVA), ethylene/vinyl alcohol copolymers, polystyrene, impact modified polystyrene, acrylonitrile-butadiene-styrene (ABS), styrene/butadiene block copolymers and hydrogenated derivatives thereof (SBS and SEBS), and thermoplastic polyurethanes. Homogeneous polymers such as olefin plastomers and elastomers, ethylene and propylene-based copolymers (for example polymers available under the trade designation VERSIFY™, available from The Dow Chemical Company, and VISTAMAXX™, available from ExxonMobil, can also be useful as components in blends comprising the functionalized interpolymers.

Additional polymers for blending include, but are not limited to, polyamides, polyesters, polycarbonate, other engineering thermoplastics, polyvinyl alcohol, polyvinylidene chloride, polyvinyl chloride, and natural products, such as cellulose and wool fibers. Suitable polyamides include, but are not limited to, aliphatic polyamides, such as polycaprolactam (nylon 6), poly(hexamethylene adipamide) (nylon 6,6), poly(hexamethylene sebacamide); and aromatic polyamides (or polyaramides). Suitable polyesters include, but are not limited to, poly(ethylene terephthalate) (PET) and poly(butylene terephthalate) (PBT). Thermoset systems such as epoxies, unsaturated polyesters, and the like, may have the functionalized multi-block polymers blended into them prior to curing or during the curing of the thermoset system.

In one embodiment, the invention provides thermoplastic compositions, comprising a thermoplastic matrix polymer, especially a polyamide, polyester or a polyolefin, such as polypropylene, and a dispersed phase, containing a core-shell or core-multiple shell morphology. The shell comprising a functionalized multi-block interpolymer according to the invention, and the core comprising the multi-block unfunctionalized interpolymer and/or other types of polyolefins.

The base multi-block unfunctionalized interpolymer may also form inner core-shell type particles having hard crystalline or semi-crystalline blocks in the form of a "core," surrounded by soft or elastomeric blocks, forming a "shell" around the occluded domains of hard polymer. These particles may be formed and dispersed within the matrix polymer by the forces incurred during melt compounding or blending.

This desired core-shell or core-multiple shell morphologies may result from, or be enhanced by, chemical interactions between the functionalized moiety of the base interpolymer and the matrix resin. These chemical interactions may result in covalent bonds or noncovalent associations. For example, maleic anhydride grafts can form amide linkages with terminal amines of a polyamide, or form ester linkages with terminal hydroxyls of a polyester. The chemical interactions may also arise from enhanced associations between the functional groups of the functionalized olefin interpolymers and chemical moieties in the matrix polymer. Such associations include, but are not limited to, dipole-dipole interactions, hydrogen bonding, hydrophilic interactions and hydrophobic interactions.

Additional blends include thermoplastic polyolefin blends, thermoplastic elastomer blends, thermoplastic vulcanisites and styrenic polymer blends. Thermoplastic polyolefin blends and thermoplastic vulcanisites may be prepared by combining the functionalized multi-block polymers, including unsaturated derivatives thereof, with an optional rubber, including conventional block copolymers, especially an SBS block copolymer, and optionally, a crosslinking or vulcanizing agent (including peroxides and/or other coagents). The thermoplastic polyolefin blends are generally prepared by blending the functionalized multi-block copolymers with a polyolefin, and optionally a crosslinking or vulcanizing agent. The foregoing blends may be used in forming a molded object, and optionally crosslinking the resulting molded article. A similar procedure, using different components, has been previously disclosed in U.S. Pat. No. 6,797,779, incorporated herein by reference. Suitable conventional block copolymers desirably possess a Mooney viscosity ($ML_{1+4}$@100° C.) in the range from 10 to 135, more preferably from 25 to 100, and most preferably from 30 to 80. Suitable polyolefins include linear or low density polyethylene, polypropylene (including atactic, isotactic, syndiotactic and impact modified versions thereof) and poly(4-methyl-1-pentene). Suitable styrenic polymers include polystyrene, rubber modified polystyrene (HIPS), styrene/acrylonitrile copolymers (SAN), rubber modified SAN (ABS or AES) and styrene maleic anhydride copolymers.

Blends, as described herein, may be prepared by mixing or kneading the respective components at a temperature around, or above, the melt point temperature of one or both of the components. For some functionalized multi-block copolymers, this temperature may be above 90° C., most generally above 100° C., and most preferably above 110° C. Typical polymer mixing or kneading equipment, capable of reaching the desired temperatures and capable of melt plastifying the mixture, may be employed. These include mills, kneaders, extruders (both single screw and twin-screw), Banbury mixers, calenders, and the like. The sequence of mixing, and method, may depend on the final composition. A combination of Banbury batch mixers and continuous mixers may also be employed, such as a Banbury mixer, followed by a mill mixer, followed by an extruder.

The blend compositions may contain processing oils, plasticizers, and processing aids. Rubber processing oils have a certain ASTM designation, and paraffinic, napthenic or aromatic process oils are all suitable for use. Generally from 0 to 150 parts, more preferably 0 to 100 parts, and most preferably from 0 to 50 parts of oil per 100 parts of total polymer are employed. Higher amounts of oil may tend to improve the processing of the resulting product at the expense of some physical properties. Additional processing aids include conventional waxes, fatty acid salts, such as calcium stearate or zinc stearate, (poly)alcohols including glycols, (poly)alcohol ethers, including glycol ethers, (poly)esters, including (poly)glycol esters, and metal salt-, especially Group 1 or 2 metal or zinc-, salt derivatives thereof.

Compositions, including thermoplastic blends according to the invention may also contain anti-ozonants or anti-oxidants that are known to a rubber chemist of ordinary skill. The anti-ozonants may be physical protectants, such as waxy materials that come to the surface and protect the part from oxygen or ozone, or they may be chemical protectors that react with oxygen or ozone. Suitable chemical protectors include styrenated phenols, butylated octylated phenol, butylated di(dimethylbenzyl)phenol, p-phenylenediamines, butylated reaction products of p-cresol and dicyclopentadiene (DCPD), polyphenolic antioxidants, hydroquinone derivatives, quinoline, diphenylene antioxidants, thioester antioxidants, and blends thereof. Some representative trade names of such products are Wingstay™ S antioxidant, Polystay™ 100 antioxidant, Polystay™ 100 AZ antioxidant, Polystay™ 200 antioxidant, Wingstay™ L antioxidant, Wingstay™ LHLS antioxidant, Wingstay™ K antioxidant, Wingstay™ 29 antioxidant, Wingstay™ SN-1 antioxidant, and Irganox™ anti-oxidants. In some applications, the anti-oxidants and anti-ozonants used, will preferably be non-staining and non-migratory.

For providing additional stability against UV radiation, hindered amine light stabilizers (HALS) and UV absorbers may be also used. Suitable examples include Tinuvin™ 123, Tinuvin™ 144, Tinuvin™ 622, Tinuvin™ 765, Tinuvin™ 770, and Tinuvin™ 780, available from Ciba Speciality Chemicals, and Chemisorb™ T944, available from Cytex Plastics, Houston Tex., USA. A Lewis acid may be additionally included with a HALS compound in order to achieve superior surface quality, as disclosed in U.S. Pat. No. 6,051,681.

For some compositions, an additional mixing process may be employed to pre-disperse the anti-oxidants, anti-ozonants, carbon black, UV absorbers, and/or light stabilizers, to form a masterbatch, and subsequently to form polymer blends therefrom.

Suitable crosslinking agents (also referred to as curing or vulcanizing agents), for use herein include sulfur based, peroxide based, or phenolic based compounds. Examples of the foregoing materials are found in the art, including in U.S. Pat. Nos. 3,758,643, 3,806,558, 5,051,478, 4,104,210, 4,130,535, 4,202,801, 4,271,049, 4,340,684, 4,250,273, 4,927,882, 4,311,628 and 5,248,729, all incorporated herein by reference.

When sulfur based curing agents are employed, accelerators and cure activators may be used as well. Accelerators are used to control the time and/or temperature required for dynamic vulcanization, and to improve the properties of the resulting cross-linked article. In one embodiment, a single accelerator or primary accelerator is used. The primary accelerator(s) may be used in total amounts ranging from about 0.5 to about 4, preferably about 0.8 to about 1.5, phr, based on total composition weight. In another embodiment, combinations of a primary and a secondary accelerator might be used, with the secondary accelerator being used in smaller amounts, such as from about 0.05 to about 3 phr, in order to activate, and to improve the properties of the cured article. Combinations of accelerators generally produce articles having properties that are somewhat better than those produced by use of a single accelerator. In addition, delayed action accelerators may be used, which are not affected by normal processing temperatures, yet produce a satisfactory cure at ordinary vulcanization temperatures. Vulcanization retarders might also be used.

Suitable types of accelerators that may be used in the present invention are amines, disulfides, guanidines, thioureas, thiazoles, thiurams, sulfenamides, dithiocarbamates and xanthates. Preferably, the primary, accelerator is a sulfenamide. If a second accelerator is used, the secondary accelerator is preferably a guanidine, dithiocarbamate or thiuram compound. Certain processing aids and cure activators, such as stearic acid and ZnO may also be used. When peroxide based curing agents are used, co-activators or coagents may be used in combination therewith. Suitable coagents include trimethylolpropane triacrylate (TMPTA), trimethylolpropane trimethacrylate (TMPTMA), triallyl cyanurate (TAC), triallyl isocyanurate (TAIC), among others. Use of peroxide crosslinkers and optional coagents, used for partial or complete dynamic vulcanization, are known in the art, and disclosed for example in the publication, "Peroxide Vulcanization of Elastomer", Vol. 74, No 3, July-August 2001.

When the functionalized multi-block copolymer containing composition is at least partially crosslinked, the degree of crosslinking may be measured by dissolving the composition in a solvent for specified duration, and calculating the percent gel or unextractable component. The percent gel normally increases with increasing crosslinking levels. For cured articles according to the invention, the percent gel content is desirably in the range from 5 to 100 percent.

The functionalized multi-block copolymers of the invention, as well as blends thereof, may possess improved processability compared to prior art compositions, due to lower melt viscosity. Thus, the composition or blend may also from an improved surface appearance, especially when formed into a molded or extruded article. At the same time, the present compositions and blends thereof may also possess improved melt strength properties, thereby allowing the present functionalized multi-block copolymers and blends thereof, especially TPO blends, to be usefully employed in foam and thermoforming applications where melt strength is currently inadequate.

Thermoplastic compositions and thermoset compositions, each containing functionalized multi-block copolymer, according to the invention, may also contain organic or inorganic fillers or other additives such as starch, talc, calcium carbonate, glass fibers, polymeric fibers (including nylon, rayon, cotton, polyester, and polyaramide), metal fibers, flakes or particles, expandable layered silicates, phosphates or carbonates, such as clays, mica, silica, alumina, aluminosilicates or aluminophosphates, carbon whiskers, carbon fibers, nanoparticles including nanotubes, wollastonite, graphite, zeolites, and ceramics, such as silicon carbide, silicon nitride or titanias. Silane based coupling agents or other coupling agents may also be employed for better filler bonding.

The thermoplastic compositions of this invention, including the foregoing blends, may be processed by conventional molding techniques, such as injection molding, extrusion molding, thermoforming, slush molding, over molding, insert molding, blow molding, and other techniques. Films, including multi-layer films, may be produced by cast or tentering processes, including blown film processes.

EXAMPLES OF THE PRESENT INVENTION

Maleation of Base Polymers
Base Polymers

A description of the base polymers used in the examples below is shown in the Base Polymers Table. The comonomer in each base polymer was 1-octene. In the studies that follow, the grafted-EO885, grafted-EO870 and grafted-EO875 serve as comparative examples. The grafted-Multi-block R6, grafted-Multi-block R9, grafted-Multi-block R21 and grafted-Multi-block R22 are examples of the inventive resins.

Multi-block R6 and Multi-block R9 are similar to the polymer of Example 5 in Table 2 above.

Base Polymers Table

| Base Polymer | Density (g/cc) | Melt Index ($I_2$) g/10 min | Copolymer Type | Block Type |
|---|---|---|---|---|
| EO885 | 0.885 | 1.5 | random | NA |
| EO870 | 0.870 | 5.0 | random | NA |
| EO875 | 0.875 | 3.0 | random | NA |
| Multi-block R6 | 0.879 | 1.09 | block | short |
| Multi-block R9 | 0.883 | 0.87 | block | short |
| Multi-block R21 | 0.877 | 4.7 | block | long |
| Multi-block R22 | 0.877 | 4.6 | block | short |

NA = Not Applicable
Melt Index ($I_2$): 190° C./2.16 kg

Examples Multi-Block R21 and Multi-Block R22 Continuous Solution Polymerization, Catalyst A1/B2+DEZ Continuous solution polymerizations were carried out in a computer controlled, well-mixed reactor. Purified mixed alkanes solvent (Isopar™ E available from Exxon Mobil, Inc.), ethylene, 1-octene, and hydrogen (where used) were combined and fed to a 102 L reactor. The feeds to the reactor were measured by mass-flow controllers. The temperature of the feed stream was controlled by use of a glycol cooled heat exchanger before entering the reactor. The catalyst component solutions were metered using pumps and mass flow meters. The reactor was run liquid-full at approximately 550 psig pressure. Upon exiting the reactor, water and additive were injected in the polymer solution. The water hydrolyzes the catalysts, and terminates the polymerization reactions. The post reactor solution was then heated in preparation for a two-stage devolatization. The solvent and unreacted monomers were removed during the devolatization process. The polymer melt was pumped to a die for underwater pellet cutting. Process conditions are summarized in the Process Conditions Table.

| Process Conditions for Multi-block R21 and Multi-block R22 | | |
|---|---|---|
| | Multi-block R21 | Multi-block R22 |
| $C_2H_4$ (lb/hr)* | 55.53 | 54.83 |
| $C_8H_{16}$ (lb/hr) | 30.97 | 30.58 |
| Solvent (lb/hr) | 324.37 | 326.33 |
| $H_2$ (sccm[1]) | 550 | 60 |
| T (° C.) | 120 | 120 |
| Cat. A1[2] (ppm) | 600 | 600 |
| Cat. A1 Flow (lb/hr) | 0.216 | 0.217 |
| Cat. B2[3] (ppm) | 200 | 200 |
| Cat. B2 Flow (lb/hr) | 0.609 | 0.632 |
| DEZ Conc. wt % | 3.0 | 3.0 |
| DEZ Flow (lb/hr) | 0.69 | 1.39 |
| Cocat. 1 Conc. (ppm) | 4500 | 4500 |
| Cocat. 1 Flow (lb/hr) | 0.61 | 0.66 |
| Cocat. 2 Conc. (ppm) | 525 | 525 |
| Cocat. 2 Flow (lb/hr) | 0.33 | 0.66 |
| [DEZ][4] in polymer (ppm) | 246 | 491 |
| Polymerization Rate[5] (lb/hr) | 84.13 | 82.56 |
| Conversion[6] (wt %) | 88.9 | 88.1 |
| Polymer (wt %) | 17.16 | 17.07 |
| Efficiency[7] | 293 | 280 |

*1 lb/hr = 0.45 kg/hr
[1]standard cm³/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino)zirconium dibenzyl
[4]ppm in final product calculated by mass balance
[5]polymer production rate
[6]weight percent ethylene conversion in reactor
[7]efficiency, kg polymer/g M, where, g M = g Hf + g Z Melt Maleation Process

EXAMPLE

Melt Maleation—Haake Mixer

Representative Procedure

The base polymer (45.0 grams) was added to a Haake Rheomix 600P mixer, prewarmed to 170° C., and rotating at 10 RPM. The speed of the stirrer was increased stepwise, over a two minute period, to 60 RPM. Maleic anhydride (MAH, 1.39 grams) was then added to the mixer, and the resultant mixture was mixed for three minutes. Next, a 10 wt % solution of 2,5-dimethyl-2,5-di(tert-butylperoxy)hexane in dodecane (0.0895 grams) was injected into the mixer, and mixing was continued for an additional 6.25 minutes. The grafted resin, isolated from the mixer, had a MFR of 1.5 (ASTM D-1238, at 190° C./2.16 kg).

The isolated resin was dissolved in hot xylene at a 2-5 wt % percent concentration. The resin solution was then precipitated in acetone (5× the volume of xylene solution), and the precipitated resin was collected, washed, and soaked in acetone, and then collected and dried to constant weight.

The dried resin was titrated with 0.02N KOH to determine the amount of grafted maleic anhydride. The dried, precipitated polymer was titrated by dissolving 0.3 to 0.5 grams of polymer in about 150 mL of refluxing xylene. Upon complete dissolution, deionized water (four drops) was added to the solution, and the solution was refluxed for one hour. Next, 1% thymol blue (a few drops) was added to the solution, and the solution was over titrated with 0.02N KOH in ethanol, as indicated by the formation of a purple color. The solution was then back-titrated to a yellow endpoint, with 0.05N HCl in isopropanol.

Data summaries for the melt maleation experiments on the base interpolymers of melt indexes of approximately one and five are shown in the Melt Maleation Data Tables.

| Melt Maleation Data Table | | | | | | | | | |
|---|---|---|---|---|---|---|---|---|---|
| Polymer | Peroxide Solution grams (mmoles) | Peroxide Radicals* mmol R./100 g (half-lives) | MAH Feed Wt % | MAH Feed grams (mmoles) | Torque Nm (rpm) | MFR of Final Product g/10 min | Wt % Grafted MAH | $T_m$ ° C. | $T_{cr}$ ° C. |
| EO885 (as received) | — | — | — | — | — | 1.48 | — | 85 | 59 |
| EO885 (Thermally Treated Only) | — | — | — | — | 36.5 (75) | 0.54 | — | — | — |
| EO885 (Thermally Treated Only) | — | — | — | — | 13.2 (60) | 0.79 | — | — | — |
| EO885 | 0.0891** (0.292) | 2.5 (10 half-lives) | 3.0 | 1.39 (14.2) | 24.6 | 0.00 (cured) | — | — | — |
| EO885 | 0.0876** (0.287) | 2.5 (10 half-lives) | 5.0 | 2.37 (24.2) | 25.0 | 0.00 (cured) | — | — | — |
| EO885 | 0.0907 (0.0297) | 0.25 | 3.0 | 1.39 (14.2) | 12.6 | 0.43 | 0.23 | 82 | 60 |
| EO885 | 0.0892 (0.0292) | 0.25 | 5.0 | 2.37 (24.2) | 13.2 | 0.35 | 0.29 | 83 | 59 |
| Multi-block R6 (as received) | — | — | — | — | — | 1.09 | — | 119 | 93 |
| Multi-block R6 (Thermally Treated - 170° C./60 rpm) | — | — | — | — | 13.0 | 0.547 | — | — | — |

| Base Polymer | Peroxide Solution grams (mmoles) | Peroxide Radicals* mmol R./100 g | MAH Feed Wt % | MAH Feed grams (mmoles) | Torque Nm | MFR of Final Product g/10 min | Wt % Grafted MAH | $T_m$ ° C. | $T_{cr}$ ° C. |
|---|---|---|---|---|---|---|---|---|---|
| Multi-block R6 | 0.0895 (0.0293) | 0.25 | 3.0 | 1.39 (14.2) | 13.2 | 0.074 | 0.39 | 118 | 91 |
| Multi-block R6 | 0.0898 (0.0294) | 0.25 | 5.0 | 2.37 (24.2) | 13.5 | 0.043 | 0.54 | 117 | 90 |
| Multi-block R9 (as received) | — | — | — | — | — | 0.87 | — | 124 | 100 |
| Multi-block R9 (Thermally Treated - 170° C./60 rpm) | — | — | — | — | 13.0 | 0.85 | — | — | — |
| Multi-block R9 | 0.0880 (0.0288) | 0.25 | 3.0 | 1.39 (14.2) | 13.0 | 0.26 | 0.39 | 122 | 100 |
| Multi-block R9 | 0.0856 (0.0280) | 0.25 | 5.0 | 2.37 (24.2) | 13.8 | 0.17 | 0.45 | 122 | 100 |

*Theoretical amount of radicals;
**Peroxide added as received with no dilution;
MRF: 190° C./2.16 kg;;
Tm = melting point peak, first heat, 10° C./min;
Tcr = crystallization temperature, cooling 10° C./min from 200° C.

| Base Polymer | Peroxide Solution grams (mmoles) | Peroxide Radicals* mmol R./100 g | MAH Feed Wt % | MAH Feed grams (mmoles) | Torque Nm | MFR of Final Product g/10 min | Wt % Grafted MAH | $T_m$ ° C. | $T_{cr}$ ° C. |
|---|---|---|---|---|---|---|---|---|---|
| EO870 (as received) | — | — | — | — | — | 4.46 | — | 53 | 43 |
| EO870 (Thermally Treated 170° C. @ 60 rpm) | — | — | — | — | 5.2 | 4.10 | — | — | — |
| EO870 | 0.1728 (0.0566) | 0.50 | 1.0 | 0.454 (4.63) | 6.1 | 1.29 | 0.59 | 69 | 39 |
| EO870 | 0.1625 (0.0533) | 0.50 | 3.0 | 1.39 (14.2) | 6.8 | 0.477 | 0.58 | 68 | 40 |
| EO870 | 0.1761 (0.0577) | 0.50 | 5.0 | 2.37 (24.2) | 6.5 | 0.466 | 0.58 | 68 | 39 |
| EO870 | 0.0889 (0.0291) | 0.25 | 1.0 | 0.454 (4.63) | 6.3 | 2.07 | 0.36 | 67 | 40 |
| EO870 | 0.0889 (0.0291) | 0.25 | 3.0 | 1.39 (14.2) | — | 2.38 | 0.28 | 69 | 40 |
| EO870 | 0.0895 (0.0293) | 0.25 | 5.0 | 2.37 (24.2) | 5.7 | 2.35 | 0.21 | 69 | 39 |
| EO870 | 0.0846** (0.0139) | 0.125 | 1.0 | 0.454 (4.63) | 5.0 | 2.94 | — | 66 | 39 |
| EO870 | 0.0869** (0.0142) | 0.125 | 3.0 | 1.39 (14.2) | 4.8 | 2.69 | — | — | 41 |
| EO870 | 0.0869** (0.0142) | 0.125 | 5.0 | 2.37 (24.2) | 5.0 | 2.39 | — | 68 | 40 |

*Theoretical amount of radicals
**Peroxide added as 5.0 wt % solution in dodecane
Tm = melting point peak, first heat, 10° C./min
Tcr = crystallization temperature, cooling 10° C./min from 200° C.
MFR: 190° C./2.16 kg

| Base Polymer | Peroxide Solution grams (mmoles) | Peroxide Radicals* mmole R./100 g | MAH Feed Wt % | MAH Feed grams (mmoles) | Torque Nm | MFR g/10 min | Wt % Grafted MAH | $T_m$ ° C. | $T_{cr}$ ° C. |
|---|---|---|---|---|---|---|---|---|---|
| Multi-block R21 (as received) | — | — | — | — | — | 4.98 | — | 125 | 93 |
| Multi-block R21 (Thermally Treated - 170° C. @ 60 rpm) | — | — | — | — | 4.8 | 4.70 | — | — | — |
| Multi-block R21 | 0.1760 (0.0577) | 0.50 | 1.0 | 0.454 (4.63) | 5.0 | 2.26 | 0.47 | 122 | 104 |
| Multi-block R21 | 0.1739 (0.0570) | 0.50 | 3.0 | 1.39 (14.2) | 6.6 | 0.512 | 0.75 | 122 | 102 |
| Multi-block R21 | 0.1729 (0.0567) | 0.50 | 5.0 | 2.37 (24.2) | 7.2 | 0.304 | 0.76 | 122 | 101 |

-continued

| | | | | | | | | | |
|---|---|---|---|---|---|---|---|---|---|
| Multi-block R21 | 0.0886 (0.0290) | 0.25 | 1.0 | 0.454 (4.63) | 4.5 | 3.10 | 0.29 | 124 | 103 |
| Multi-block R21 | 0.0895 (0.0293) | 0.25 | 3.0 | 1.39 (14.2) | 6.2 | 1.46 | 0.53 | 123 | 103 |
| Multi-block R21 | 0.0908 (0.0298) | 0.25 | 5.0 | 2.37 (24.2) | 6.7 | 1.07 | 0.57 | 123 | 102 |
| Multi-block R21 | 0.0858** (0.0141) | 0.125 | 1.0 | 0.454 (4.63) | 4.1 | 4.23 | — | 125 | 103 |
| Multi-block R21 | 0.0870** (0.0143) | 0.125 | 3.0 | 1.39 (14.2) | 4.8 | 2.52 | — | — | 104 |
| Multi-block R21 | 0.0872** (0.0143) | 0.125 | 5.0 | 2.37 (24.2) | 4.9 | 1.90 | 0.33 | 123 | 103 |

*Theoretical amount of radicals
**Peroxide added as 5.0 wt % solution in dodecane
Tm = melting point peak, first heat, 10° C./min
Tcr = crystallization temperature, cooling 10° C./min from 200° C.
MFR: 190° C./2.16 kg

| Base Polymer | Peroxide Solution grams (mmoles) | Peroxide Radicals* mmole R./100 g | MAH Feed Wt % | MAH Feed grams (mmoles) | Torque Nm | MFR of Final Product g/10 min | Wt % Grafted MAH | $T_m$ ° C. | $T_{cr}$ ° C. |
|---|---|---|---|---|---|---|---|---|---|
| Multi-block R22 (as received) | — | — | — | — | — | 4.75 | — | 122 | 88 |
| Multi-block R22 (Thermally Treated - 170° C. @ 60 rpm) | — | — | — | — | 5.2 | 4.43 | — | — | — |
| Multi-block R22 | 0.1686 (0.0553) | 0.50 | 1.0 | 0.454 (4.63) | 5.2 | 1.68 | 0.41 | 120 | 95 |
| Multi-block R22 | 0.1757 (0.0576) | 0.50 | 3.0 | 1.39 (14.2) | 7.8 | 0.262 | 0.75 | 118 | 94 |
| Multi-block R22 | 0.1753 (0.0575) | 0.50 | 5.0 | 2.37 (24.2) | 7.2 | 0.342 | 0.77 | 119 | 94 |
| Multi-block R22 | 0.0895 (0.0293) | 0.25 | 1.0 | 0.454 (4.63) | 4.9 | 2.78 | 0.42 | 120 | 98 |
| Multi-block R22 | 0.0897 (0.0294) | 0.25 | 3.0 | 1.39 (14.2) | 6.6 | 1.24 | 0.54 | 120 | 97 |
| Multi-block R22 | 0.0909 (0.0298) | 0.25 | 5.0 | 2.37 (24.2) | 6.7 | 1.03 | 0.62 | 120 | 95 |
| Multi-block R22 | 0.0868** (0.0142) | 0.125 | 1.0 | 0.454 (4.63) | 4.5 | 3.75 | — | 121 | 120 |
| Multi-block R22 | 0.0854** (0.0140) | 0.125 | 3.0 | 1.39 (14.2) | 4.6 | 2.60 | — | 121 | 98 |
| Multi-block R22 | 0.0876** (0.0144) | 0.125 | 5.0 | 2.37 (24.2) | 5.1 | 1.52 | 0.38 | 121 | 97 |

*Theoretical amount of radicals
**Peroxide added as 5.0 wt % solution in dodecane
Tm = melting point peak, first heat, 10° C./min
Tcr = crystallization temperature, cooling 10° C./min from 200° C.
MFR: 190° C./2.16 kg

EXAMPLE

Melt Maleation—Grafting MAH to Olefin Interpolymer in a Twin-Screw Extruder

MAH-grafted resins were prepared in a continuous reactive extrusion process using a twin-screw extruder. The resins used for this process were EO870, EO875, multi-block R21, and Multi-block R22. The apparatus was a 30-mm ZSK-30 extruder with a length-to-diameter ratio of 35.67. The temperature set point in the extruder was 235° C. The screw rotation rate was 300 RPM. Resin pellets were fed to the extruder at a rate of 10 lb/hr. The peroxide initiator was 2,5-bis(t-butylperoxy)-2,5-dimethylhexane. A solution, containing approximately 1.24 wt % peroxide, 49.38 wt % MAH, and 49.38 wt % methyl ethyl ketone, was fed into the extruder at a rate of approximately 6.17 g/min. This addition rate corresponded to the addition of 4 wt % MAH and 1000 ppm peroxide based on the mass of resin. A vacuum port was installed at the end of the extruder to remove methyl ethyl ketone and excess, ungrafted MAH. The grafted resin exited the extruder and was pelletized and collected.

Approximately 2.5 g of each grafted resin was dissolved in 100 mL of boiling xylene, and then precipitated by pouring the solution into five volumes of acetone. The solids were collected, dried, and titrated to determine the level of grafted MAH. The EO870 resin contained 1.85 wt % grafted MAH. The EO875 resin contained 1.85 wt % grafted MAH. The Multi-block R21 resin contained 1.80 wt % grafted MAH. The Multi-block R22 resin contained 1.49 wt % MAH. The grafted resins were blended with a polyamide resin as discussed in below in the section entitled MAH-grafted Resin/Polyamide Blends.

Solution Maleation Process

EXAMPLE

Solution Maleation—Representative Procedure

The polyolefin (Multi-block resin, EO885 or EO870) (10.0 g) was charged to a 250-mL flask. Next, maleic anhydride (0.5 g) and anhydrous xylene (100 mL) were added. The mixture was stirred and heated to reflux to dissolve the polymer and the maleic anhydride, and then the temperature of the solution was decreased to 120° C. Next, a solution containing 0.03 g of benzoyl peroxide (equivalent to 2.5 mmol benzoyloxy radicals per 100 g polymer) in xylene was added to the solution. The mixture was allowed to react for 30 minutes at 120° C. (approximately 10 half-lives), and then the temperature was increased to reflux. The solution was refluxed for one hour to fully decompose the peroxide. The grafted product was isolated by pouring the reaction mixture into 500 mL of acetone, collecting the solid by filtration, and drying the solid. The solid was then dissolved in boiling xylene, precipitated into five volumes acetone, and dried. The grafted product was analyzed as described above. The summary of the data is shown in Solution Maleation Tables below.

Solution Maleation Data Table

|  | EO885 (as received) | EO885 (MAH grafted) | Multi-block R6 (as received) | Multi-block R6 (MAH grafted) | Multi-block R9 (as received) | Multi-block R9 (MAH grafted) |
|---|---|---|---|---|---|---|
| MFR of Resin (g/10 min) | 1.48 | 0.26 | 1.09 | 0.12 | 0.87 | 0.21 |
| Grafted MAH (wt %) | NA | 0.45 | NA | 0.49 | NA | 0.35 |

NA = Not Applicable
MFR measured at 190° C./2.16 kg

Solution Maleation Data Table

|  | EO870 (as received) | EO870 (MAH grafted) | Multi-block R21 (as received) | Multi-block R21 (MAH grafted) | Multi-block R22 (as received) | Multi-block R22 (MAH grafted) |
|---|---|---|---|---|---|---|
| MFR of Resin (g/10 min) | 4.46 | 2.57 | 4.98 | 2.26 | 4.75 | 1.99 |
| Grafted MAH (wt %) | NA | 0.46 | NA | 0.37 | NA | 0.34 |

NA = Not Applicable
MFR measured at 190° C./2.16 kg

Melt Maleation by Imbibing Process

EXAMPLE

Melt Maleation by Imbibing Process—Representative Procedure

Maleic anhydride (1.46 g) and toluene (7.7 mL) were added to a 250-mL, one neck, round bottom flask. The mixture was warmed slightly to effect dissolution. Next, a 10 wt % solution of 2,5-dimethyl-2,5-di(tert-butylperoxy)hexane in dodecane (0.0933 g) was injected into the flask, and 45.0 grams of the polyolefin (Multi-block R21, Multi-block R22, or EO870) was added to the flask. The flask was then rotated for an overnight period, at room temperature, and its contents were then air-dried. The air-dried product was then transferred to a Haake Rheomix 600P mixer, prewarmed at 170° C., and rotating at 10 RPM. The rotation speed was increased stepwise to 60 RPM over a two minute period. The contents of the mixer were mixed for 9.25 minutes, and then analyzed as described above. The data is summarized in Imbibing Maleation Data Table.

Imbibing Maleation Data Table

| Resin | Peroxide Solution grams (mmoles) | Peroxide Radicals* mmole R./100 g | MAH Feed Wt % | MAH Feed grams (mmole) | Torque Nm | MFR g/10 min | Wt % Grafted MAH | $T_m$ ° C. | $T_{cr}$ ° C. |
|---|---|---|---|---|---|---|---|---|---|
| EO870 | 0.0933 (0.0306) | 0.27 | 3.1 | 1.46 (14.9) | 5.5 | 3.52 | — | 68 | 40 |
| Multi-block R21 | 0.0933 (0.0306) | 0.27 | 3.1 | 1.46 (14.9) | 5.3 | 4.10 | — | 121 | 105 |
| Multi-block R22 | 0.0933 (0.0306) | 0.27 | 3.1 | 1.46 (14.9) | 5.6 | 3.47 | — | 121 | 99 |
| Multi-block R21 | 0.1866 (0.0612) | 0.54 | 3.1 | 1.46 (14.9) | 5.8 | 1.46 | 0.51 | 123 | 101 |

*Theoretical amount of radicals
$T_m$ = melting point peak, first heat, 10° C./min
$T_{cr}$ = crystallization temperature, cooling 10° C./min, from 200° C.
MFR measured at 190° C./2.16 kg Solid State Maleation

EXAMPLE

Solid State Maleation—Multi-block R21

Maleic anhydride (1.46 grams, 14.9 mmoles) and toluene (7.7 mL) were added to a 1-neck, 250 mL round bottom flask, and the contents of the flask were warmed slightly to effect dissolution. Next, a solution containing 7.4 wt % of benzoyl peroxide in toluene (1.91 grams, 0.584 mmol) was injected into the flask, and the Multi-block R21 (45.0 grams) was added to the flask. The contents in the flask were rotated overnight at room temperature, and then air-dried. The air-dried product was reloaded into a 1-neck, 250 mL round bottom flask, and deoxygenated. The product was kept under nitrogen, and agitated, while warmed at 90° C. for 8 hours.

A three gram aliquot of product was brought to a boil in ~135 mL boiling xylenes, and the soluble fraction was precipitated in ~600 mL of stirred acetone. The precipitated product was collected by filtration, washed and soaked in fresh acetone, recollected, and dried to constant weight at approximately 55° C. in a vacuum oven. FTIR analysis of a pressed film of the precipitated polymer showed the characteristic carbonyls of grafted maleic anhydride/succinic anhydride (and hydrolyzed forms) at ~1711 cm$^{-1}$,~1789 cm$^{-1}$, and ~1865 cm$^{-1}$. By titration, the weight % of grafted maleic anhydride was 0.47%. The product had a melting point of 122° C., determined by DSC, at a 10° C./min heating rate. The product had a crystallization temperature of 100° C., determined by DSC, at a 10° C./min cooling rate, from 200° C.

EXAMPLE

Solid State Maleation—Multi-block R21

Maleic anhydride (1.46 grams, 14.9 mmoles) and toluene (7.7 mL) were added to a 1-neck, 250 mL round bottom flask. The contents were warmed slightly to effect dissolution. A solution containing 7.4 wt % of benzoyl peroxide in toluene (0.38 grams, 0.116 mmol) was injected into the flask, and Multi-block R21 (45.0 grams) was added to the flask. The contents of the flask were rotated overnight at room temperature. The flask was deoxygenated, kept under nitrogen, and contents agitated, while warmed at 90° C. for 8 hours. Melt flow rates (MFR) were performed according to ASTM D-1238 at 190° C. and 2.16 kg. The isolated crude product had a MFR of 1.8 g/10 min.

A three gram aliquot of product was brought to a boil in approximately 135 mL boiling xylenes, and then and precipitated in ~600 mL of stirred acetone. The precipitated product was collected by filtration, washed and soaked in fresh acetone, recollected, and dried to constant weight at approximately 55° C. in a vacuum oven. FTIR of a pressed film of the precipitated polymer showed characteristic carbonyls of grafted maleic anhydride/succinic hydride (and hydrolyzed forms) ~1788 cm$^{-1}$, and ~1865 cm$^{-1}$. By titration, the weight % of grafted maleic anhydride was 0.21%. Melting point=124° C. at 10° C./min heating rate. Crystallization temperature=102° C., at 10° C./min cooling from 200° C.

MAH-Grafted Resin/Polyamide Blends

MAH-Grafted Resins

Melt index data on MAH-grafted resins are shown below in GPC and Melt Index Data Table.

| | GPC and Melt Index Data | |
|---|---|---|
| Resin | Wt % grafted MAH | $I_2$ g/10 min |
| 1. MAH-g-EO870* | 1.85 | 0.0912 |
| 2. MAH-g-EO875* | 1.85 | 0.049 |
| 3. MAH-g-Multi-block R22 | 1.49 | 0.2393 |
| 4. MAH-g-Multi-block R21 | 1.80 | 0.1482 |

*Comparative resins
$I_2$: 190 C/2.16 kg

Blends: Representative Procedure

Approximately 454 grams of the maleic anhydride grafted resin (MAH-g-EO870, MAH-g-875, MAH-g-Multi-block R22 or the MAH-g-Multi-block R21) was pellet blended with 1816 grams of a polyamide (Ultramide® B-3, available from BASF), by feeding both resins into a 25 mm Haake twin screw extruder at an instantaneous rate of 2724 grams per hour. The extruder temperature profile was a constant 250° C. The collected sample was subsequently injection molded to produce ASTM test bars for IZOD and flexural modulus testing. Mechanical Test data is summarized in Mechanical Data Table below.

| | | | Mechanical Data Table | | | |
|---|---|---|---|---|---|---|
| Resin | Avg. Flex. Strength psi | Avg. Flex. Mod. ksi | Avg. Secant Mod. @ 1% ksi | Avg.Izod-RT @ B-3833 ft-lbs/in | Avg. Izod J/m | Color of molded plaques |
| 1. MAH-g-EO870 | 5873 | 267 | 266 | 7.391 | 394.6 | tan |
| 2. MAH-g-EO875 | 5799 | 265 | 265 | 10.08 | 537.9 | tan |
| 3. MAH-g-Multi-blockR22 | 5864 | 264 | 264 | 8.624 | 460.4 | tan |
| 4. MAH-g-Multi-blockR21 | 5463 | 246 | 246 | 7.346 | 392.2 | tan |

The lower viscosity Multi-block resins have comparable or even better mechanical properties, compared to the higher viscosity comparative resins.

The resins were made into injection molded plaques and tested for impact properties. The results are shown in the table below.

| Resin | Avg Flexural Modulus (ksi) | Impact Tester (30° C.) | Impact Tester (Room Temp) | Average Izod Impact (J/m) |
|---|---|---|---|---|
| 1. MAH-g-EO870 | 267 with standard deviation of 6 | 48.62 | 56.99 | 394.6 |
| 2. MAH-g-EO875 | 265 with standard deviation of 4 | 58.18 | 56.64 | 537.9 |

| Resin | Avg Flexural Modulus (ksi) | Impact Tester (30° C.) | Impact Tester (Room Temp) | Average Izod Impact (J/m) |
|---|---|---|---|---|
| 3. MAH-g-Multi-blockR22 | 264 with standard deviation of 10 | 68.17 | 63.25 | 460.4 |
| 4. MAH-g-Multi-blockR21 | 246 with standard deviation of 9 | 63.92 | 66.25 | 392.2 |

Note: the Inventive polymers (Run #3 & 4) have significantly higher impact resistance at low temperature vs. the comparative samples (Run #1 & 2). Sample #3 has the best balance between high modulus and high impact. This improved impact is demonstrated at both room temperature and at low temperature. The test pieces were injection molded plaques and the test was completed using the procedure as outlined in ASTM D 3763 (Injection Molded Parts). Flex modulus was done according to ASTM D-790 and Izod impact was done according to D-256.

Grafting $^{13}$C-Labelled Maleic Anhydride

Representative Procedure

A 50-mL 3-neck flask was charged with 2.0 g of polyolefin resin (EO870, Multi-block R21, or Multi-block R22), 0.1 g of 2,3-$^{13}$C$_2$-maleic anhydride, and 20 mL of anhydrous xylene. This mixture was stirred and heated to reflux to dissolve the polymer and MAH, and then the temperature was decreased to 120° C. A solution containing 0.006 g of benzoyl peroxide in xylene was added; this is equivalent to 2.5 mmoles of benzoyloxy radicals per 100 g of polymer. After allowing the mixture to react at 120° C. for 30 minutes, approximately 10 half-lives, the temperature was increased to reflux for one hour in order to fully decompose the peroxide. The product was isolated by pouring the reaction mixture into 100 mL of acetone and filtering the precipitate. The collected solid was dissolved in boiling xylene, precipitated into five volumes of acetone, and dried. The products and base resins were analyzed by $^{13}$C NMR spectroscopy.

NMR was used to determine the ethylene-to-octene (E/O) mole ratio of the base resins. The results are as follows:
EO870:E/O=87.5:12.5;
Multi-block R21:E/O=88.1:11.9;
Multi-block R22:E/O=88.2:11.8.

The ratio of "CH$_2$ groups to CH groups (or CH$_2$/CH)" in each of the base resins is as follows:
EO870:CH$_2$/CH=20.3;
Multi-block R21:CH$_2$/CH=20.7;
Multi-block R22:CH$_2$/CH=19.4.

This ratio was based in the number of "CH" and "CH$_2$" groups in the sample (one CH group and six CH$_2$ groups for each octene, and two CH$_2$ groups for each ethylene).

NMR was used to determine the location of the graft site of the $^{13}$C-labelled MAH, whether at a CH$_2$ site or a CH site. The results are as follows:
EO870:CH$_2$-graft/CH-graft=4.4;
Multi-block R21:CH$_2$-graft/CH-graft=6.2;
Multi-block R22:CH$_2$-graft/CH-graft=4.9.

Since the ratios of CH$_2$-graft/CH-graft in the grafted resins are considerably smaller than the corresponding ratios of CH$_2$/CH sites in the base resins, this indicates that, relative to the total number of each available site, there is a preference for grafting at a CH site. This is reflected in the lower dissociation energy of the tertiary C—H bond compared to that of the secondary C—H bond, and the faster rate of hydrogen abstraction from a tertiary CH compared to the rate of hydrogen abstraction from a secondary CH$_2$ (see: G.-H. Hu, J.-J. Flat, M. Lambla, in S. Al-Malaika, ed., "Reactive Modifiers for Polymers," Blackie Academic & Professional, London, 1997, p. 11; K. E. Russell, Prog. Polym. Sci. 27 (2002), 1007).

Silanation of Olefin Interpolymers

Description of Base Polymers

The base interpolymers are described in Base Polymers Table above.

Grafting of Vinyltriethoxysilane onto EO870 and Multi-Block R21 and Multi-Block R22

Representative Procedure

A glass jar was loaded with vinyltriethoxysilane (VTES, 1.81 g, 9.51 mmol), 10 wt % of LUPEROXT™101 in VTES (0.18 g, 0.059 mmol), and polymer (EO870, Multi-block R21 or Multi-block R22) (50.00 grams). The jar was sealed and thermally treated overnight at approximately 40° C. The imbibed polymer was added to a Haake Rheomix 600P, pre-warmed to 190° C., and rotating at 10 RPM. The speed of rotation was increased stepwise over 2 minutes to 60 RPM. Mixing was continued for 2.7 minutes, and then a sample (~7 grams) was removed for infrared analysis and melt flow rate measurement. Dibutyltin dilaurate (DBTDL, 0.09 grams, 0.14 mmol) was then added, and the mixing was continued for another 5 minutes. The product was then removed and cooled to room temperature.

Melt flow rates (MFR) were performed according to ASTM D-1238 at 190° C. and 2.16 kg. For the EO870 grafted sample, the MFR was 3.0 g/10 minutes; for the Multi-block R21 grafted sample, the MFR was 3.9 g/10 minutes; and for the Multi-block R22 grafted sample, the MFR was 3.1 g/10 minutes.

Determining Levels of Grafted Silane

Figure 10:
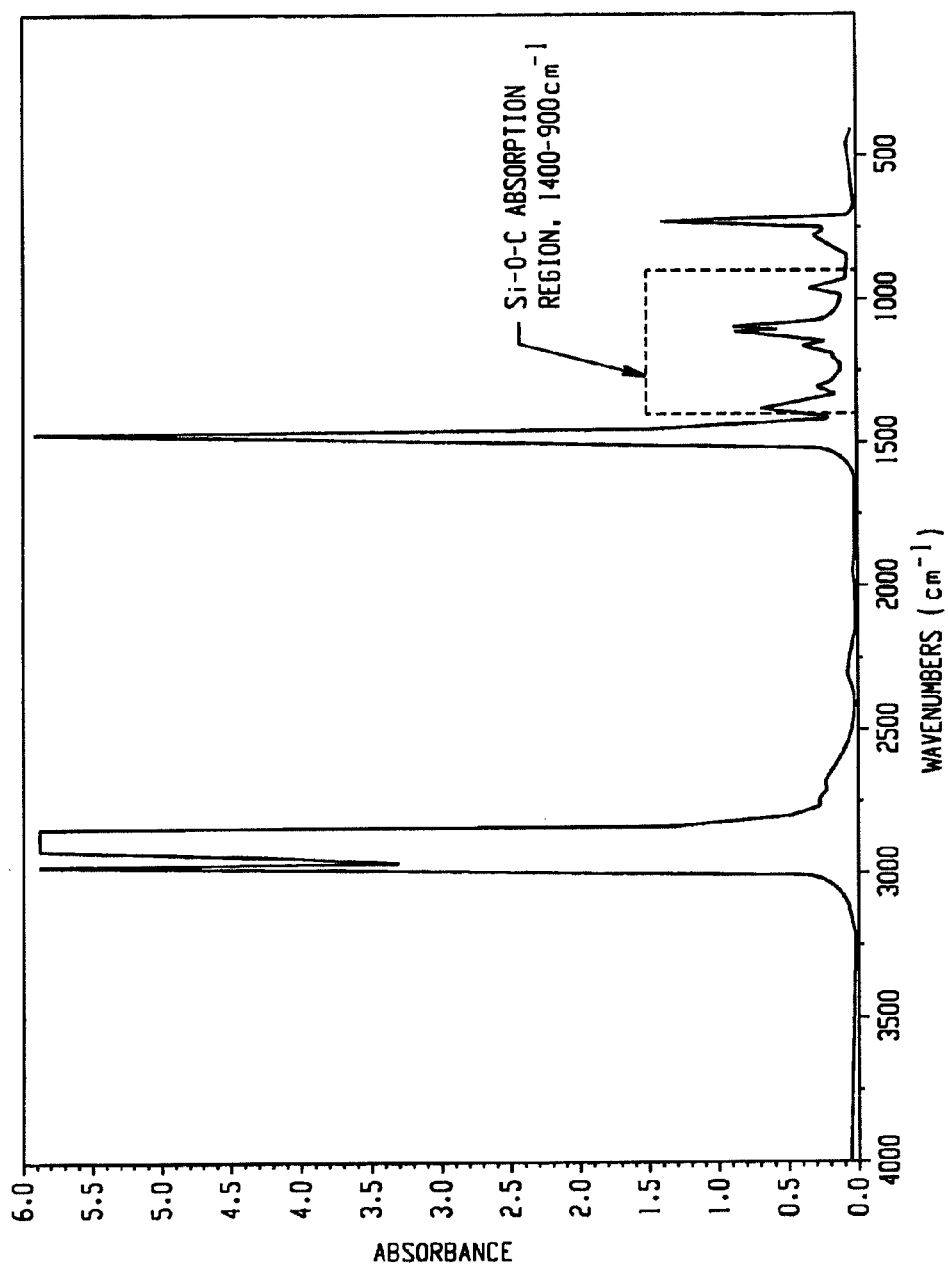
FIG. 10 is a FTIR spectrum of Multi-block R22, grafted with 3.50 wt % vinyltriethoxysilane (VTES). The boxed portion of the spectrum indicates the Si—O—C region of the spectrum (1400-900 cm$^{-1}$).
Figure 11:
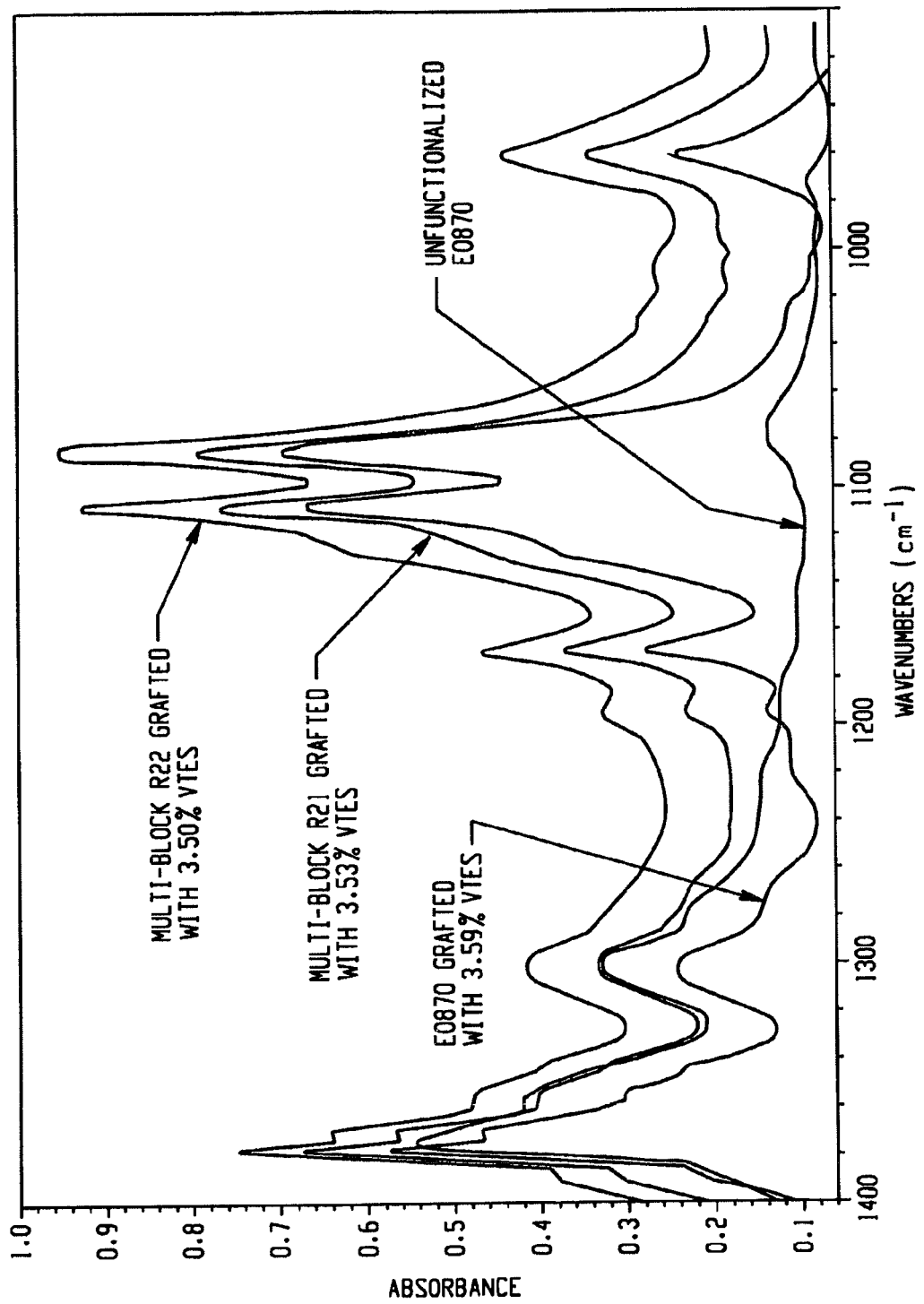
FIG. 11 is an overlay of the Si—O—C absorption regions of the FTIR spectra of, from top to bottom, Multi-block R22 grafted with 3.50% VTES; Multi-block R21 grafted with 3.53% VTES; EO870 grafted with 3.59% VTES; and unfunctionalized EO870.

A small portion of each grafted product that did not contain dibutyltin dilaurate was compression molded at 150° C. to a film, and each film was placed in a vacuum oven at 65° C., overnight, to remove residual VTES that was not grafted. Then, the infrared spectrum of each was collected (FIGS. 10 and 11).

The FTIR spectra were used for determining the level of grafted VTES in each sample. Using a method that has been calibrated against neutron activation analysis, the wt % of grafted VTES was determined from the ratio of the height of the peak at 1105 cm$^{-1}$, corresponding to the absorption of the Si—O—C group, to the height of the C—H peak at 2017 cm$^{-1}$, as follows:

$$\text{wt \% } VTES = 0.1156\left(\frac{\text{peak } ht@1105 \text{ cm}^{-1}}{\text{peak } ht@2017 \text{ cm}^{-1}}\right) + 0.0345.$$

The FTIR results are shown below.

| FTIR Results | |
|---|---|
| Base Resin | Grafted VTES Content |
| EO870 | 3.59 wt % |
| Multi-block R21 | 3.53 wt % |
| Multi-block R22 | 3.50 wt % |

Crosslinking the Silane-Grafted Resins

Approximately 6.5 g of the portion of each grafted product that contained dibutyltin dilaurate was compression molded at 150° C., using a stainless steel mold, to a plaque that was approximately 4" by 4" by 0.030" in size. Each plaque was immersed in water, inside a sealed glass jar, and the jar was placed in an oven equilibrated at 90° C., and thermally treated for 7 days. After this time, the crosslinked plaques were removed from the water, rinsed with fresh water, and dried in a vacuum oven overnight at 65° C.

Approximately 2 g of each crosslinked product was cut into thin strips and placed in a weighed glass fiber extraction thimble, and the exact weight was determined. The thimble was pinched closed and stapled, and the exact weight was determined again. The sealed thimble was placed in a Soxhlet extractor, and the samples were extracted with boiling xylenes (bp 138-141° C.) for 24 hours. The thimble was removed from the extractor and dried in a vacuum oven at 65° C. overnight. The exact weight of the dried thimble and sample residue was determined, and the gel fraction, which is the weight fraction that was not soluble in xylene, was calculated. The extraction results for the samples are shown in the Extraction Data Table below. As shown from the data, the grafted resins were substantially crosslinked.

Extraction Data Table

| Base Resin | EO870 | Multi-block R21 | Multi-block R22 |
|---|---|---|---|
| Sample wt. before extraction | 2.2170 g | 2.1285 g | 2.3494 g |
| Sample residue wt. after extraction | 1.8849 g | 1.8232 g | 2.0229 g |
| Gel Fraction | 85.0% | 85.7% | 86.1% |

Silane Grafting of High Melt Flow Polyolefins Using Reactive Extrusion

Base Ethylene/α-Olefin Interpolymer Preparation

Continuous solution polymerizations were carried out in a computer controlled well-mixed reactor equipped with an internal stirrer. Purified mixed alkanes solvent (ISOPAR™ E available from ExxonMobil, Inc.), ethylene at 5.96 lbs/hour (2.7 kg/hour), 1-octene, and hydrogen (where used) were supplied to a 5.0 L reactor equipped with a jacket for temperature control and an internal thermocouple. The solvent fed to the reactor was measured by a mass-flow controller. A variable speed diaphragm pump controlled the solvent flow rate and pressure to the reactor. At the discharge of the pump, a side stream was taken to provide flush flows for the catalyst and cocatalyst 1 injection lines and the reactor agitator. These flows were measured by Micro-Motion mass flow meters and controlled by control valves or by the manual adjustment of needle valves. The remaining solvent was combined with 1-octene, ethylene, and hydrogen (where used) and fed to the reactor. A mass flow controller was used to deliver hydrogen to the reactor as needed. The temperature of the solvent/monomer solution was controlled by using a heat exchanger before entering the reactor. This stream entered the bottom of the reactor. The catalyst component solutions were metered using pumps and mass flow meters and were combined with the catalyst flush solvent and introduced into the bottom of the reactor. The reactor was run liquid-full at 406 psig (2.8 MPa) with vigorous stirring. Product was removed through exit lines at the top of the reactor. All exit lines from the reactor were steam traced and insulated. Polymerization was stopped by the addition of a small amount of water into the exit line along with any stabilizers or other additives and passing the mixture through a static mixer. The product stream was then heated up through heat exchangers, and passes two devolatizers in series before it was water cooled Process and product details and results are contained in the following tables.

Other properties methods have been described previously. Melt viscosity is determined by ASTM D3236, which is incorporated herein by reference, using a Brookfield Laboratories DVII+ Viscometer equipped with disposable aluminum sample chambers. In general, a SC-31 spindle is used, suitable for measuring viscosities in the range of from 30 to 100,000 centipoise (cP). If the viscosity is outside this range, an alternate spindle should be used which is suitable for the viscosity of the polymer. A cutting blade is employed to cut samples into pieces small enough to fit into the 1 inch wide, 5 inches long samples chamber. The disposable tube is charged with 8-9 grams of polymer. The sample is placed in the chamber, which is in turn inserted into a Brookfield Thermosel and locked into place with bent needle-nose pliers. The sample chamber has a notch on the bottom that fits in the bottom of the Brookfield Thermosel to ensure that the chamber is not allowed to turn when the spindle is inserted and spinning. The sample is heated to the desired temperature (177° C./350° F.). The viscometer apparatus is lowered and the spindle submerged into the sample chamber. Lowering is continued until brackets on the viscometer align on the Thermosel. The viscometer is turned on, and set to a shear rate which leads to a torque reading in the range of 40 to 70 percent. Readings are taken every minute for about 15 minutes, or until the values stabilize, and then the final reading is recorded. The Brookfield viscosity test results are listed in the following table.

TABLE

Process Conditions and Results for Multi-Block 500.

| Example | $C_2H_4$ kg/hr | $C_8H_{16}$ kg/hr | Solv. kg/hr | $H_2$ sccm[1] | Temp ° C. | Cat A1[2] ppm | Cat A1 Flow kg/hr | Cat B2[3] ppm | Cat B2 Flow kg/hr | DEZ Conc. % |
|---|---|---|---|---|---|---|---|---|---|---|
| Multi-Block 500[8] | 2.7 | 3.6 | 21.0 | 200 | 121 | 150 | 0.094 | 76.6 | 0.049 | 1.0 |

| Example | DEZ Flow kg/hr | Cocat 1 Conc. ppm | Cocat 1 Flow kg/hr | Cocat 2 Conc. ppm | Cocat 2 Flow kg/hr | $Zn^4$ in polymer ppm | Poly Rate[5] kg/hr | Conv. %[6] | Solids % | Eff.[7] |
|---|---|---|---|---|---|---|---|---|---|---|
| Multi-Block 500[8] | 0.3 | 1008 | 0.16 | 0 | 0 | 750 | 4.0 | 90.0 | 16.0 | 232 |

[1]standard cm$^3$/min
[2][N-(2,6-di(1-methylethyl)phenyl)amido)(2-isopropylphenyl)(α-naphthalen-2-diyl)(6-pyridin-2-diyl)methane)]hafnium dimethyl
[3]bis-(1-(2-methylcyclohexyl)ethyl)(2-oxoyl-3,5-di(t-butyl)phenyl)immino) zirconium dibenzyl
[4]ppm in final product calculated by mass balance
[5]polymer production rate
[6]weight percent ethylene conversion in reactor
[7]efficiency, kg polymer/g M where g M = g Hf + g Z
[8]Additive package: 1200 ppm Irganox 1010.

TABLE

The Properties of Multi-Block 500 and AFFINITY ® GA 1950.

| Sample | Density (g/cm³) | Brookfield Viscosity@ 177° C. (cP) | $M_w$ (g/mol) | $M_n$ (g/mol) | $M_w/M_n$ | Heat of Fusion (J/g) | $T_m$ (° C.) | $T_{m2}$ (° C.) | $T_c$ (° C.) | $T_{c2}$ (° C.) | Tensile Strength (MPa) | Elongation at Break (%) |
|---|---|---|---|---|---|---|---|---|---|---|---|---|
| Multi-block 500 | 0.8771 | 15,757 | 22,400 | 9,720 | 2.3 | 60 | 110 | 96 | 95 | 20.3 | 2.1 | 190 |
| AFFINITY ® GA 1950[1] | 0.8755 | 15,237 | 22,500 | 10,100 | 2.2 | 64 | 72 | NA | 53 | 33 | 2.3 | 262 |

NM: Not Measured
NA: Not Applicable
[1] AFFINITY ® GA 1950 is a polyolefin plastomer obtained from The Dow Chemical Co., Midland, MI.

For the neutron activation measurements, duplicate samples were prepared by transferring approximately 3.5 g of the polymer into pre-cleaned 2-dram polyethylene vials. Duplicate standard samples of Si were prepared from its standard solution into similar vials. The standards were diluted using pure water. The samples and the standards were then analyzed following the standard NAA procedure (ASIA-SOP-G.005) for Si. Notice that the samples were transferred to un-irradiated vials before performing the gamma spectroscopy. The Si measured in ppm was then converted to wt % Si and then wt % VTMS by: (wt % Si)×5.277=wt % VTMS.

Silane Grafting the High Flow Polymers

AFFINITY® GA1950 and a polymer of this invention with similar viscosity and overall density, Multi-block 500, with properties discussed above, were silane grafted according to the following representative procedure. The VTMS silane A-171 by General Electric was added at 4 wt % and Trigonox 101 peroxide by Akzo Noble was added at 950 and 1050 ppm. The resin and the silane/peroxide were combined together and the liquid masterbatch was fed into the extruder into the solids feed zone before melting section. Both the copolymers were stabilized with Irganox™ 1010, available from Ciba Specialty Chemicals, before the melting section.

The copolymer feedstock and a liquid silane/peroxide masterbatch mixture containing vinyltrimethoxysilane (VTMS, 0.87 lb (0.395 kg)) and Trignox®101 (2,5-dimethyl-2,5-di (tert-butyl peroxy)hexane, 4.1 g) were simultaneously added to the feed throat of a co-rotating twin screw, continuous extruder (Werner & Pfleiderer-ZSK 30, with an eleven barrel section extruder). Each barrel section was 90 mm in length, and the barrel sections were stacked length-to-length. The temperatures for the internal barrel sections 3-9 were set at 220° C.-240° C. Barrel sections 1, 2, 10 and 11 were not heated, but the temperatures of barrel sections 10 and 11 did increase via heat transfer from the molten resin. The total throughput was 10 lb/hr (4.54 kg/hr), and the extruder operated at 300 RPM. The residence time of the resin through the extruder was around 1-4 minutes. The mixture was continuously extruded though a die plate, quenched in an underwater pelletizer, and cut into pellets. The pellet water temperature was maintained below 23° C. to ease pelletizing and to prevent pellet agglomerates. During the extrusion, a portion of the unreacted silane was removed from the extruder through a vacuum vent set at −25 inches Hg (−635 mm Hg) located at barrel section 9, located towards the end of the extruder.

The weight percentage of silane within the extrudate was determined from the mass flow of the resin, and the volumetric flow rate of the silane/peroxide masterbatch, which was converted to mass flow rate based on a calibration.

A screw design that provides a longer residence time and proper melt temperature profile characteristics improves the grafting efficiency. The length and the length-to-diameter ratio (L/D) of the screw design has been shown to provide little effect on the grafting efficiency. However, the screw design can have an effect on the optimum grafting efficiency of the process. The melt temperatures of 220° C. gave slightly higher silane graft level for the same amount of VTMS silane added than the temperature of 240° C. Also, the type of silane used for grafting can have an effect on the grafting efficiency with other parameters being the same. For example, the grafting efficiency with VTMS is lower at the higher temperatures, while with VTES it is higher. Two comparative screws (#Si-g-EO-4 screw design and #HMA Si-g-EO-1 screw design), having the same overall length and length-to-diameter ratio (L/D), produced different levels of grafted polymer. However, one screw design, the Si-g EO-4 design, had a longer melt residence time than the other screw design, the HMA Si-g-EO-1 design. The Si-g-EO-4 screw design had a melting zone that started at 6 L/D from the feed end of the screw to the end of the extruder, while the HMA Si-g-EO -1 screw design had the same, but in addition it utilized a greater number of kneading blocks, throughout the length of the screw, and these kneading blocks were designed for more intensive kneading and provide a longer residence time, especially in the mixing and melting zones. Thus, the earlier melting of the materials within the extruder and the higher extrusion temperature peak, coupled with a longer material residence time, were advantageous for achieving an increased level of silane grafting.

The following table provides a summary of the weight percentages of silane added into the extruder, and the % VTMS in the extrudate. The weight of the silane and peroxide are each based on the total weight of the reactive composition (base resin (or resin formulation) plus silane plus peroxide).

As seen from the table, the % VTMS in the extrudate was good for the samples produced from an extruder equipped with the HMA Si-g-EO-1 screw design. For the same level of peroxide and silane added, Multi-block 500 block gave a higher level of grafting than the AFFINITY® GA1950 random ethylene/octene copolymer.

TABLE

Summary of VTMS Grafting Results.

| Material: | Feed Rate, lb/hr | Screw Speed, rpm | BARREL #6 MELT THERMOCOUPLE (° C.) | Peroxide, added to extruder ppm | Silane added to extruder, wt % | % VTMS Neutron Activation* |
|---|---|---|---|---|---|---|
| AFFINITY ® GA 1950 | 10 | 300 | 237 | 1050 | 4 | 2.13 |
| Multi-Block 500 | 10 | 300 | 238 | 1050 | 4 | 2.53 |

*Measured on pellets (not dried in vacuum oven)

Curing of Silane Grafted Resins and Resulting Properties

The silane grafted AFFINITY® GA 1950 previously described and the silane grafted Multi-Block 500 previously described were silane cured as follows, resulting in silane grafted and cured products, si-AFFINITY® GA 1950 and si-Multi-Block 500. The Haake bowl temperature was set at 100° C. The Rheomix 600 (50 gram) bowl was preheated to 100° C. The rotors were started at 30 rpm. The sealed foil bag containing the silane grafted polymer was opened to remove 50 grams which was immediately added to the bowl. After 2 minutes of rotation and melting, the ram was lifted, and 0.1 g (2000 ppm) of ALDRICH 95% Di-butyl tin dilaurate was added. The ram was lowered to continue mixing. The blend was allowed to mix for an additional 6 minutes. The polymer was then removed and pressed in Mylar in a room temperature press to solidify the sample. The polymer was then molded into 1-80 mil×5"×5" plaques on a laminating press. The plaque was then placed in a tray of water which had been placed in an oven heated to 45° C. for 114 hours. The plaques were dried and then tested.

Results include the density, the % gel from xylene extractables, the % VTMS from neutron activation (as described previously), the thermal properties from DSC, mechanical properties from tensile data, and solid state dynamic mechanical data (these were measured as previously but at 1 rad/s). These procedures have been reported previously; the % gel from xylene extractables and the mechanical properties tests will be described here.

The xylene extractables are the portion of the polymer soluble in refluxing xylene after 12 hours. It is measured as the percentage of weight loss of the sample. The test is run according to ASTM D2765. The non-extractable portion is referred to as the gel content and is reported in %. These properties were measured on the base polymer and the silane grafted and cured polymer. The mechanical properties were measured on an Instron Model 5564. The samples were approximately 1.85 mm thick and were pulled at 5"/min. The microtensile specimens conformed to ASTM D-1708.

The results are reported in the following table.

TABLE

Properties of AFFINITY ® GA 1950 and Multiblock 500 and the silane grafted and cured properties (si-AFFINITY ® GA 1950 and si-Muliblock 500).

|  | Density (g/cc) | % Xylene Extractables | % Gel from Xylene Extractables | $T_{m1}$ (° C.) | $T_{m2}$ (° C.) | Heat of Fusion (J/g) | % Cryst Based on 292 J/g | $T_{c1}$ (° C.) | $T_{c2}$ (° C.) | $T_{c3}$ (° C.) | $T_g$ (° C.) |
|---|---|---|---|---|---|---|---|---|---|---|---|
| AFFINITY ® GA 1950 | 0.8801 |  |  | 72 | 56 | 53 | 18 | 54 |  | 34 | −52 |
| Multiblock 500 | 0.8806 |  |  | 114 | 97 | 43 | 15 | 101 | 90 | 19 | −61 |
| si-AFFINITY ® GA1950[1] | 0.8796 | 36 | 64 | 71 |  | 51 | 18 | 53 |  |  | −51 |
| si-Multiblock 500[1] | 0.8801 | 31 | 69 | 100 |  | 40 | 14 | 100 | 75 |  | −56 |

|  | Yield Stress (Psi) | % Elongation at Break | Young's Modulus (Psi) | 2% Secant Modulus (Psi) | Energy at Max. Load (in-lbf) | Tensile Strength (Psi) |
|---|---|---|---|---|---|---|
| AFFINITY ® GA 1950 | 293 | 123 | 1292 | 813 | 4 | 306 |
| Multiblock 500 | 266 | 105 | 1219 | 156 | 3 | 279 |
| si-AFFINITY ® GA1950[1] | 467 | 253 | 2028 | 1501 | 13 | 659 |
| si-Multiblock 500[1] | 335 | 257 | 4222 | 3108 | 14 | 745 |

[1]Silane grafted and cured.

Figure 12:
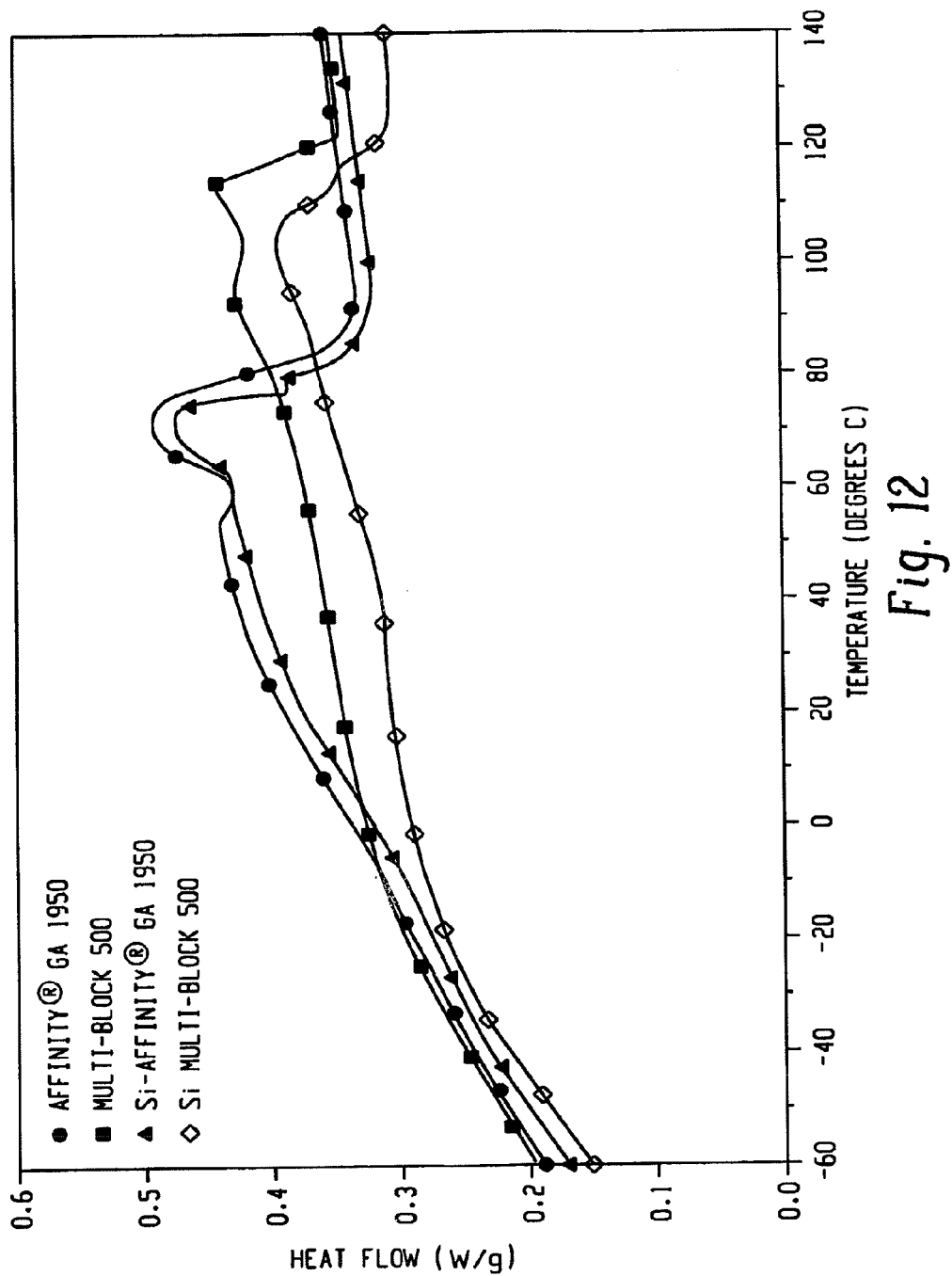
FIG. 12 is a graph showing the comparison of thermal properties of AFFINITY® GA1950, Multi-block 500, si-AFFINITY® GA 1950, and si-Multi-block 500.
Figure 13:
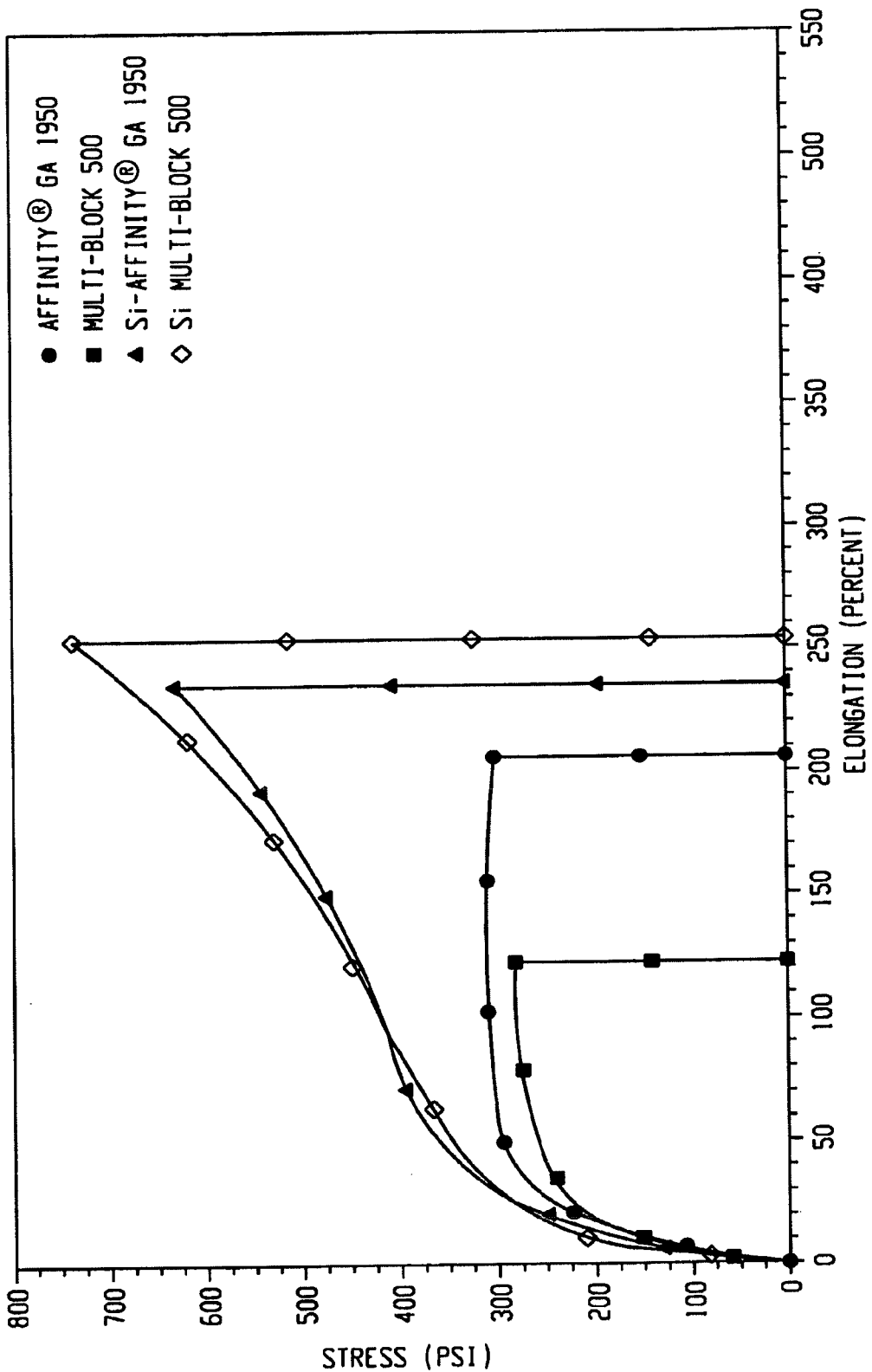
FIG. 13 is a graph showing the comparison of mechanical properties of AFFINITY® GA1950, Multi-block 500, si-AFFINITY® GA 1950, and si-Multi-block 500.
Figure 14:
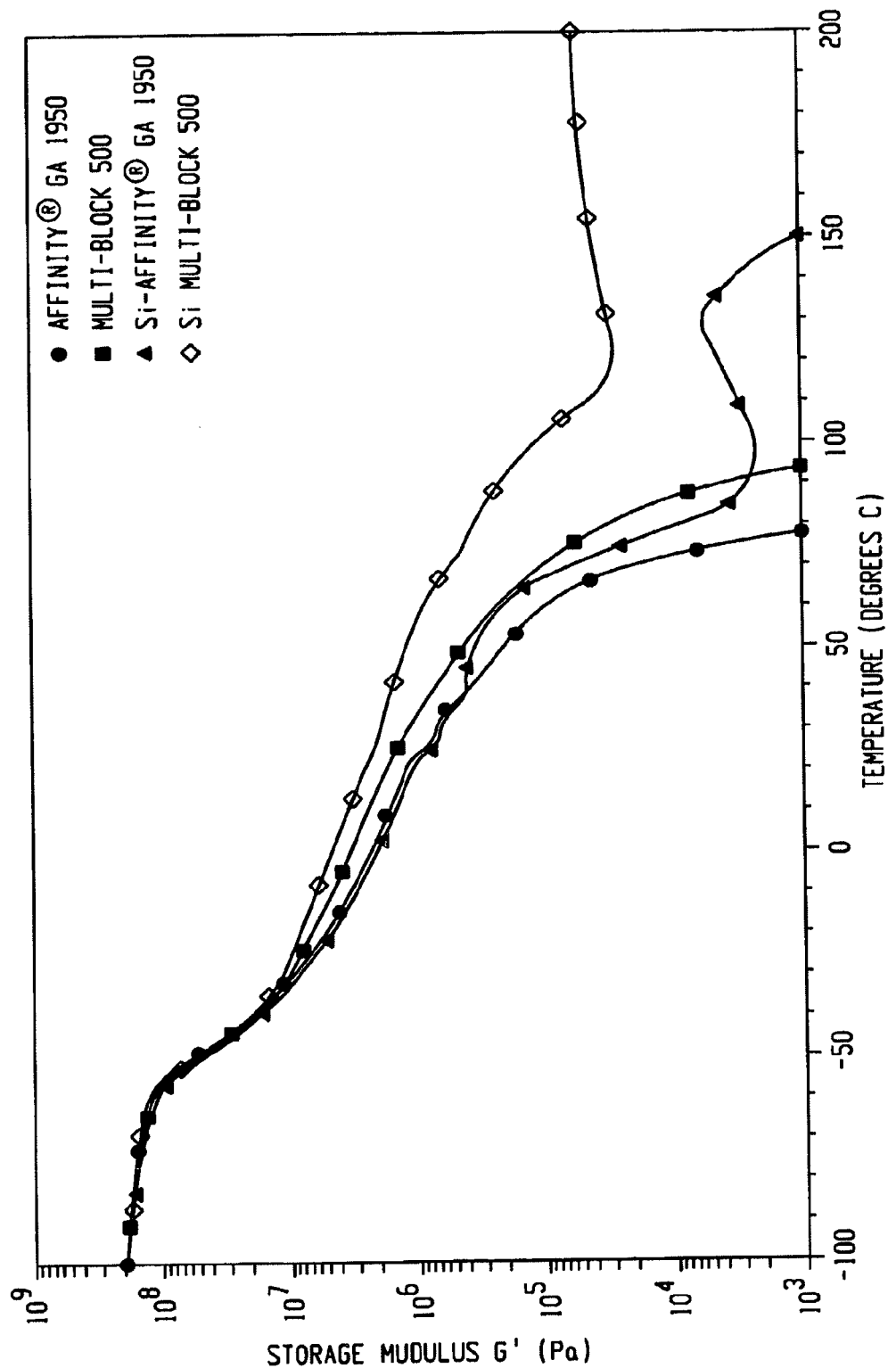
FIG. 14 is a graph showing the comparison of storage modulus G' of AFFINITY® GA1950, Multi-block 500, si-AFFINITY® GA 1950, and si-Multi-block 500.
Figure 15:
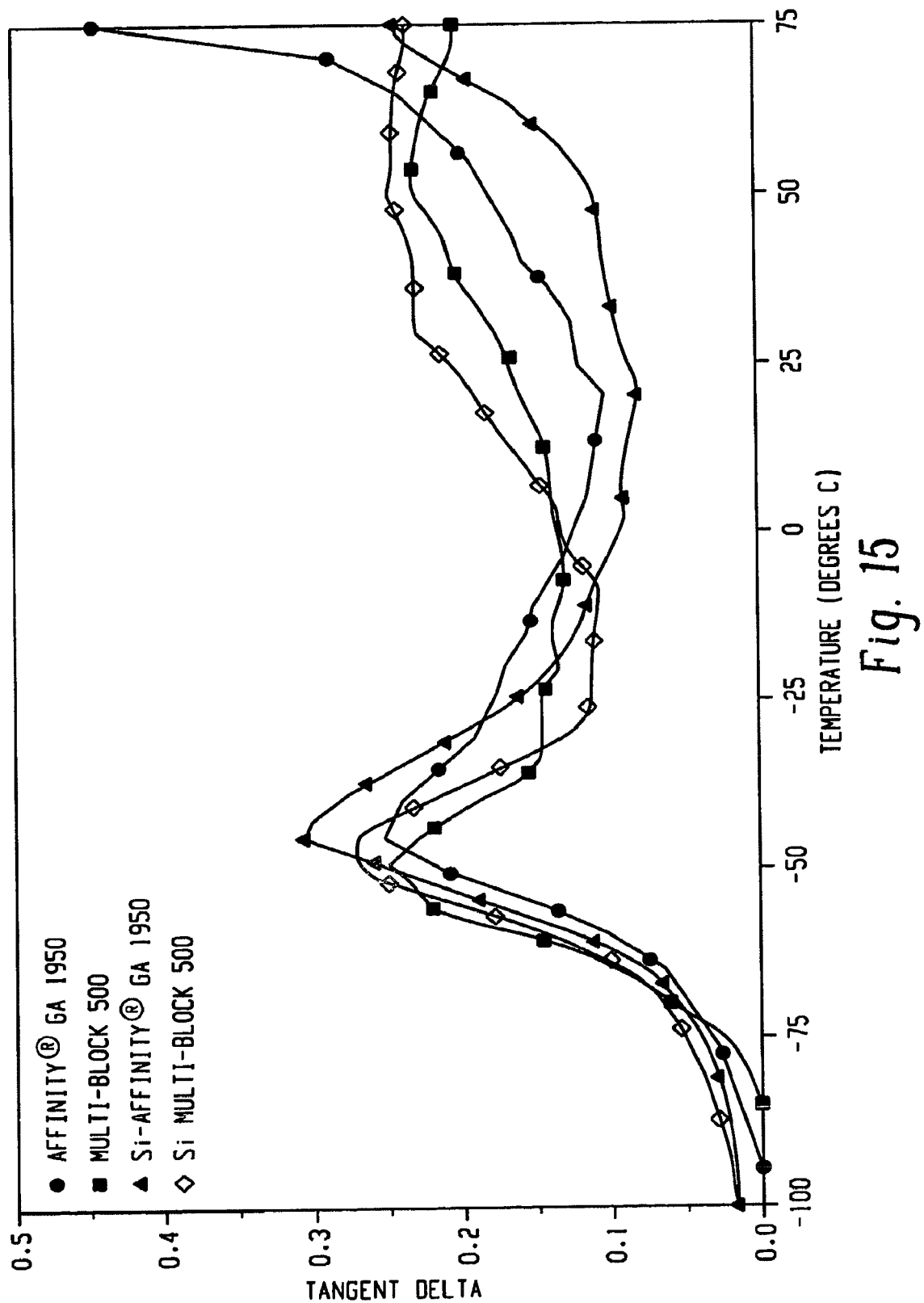
FIG. 15 is a graph showing the comparison of tan delta of AFFINITY® GA1950, Multi-block 500, si-AFFINITY® GA 1950, and si-Multi-block 500.

As shown above and previously, AFFINITY® GA 1950 and Multi-block 500 had comparable density and Brookfield viscosity. At equivalent grafting process conditions, Multi-block 500 showed a more favorable incorporation of VTMS (2.53%) as compared to AFFINITY® GA 1950 (2.13%) indicating a more efficient incorporation of silane resulting in more beneficial process economics. Higher melting temperatures ($T_{m1}$ and $T_{m2}$, $T_{m1}$ representing the primary melting temperature and $T_{m}2$ representing a secondary more minor melting temperature) are seen for Multi-block 500 ($T_{m1}$ of 114° C.) and si-Multi-block 500 ($T_{m1}$ of 100° C.) as compared to AFFINITY® GA 1950 ($T_{m1}$ of 72° C.) and si-AFFINITY® GA 1950 ($T_{m1}$ of 71° C.) as shown in the attached FIG. 12. Multi-block 500 also shows lower glass transition temperatures ($T_g$) than AFFINITY® GA 1950 indicating better low temperature properties. The mechanical properties of the silane grafted and cured si-Multi-block 500 shows excellent elongation, Young's modulus, 2% Secant modulus, and tensile strength as compared to the si-AFFINITY® GA 1950. The mechanical properties in the previous table are the average of 5 replicates. A representative comparison is shown in the attached FIG. 13. The solid state dynamical mechanical properties are shown in the attached FIG. 14 and show for the si-Multi-block 500 that the storage modulus shows a high and stable value at elevated temperature greater than 100° C. indicating good high temperature resistance. This is in contrast to the si-AFFINITY® GA1950 where the modulus is low at high temperature, indicating poor low temperature resistance. A dramatic change in the high temperature properties is also seen when Multi-block 500 and si-Multi-block 500 are compared, showing the effectiveness of the silanation and curing. The tan delta, or ratio of loss to storage modulus (G"/G") is shown in the attached FIG. 15. Again, glass transition temperatures are lower for Multi-block 500 and si-Multi-block 500 as compared to AFFINITY® GA 1950 and si-AFFINITY® GA 1950. This is inferred from the peak at low temperatures. Additionally at higher temperatures the tan delta of si-Multi-block 500 remains low, indicating good elasticity at high temperatures. These data are summarized in the attached table. Multi-block 500 with its low viscosity and good high temperature properties is expected to show good properties as an adhesive when especially when mixed with a tackifier and oil and cured.

TABLE

Solid state dynamic mechanical G' and tan delta on AFFINITY ® GA-1950, Multi-block 500, si-AFFINITY ® GA-1950, and si-Multi-block 500.

| Temp (° C.) | G' (Pa) AFFINITY ® GA1950 | Tan Delta AFFINITY ® GA1950 | G' (Pa) Multi-block 500 | Tan Delta Multi-block 500 | G' (Pa) si-AFFINITY ® GA1950 | Tan Delta si-AFFINITY ® GA1950 | G' (Pa) si-Multi-block 500 | Tan Delta si-Multi-block 500 |
|---|---|---|---|---|---|---|---|---|
| −100 | 1.50E+09 | −0.0043 | 1.70E+09 | −0.0052 | 1.42E+09 | 0.0161 | 1.46E+09 | 0.0153 |
| −95 | 1.49E+09 | 0.0024 | 1.64E+09 | −0.0029 | 1.40E+09 | 0.0161 | 1.42E+09 | 0.0183 |
| −90 | 1.43E+09 | 0.0074 | 1.58E+09 | −0.0010 | 1.35E+09 | 0.0204 | 1.37E+09 | 0.0235 |
| −85 | 1.38E+09 | 0.0147 | 1.52E+09 | 0.0027 | 1.30E+09 | 0.0261 | 1.31E+09 | 0.0318 |
| −80 | 1.33E+09 | 0.0229 | 1.44E+09 | 0.0092 | 1.25E+09 | 0.0336 | 1.26E+09 | 0.0410 |
| −75 | 1.27E+09 | 0.0319 | 1.35E+09 | 0.0265 | 1.19E+09 | 0.0419 | 1.20E+09 | 0.0508 |
| −70 | 1.20E+09 | 0.0449 | 1.24E+09 | 0.0477 | 1.12E+09 | 0.0528 | 1.12E+09 | 0.0641 |
| −65 | 1.10E+09 | 0.0641 | 1.13E+09 | 0.0795 | 1.04E+09 | 0.0715 | 1.02E+09 | 0.0866 |
| −60 | 9.59E+08 | 0.0951 | 8.98E+08 | 0.1402 | 9.05E+08 | 0.1061 | 8.63E+08 | 0.1329 |
| −55 | 7.41E+08 | 0.1483 | 5.84E+08 | 0.2149 | 7.03E+08 | 0.1674 | 6.30E+08 | 0.2120 |
| −50 | 4.89E+08 | 0.2157 | 3.47E+08 | 0.2469 | 4.64E+08 | 0.2471 | 3.98E+08 | 0.2682 |
| −45 | 2.95E+08 | 0.2522 | 2.14E+08 | 0.2191 | 2.65E+08 | 0.3079 | 2.43E+08 | 0.2697 |
| −40 | 1.82E+08 | 0.2416 | 1.47E+08 | 0.1711 | 1.56E+08 | 0.2915 | 1.61E+08 | 0.2232 |
| −35 | 1.18E+08 | 0.2166 | 1.09E+08 | 0.1401 | 9.97E+07 | 0.2460 | 1.19E+08 | 0.1713 |
| −30 | 8.31E+07 | 0.1904 | 8.57E+07 | 0.1283 | 6.81E+07 | 0.1997 | 9.49E+07 | 0.1377 |
| −25 | 5.96E+07 | 0.1768 | 6.89E+07 | 0.1240 | 5.07E+07 | 0.1635 | 7.95E+07 | 0.1125 |
| −20 | 4.60E+07 | 0.1704 | 5.69E+07 | 0.1271 | 3.92E+07 | 0.1401 | 6.76E+07 | 0.1117 |
| −15 | 3.72E+07 | 0.1564 | 4.81E+07 | 0.1177 | 3.20E+07 | 0.1245 | 5.87E+07 | 0.1063 |
| −10 | 3.01E+07 | 0.1500 | 4.05E+07 | 0.1295 | 2.65E+07 | 0.1117 | 5.15E+07 | 0.1058 |
| −5 | 2.49E+07 | 0.1326 | 3.46E+07 | 0.1268 | 2.26E+07 | 0.1042 | 4.47E+07 | 0.1222 |
| 0 | 2.13E+07 | 0.1237 | 2.96E+07 | 0.1288 | 1.95E+07 | 0.0925 | 3.94E+07 | 0.1268 |
| 5 | 1.81E+07 | 0.1141 | 2.50E+07 | 0.1501 | 1.69E+07 | 0.0869 | 3.47E+07 | 0.1344 |
| 10 | 1.56E+07 | 0.1091 | 2.11E+07 | 0.1537 | 1.46E+07 | 0.0860 | 2.95E+07 | 0.1589 |
| 15 | 1.31E+07 | 0.1054 | 1.77E+07 | 0.1715 | 1.23E+07 | 0.0810 | 2.56E+07 | 0.1678 |
| 20 | 1.12E+07 | 0.1023 | 1.50E+07 | 0.1746 | 1.04E+07 | 0.0772 | 2.20E+07 | 0.1807 |
| 26 | 7.45E+06 | 0.1214 | 1.16E+07 | 0.1850 | 7.17E+06 | 0.0877 | 1.59E+07 | 0.2036 |
| 30 | 6.68E+06 | 0.1244 | 1.02E+07 | 0.1888 | 6.47E+06 | 0.0892 | 1.40E+07 | 0.2276 |
| 35 | 5.33E+06 | 0.1357 | 8.30E+06 | 0.1955 | 5.13E+06 | 0.0958 | 1.25E+07 | 0.2291 |
| 40 | 3.58E+06 | 0.1564 | 6.44E+06 | 0.2094 | 3.63E+06 | 0.0991 | 1.12E+07 | 0.2323 |
| 45 | 2.55E+06 | 0.1660 | 4.99E+06 | 0.2149 | 2.83E+06 | 0.1012 | 1.00E+07 | 0.2355 |
| 50 | 1.85E+06 | 0.1799 | 3.70E+06 | 0.2306 | 2.37E+06 | 0.1113 | 8.72E+06 | 0.2478 |
| 55 | 1.35E+06 | 0.1928 | 2.80E+06 | 0.2264 | 2.01E+06 | 0.1230 | 7.89E+06 | 0.2433 |
| 60 | 9.32E+05 | 0.2132 | 2.00E+06 | 0.2241 | 1.63E+06 | 0.1425 | 7.04E+06 | 0.2389 |
| 65 | 5.25E+05 | 0.2383 | 1.35E+06 | 0.2131 | 1.14E+06 | 0.1861 | 5.90E+06 | 0.2383 |
| 70 | 2.13E+05 | 0.2900 | 9.15E+05 | 0.2038 | 5.82E+05 | 0.2297 | 4.38E+06 | 0.2372 |
| 75 | 48231 | 0.4426 | 5.63E+05 | 0.2002 | 2.11E+05 | 0.2435 | 3.41E+06 | 0.2284 |
| 80 | 4357.61 | 1.3004 | 3.10E+05 | 0.2016 | 75128.2 | 0.3468 | 2.73E+06 | 0.2155 |
| 85 | 249.978 | 8.8342 | 1.36E+05 | 0.2298 | 34498.2 | 0.5315 | 2.19E+06 | 0.2007 |
| 90 | −337.85 | 0.6853 | 39387.1 | 0.3147 | 26323.3 | 0.5652 | 1.73E+06 | 0.1857 |
| 95 | 382.492 | −1.3694 | 6014.76 | 0.8614 | 24373.6 | 0.5391 | 1.31E+06 | 0.1679 |
| 100 | | | 182.324 | 11.8690 | 24051.8 | 0.4831 | 9.54E+05 | 0.1478 |
| 105 | | | | | 26170.1 | 0.4101 | 6.63E+05 | 0.1190 |
| 110 | | | | | 30495.2 | 0.3244 | 4.42E+05 | 0.0848 |
| 115 | | | | | 36501.1 | 0.2637 | 3.01E+05 | 0.0452 |
| 120 | | | | | 43352.1 | 0.1913 | 2.66E+05 | 0.0323 |
| 125 | | | | | 48313.8 | 0.1759 | 2.78E+05 | 0.0304 |
| 130 | | | | | 52862.6 | 0.1330 | 2.98E+05 | 0.0295 |
| 135 | | | | | 42034.9 | 0.1555 | 3.20E+05 | 0.0230 |
| 140 | | | | | 29167.4 | 0.2329 | 3.37E+05 | 0.0258 |
| 145 | | | | | 18065.4 | 0.3069 | 3.56E+05 | 0.0229 |
| 150 | | | | | 9804.16 | 0.6027 | 3.68E+05 | 0.0251 |
| 155 | | | | | 7524.3 | 0.7163 | 3.77E+05 | 0.0205 |
| 160 | | | | | −1148.7 | −4.7266 | 3.89E+05 | 0.0228 |
| 165 | | | | | −7487.9 | −0.7024 | 4.00E+05 | 0.0244 |

TABLE-continued

Solid state dynamic mechanical G' and tan delta on AFFINITY ® GA-1950, Multi-block 500, si-AFFINITY ® GA-1950, and si-Multi-block 500.

| Temp (° C.) | G' (Pa) AFFINITY ® GA1950 | Tan Delta AFFINITY ® GA1950 | G' (Pa) Multi-block 500 | Tan Delta Multi-block 500 | G' (Pa) si-AFFINITY ® GA1950 | Tan Delta si-AFFINITY ® GA1950 | G' (Pa) si-Multi-block 500 | Tan Delta si-Multi-block 500 |
|---|---|---|---|---|---|---|---|---|
| 170 | | | | | −20760 | −0.1633 | 4.15E+05 | 0.0228 |
| 175 | | | | | | | 4.28E+05 | 0.0229 |
| 180 | | | | | | | 4.43E+05 | 0.0210 |
| 185 | | | | | | | 4.55E+05 | 0.0220 |
| 190 | | | | | | | 4.68E+05 | 0.0220 |
| 195 | | | | | | | 4.79E+05 | 0.0202 |
| 200 | | | | | | | 4.89E+05 | 0.0219 |

Modification of Base Polymer with BSA or Peroxide

A series of polymer samples was prepared on a twin screw extruder in which the polymer was modified through the use of various levels of bis-Sulfonyl Azide (BSA) concentrate at 25% active BSA, Peroxide (Trigonox 101), or a combination of Peroxide (Trigonox 101) with tri-allyl cyanurate (TAC) as a co-agent. Below is a table describing the 2.5 pound blends that were prepared.

| Blend | A 0.877 g/cc, 1 MI, % (inventive) | B 0.877 g/cc, 5 MI, % (inventive) | C ENGAGE ® 8100% | BSA ppm | PER-OXIDE ppm | Coagent ppm |
|---|---|---|---|---|---|---|
| 1 | 100 | | | 0 | 0 | |
| 2 | 100 | | | 100 | | |
| 3 | 100 | | | 200 | | |
| 4 | 100 | | | 400 | | |
| 5 | 100 | | | 800 | | |
| 6 | 100 | | | | 100 | |
| 7 | 100 | | | | 200 | |
| 8 | 100 | | | | 400 | |
| 9 | 100 | | | | 800 | |
| 10 | 100 | | | | 800 | 800 |
| 11 | 70 | 30 | | 0 | 0 | |
| 12 | 70 | 30 | | 800 | | |
| 13 | 70 | 30 | | | 800 | |
| 14 | 70 | 30 | | | 800 | 800 |
| 15 | | | 100 | 0 | 0 | |
| 16 | | | 100 | 800 | | |
| 17 | | | 100 | | 800 | |
| 18 | | | 100 | | 800 | 800 |

In the above table, samples A and B are ethylene/α-olefin multi-block interpolymers made in a manner similar to that described in Tables 2 and 8 above. Sample A had a density of 0.877 g/cc with a 1 MI and sample B had a density of 0.877 g/cc with a 5 MI. Sample C is a commercially available comparative example called ENGAGE®8100 from The Dow Chemical Company having a density of 0.870 g/cc and a 1 MI. The BSA in the table refers to active BSA which is at a level of 25% in the concentrate. The peroxide is 90% active. The physical nature of the BSA molecular melt is a powder, the peroxide a liquid, and the co-agent a granular crystal. In the case of the BSA samples silicone oil (Dow Corning 200 FLUID, a 20 CST polydimethylsiloxane) was used as a surfactant to uniformly coat the pellets with the BSA powder. This was accomplished by first dry blending the pellets in a plastic bag. Approximately 2 ml of silicone fluid was then added to the pellets and tumbled in the bag to disperse the oil on the pellet surface. The coated pellets were then removed to a new clean bag. The BSA molecular melt was then sprinkled onto the pellets and tumbled by hand in the sealed air filled bag to disperse the molecular melt onto the pellet surface. The second plastic bag was used to minimize loss of molecular melt on the oil coated surface of the initial bag. With the peroxide containing blends the peroxide was added dropwise onto the pellets in the bag. The bag of pellets was air filled and sealed, then hand tumbled to disperse the peroxide throughout the pellet mixture. If a co-agent was used, the pulverized TAC granules were added after the peroxide was dispersed, the bag was air filled, sealed, and tumbled to uniformly disperse the TAC.

The above prepared samples were fed to a pre-heated twin screw extruder. The extruder is an 18 mm co-rotating 30 L/D Leistritz controlled by a Haake computer system and incorporates a series of conveying elements and kneading block areas for shear heating, mixing and reacting. The polymer flows from left to right and finally past the tips through a die forming a strand passing through a series of two water baths, through an air knife, and finally pelletized by a strand chopper into pellets which were collected and saved.

The extruder consisted of six zones and a heated die. The first zone was cooled with a circulating water jacket to prevent premature melting of the pellet feed and subsequent bridging of the feed zone. The five remaining zones were electrically heated and air cooled controlled at 120, 150, 190, 190, and 190° C. The die was heated to 190° C. The pellets were fed to the extruder by a K-TRON twin auger pellet feeder at a rate of 2-3 pounds/hour. The feed hopper was sealed and supplied with a flow of nitrogen to minimize oxidation of the polymer in the extruder. The transition from pellet feeder to extruder feed port was sealed with aluminum foil to also minimize air intrusion. The drive unit of the extruder was turning at 150 rpm resulting in a screw speed of 188 rpm. This would allow an extruder residence time of approximately 1.25-1.75 minutes.

The following table below displays the extrusion parameters of the various blends prepared. The collected pellets prepared from this reactive extrusion modification were subsequently submitted for analyses.

| BLEND | Feed rate #/hr | Melt Temp ° C. | Torque m-g | Die Pressure PSI |
|---|---|---|---|---|
| 1 | 3.0 | 197 | 6000 | 830 |
| 2 | 3.0 | 197 | 5700 | 870 |
| 3 | 2.9 | 197 | 5600 | 900 |
| 4 | 2.8 | 196 | 5700 | 945 |
| 5 | 2.9 | 198 | 6000 | 915 |
| 6 | 2.15 | 195 | 4700 | 675 |
| 7 | 2.0 | 195 | 4700 | 750 |

-continued

| BLEND | Feed rate #/hr | Melt Temp ° C. | Torque m-g | Die Pressure PSI |
|---|---|---|---|---|
| 8 | 2.2 | 195 | 5000 | 720 |
| 9 | 2.2 | 195 | 5200 | 725 |
| 10 | 1.75 | 200 | 6500 | 1350 |
| 11 | 2.9 | 196 | 5200 | 740 |
| 12 | 2.9 | 196 | 5100 | 815 |
| 13 | 2.4 | 194 | 5300 | 700 |
| 14 | 2.0 | 196 | 5500 | 1200 |
| 15 | 3.0 | 196 | 5800 | 805 |
| 16 | 2.8 | 196 | 5500 | 875 |
| 17 | 2.2 | 195 | 5100 | 740 |
| 18 | 1.5 | 200 | 6900 | 1550 |

Characterization of the Resins and Blends

Density

Density of the samples was measured by use of solvent-displacement method (based on the Archimedes' principle) which gives the specific gravity of the sample. Prior to the measurement a known volume of the sample was compression molded at 190° C. and then immersed in 2-propanol. The volume of the solvent displaced was observed and as a result the specific gravity of the specimen was computed. This test complies with ASTM D792, Method B.

Melt Index $I_2$, measured in grams per 10 minutes, is done in accordance with ASTM D 1238, Condition 190° C./2.16 kg. $I_{10}$ is measured in accordance with ASTM D 1238, Condition 190° C./10 kg.

Differential Scanning Calorimetry (DSC)

Differential Scanning Calorimetry was performed on a TA Instruments Q1000 DSC equipped with an RCS cooling accessory and an auto sampler. A nitrogen purge gas flow of 50 ml/min was used. The sample was pressed into a thin film and melted in the press at about 190° C. and then air-cooled to room temperature (25° C.). About 3-10 mg of material was then cut, accurately weighed, and placed in a light aluminum pan (ca 50 mg) which was later crimped shut. The thermal behavior of the sample was investigated with the following temperature profile: the sample was rapidly heated to 230° C. and held isothermal for 3 minutes in order to remove any previous thermal history. For the butene-based polymers, the sample was then cooled to −90° C. at 10° C./min cooling rate and held at −90° C. for 3 minutes. The sample was then heated to 230° C. at 10° C./min heating rate. For the octene-based polymers, the sample was then cooled to −40° C. at 10° C./min cooling rate and held at −40° C. for 3 minutes. The sample was then heated to 190° C. at 10° C./min heating rate. The first cooling and second heating curves were recorded.

Melt Rheology

All the dynamic mechanical measurements (viscosity vs. frequency and temperature, loss and storage modulus vs. temperature) were measured on TA instruments ARES. The viscosity vs. frequency measurements were performed using a parallel plate configuration from 0.1-100 rad/s at 190 C.

Thermal Mechanical Analysis (TMA)

Thermal Mechanical Analysis (TMA), that measures penetration of probe (ca. 1.1 mm in diameter) into a small cylindrical sample as temperature is raised from ambient conditions, was performed. The samples were compression molded into a cylindrical geometry of ca. 3.3 mm thick and 8 mm in diameter. The temperature was raised from 25° C. to 190° C. at a rate of 5° C./min with the probe applying a constant force of 1000 mN on the surface of the sample.

Compression Set

Compression set was measured according to ASTM D 395 at ambient and 70° C. The sample was prepared by stacking 25.4 mm diameter round discs of 3.2 mm, 2.0 mm, and 0.25 mm thickness until a total thickness of 12.7 mm is reached. The discs were cut from 12.7 cm×12.7 cm compression molded plaques that were molded in a hot press under the following conditions: zero pressure for 3 min at 190° C., followed by 86 MPa for 2 min at 190° C., followed by cooling inside the press with cold running water running inside the metal plates at 86 MPa.

Melt Strength

Melt strength of the base polymers and blends was measured at 190° C. on a Gottfert Rheotester 2000 and Gottfert Rheotens 71.97. The barrel length of the rheometer was 285 mm and width ca. 12 mm. A 30/2 die for the extrusion of the polyethylene along with 1000 bar transducer was utilized. When running melt strength, only the transducer was used to prevent the rheotester from getting overloaded and thereby preventing any damage to the rheometer. The sample was allowed to melt in the barrel for ten minutes, followed by extrusion through the die at a rate of 0.27 mm/s (shear rate of ca. 38 $s^{-1}$). As the sample extrudes out of the die, it passes through the wheels of the Rheotens, which pulls the polymer in a downward motion. As the wheel velocity increases, the force required to pull the molten extrudate was measured in cN.

Tensile Properties and Shore A Hardness

Unoriented quenched compression molded films of ca. 0.4 mm thickness and plaques of thickness of 2 mm were produced on a hot press (Carver Model #4095-4PR1001R). Preweighed amounts of the pellets were placed between polytetrafluoroethylene sheets, heated at 190° C. at 55 psi (380 kPa) for 3 min, followed by 1.3 MPa for 3 min, and then 2.6 MPa for 3 min. The film and plaques was then cooled in a separate set of metal plates in the press that were maintained at room temperature (ca. 21° C.). Stress-strain behavior in uniaxial tension was measured using ASTM D 1708 on the films. Samples were stretched in an Instron™ at 300% $min^{-1}$ at 21° C. Tensile strength, elongation at break and secant modulus at 100% strain were reported from an average of 5 specimens. The plaques were utilized for the shore A hardness measurement on a Hardness Tester 28217-A, Shore Instrument & Manufacturing Company, according to ASTM-D676.

| | | | | | Data Table | | | | | | |
|---|---|---|---|---|---|---|---|---|---|---|---|
| blend# | A, 0.877 g/cc, 1 MI (inventive) | B, 0.877 g/cc, 5 MI (inventive) | C, Engage 8100, 0870 g/cc, 1 MI | Active BSA*, ppm | Peroxide: Trigonx 101, ppm | Coagent, TAC, ppm | 70 C. C-set, % | I2 | I10 | I10/I2 | Mw |
| 1 | 100 | | | 0 | 0 | | 41 | 1.05 | 7.4 | 7.0 | 125000 |
| 2 | 100 | | | 100 | | | 44 | 0.92 | 6.7 | 7.2 | 128600 |
| 3 | 100 | | | 200 | | | 42 | 0.79 | 6.0 | 7.7 | 133700 |
| 4 | 100 | | | 400 | | | 36 | 0.59 | 5.1 | 8.7 | 139400 |

-continued

Data Table

| | | | | | | | | | | | |
|---|---|---|---|---|---|---|---|---|---|---|---|
| 5 | 100 | | | | 800 | | | 33 | 0.28 | 3.1 | 11.1 | 162900 |
| 6 | 100 | | | | | 100 | | 42 | 0.93 | 7.0 | 7.5 | 124600 |
| 7 | 100 | | | | | 200 | | 46 | 0.80 | 6.7 | 8.3 | 123700 |
| 8 | 100 | | | | | 400 | | 47 | 0.56 | 5.7 | 10.2 | 127100 |
| 9 | 100 | | | | | 800 | | 50 | 0.29 | 4.0 | 13.9 | 138900 |
| 10 | 100 | | | | | 800 | 800 | 45 | not measurable | | — | 227800 |
| 11 | 70 | 30 | | | | 0 | 0 | 45 | 1.53 | 10.5 | 6.8 | 111100 |
| 12 | 70 | 30 | | | | 800 | | 45 | 0.47 | 5.7 | 12.1 | 144500 |
| 13 | 70 | 30 | | | | 800 | | 50 | 0.51 | 6.4 | 12.6 | 125300 |
| 14 | 70 | 30 | | | | 800 | 800 | 44 | 0.04 | 1.1 | 25.2 | 191800 |
| 15 | | | 100 | | | 0 | 0 | NM | 1.0 | 8.08 | 8.5 | 110000 |
| 16 | | | 100 | | | 800 | | NM | 0.33 | 4.1 | 12.4 | 139000 |
| 17 | | | 100 | | | 800 | | NM | 0.15 | 2.8 | 19.0 | 146000 |
| 18 | | | 100 | | | 800 | 800 | NM | not measurable | | — | 214400 |
| 15% LDPE 662i w/ 1 MI, 0.877 g/cc Sample A | | | | | | | | 45 | 0.90 | NM | NM | NM |
| 30% LDPE 662i w/ 1 MI 0.877 g/cc Sample A | | | | | | | | 48 | 0.70 | NM | NM | NM |
| ENX896800 Control | | | | | | | | NM | | | NM | NM |
| ENX892100 Control | | | | | | | | NM | | | NM | NM |

| blend# | A, 0.877 g/cc, 1 MI (inventive) | B, 0.877 g/cc, 5 MI (inventive) | C, Engage 8100, 0870 g/cc, 1 MI | Active BSA*, ppm | Mn | Mw/Mn | melt str., cN | drawability, mm/s | Rheology ratio, $h_{0.1}/h_{100}$ | Shore A |
|---|---|---|---|---|---|---|---|---|---|---|
| 1 | 100 | | | 0 | 61000 | 2.0 | 3.1 | 217.0 | 4 | |
| 2 | 100 | | | 100 | 63000 | 2.0 | 3.2 | 138.0 | 5 | |
| 3 | 100 | | | 200 | 63600 | 2.1 | 4.7 | 130.0 | 6 | |
| 4 | 100 | | | 400 | 65200 | 2.1 | 6.6 | 132.0 | 8 | |
| 5 | 100 | | | 800 | 65100 | 2.5 | 9.8 | 60.0 | 23 | |
| 6 | 100 | | | | 61300 | 2.0 | 3.5 | 170.0 | 5 | |
| 7 | 100 | | | | 56300 | 2.2 | 4.6 | 155 | 7 | |
| 8 | 100 | | | | 56000 | 2.3 | 6.3 | 150.0 | 11 | |
| 9 | 100 | | | | 60000 | 2.3 | 7.9 | 125 | 23 | |
| 10 | 100 | | | | 61500 | 3.7 | 40 | 34 | 54 | |
| 11 | 70 | 30 | | 0 | 54100 | 2.1 | 2 | 280 | 3 | |
| 12 | 70 | 30 | | 800 | 58600 | 2.5 | 7.6 | 84 | 17 | |
| 13 | 70 | 30 | | | 49800 | 2.5 | 7.1 | 148 | 17 | |
| 14 | 70 | 30 | | | 47500 | 4.0 | 34 | 35 | 43 | |
| 15 | | | 100 | 0 | 55500 | 2.0 | 3.7 | 159 | 5 | |
| 16 | | | 100 | 800 | 59400 | 2.3 | 9.5 | 100 | 19 | |
| 17 | | | 100 | | 57300 | 2.5 | 10 | 121 | 36 | |
| 18 | | | 100 | | 55700 | 3.8 | 44 | 34 | 3740 | |
| 15% LDPE 662i w/ 1 MI, 0.877 g/cc Sample A | | | | | NM | NM | 14 | 227 | 6 | 85 |
| 30% LDPE 662i w/ 1 MI 0.877 g/cc Sample A | | | | | NM | NM | 29 | 106 | 9 | 88 |
| ENX896800 Control | | | | | NM | NM | 7.4 | 88 | 95 | |
| ENX892100 Control | | | | | NM | NM | 4.6 | 107 | 34 | |

Figure 16:
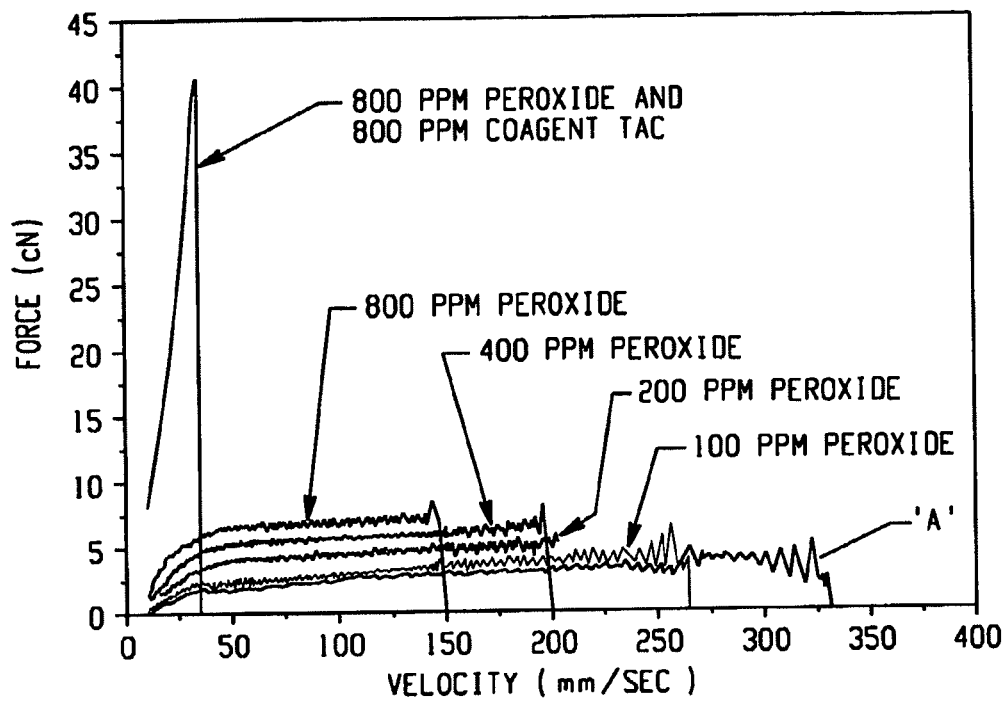
FIG. 16 is a graph showing the melt strength modification of a multi-block interpolymer functionalized with various amounts of peroxide.

*use silicon oil to disperse the BSA molecular melt 2 lb each
RMS, Melt Strength, Low Shear Viscosity (Creep) and Low Extensional Viscosity
I2 and I10, GPC, Compression set on selected samples
AO analysis on selected sample FIG. 16 shows the melt strength modification of polymer 'A' with peroxide. It can be seen that the melt strength increases with increasing amount of peroxide in comparison to the melt strength of the untreated polymer 'A', e.g., the melt strength at 800 ppm of peroxide was ca. 2 times that of the untreated polymer 'A'. Furthermore, when co-agent was added with the peroxide the melt strength enhancement was ca. 12-15 times that of the untreated polymer 'A'.

Figure 17:
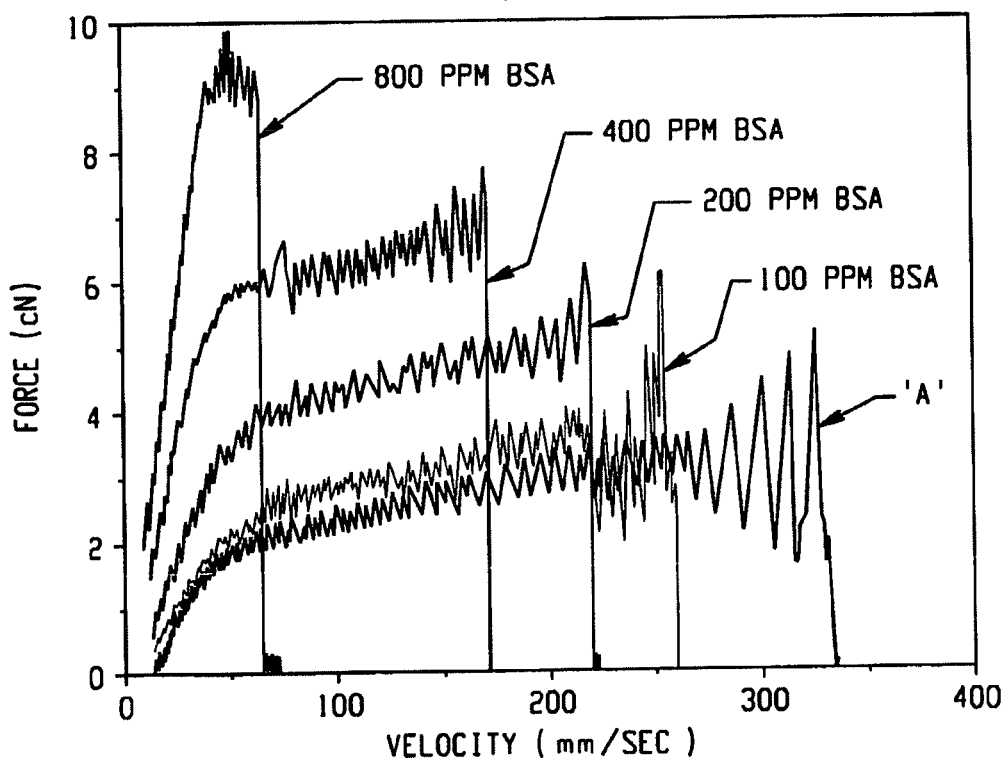
FIG. 17 is a graph showing the melt strength modification of a multi-block interpolymer functionalized with various amounts of (bis) sulfonyl azide.

FIG. 17 shows the melt strength modification of polymer 'A' with BSA. It can be seen that the melt strength increases with increasing amount of BSA in comparison to the melt strength of the untreated polymer 'A', e.g., the melt strength at 800 ppm of BSA was ca. 3 times that of the untreated polymer 'A'. Recall that at this same level of modification, the peroxide treatment resulted in only ca. 2 times enhancement of the melt strength of the untreated polymer 'A', thereby indicating that BSA was more effective in melt strength enhancement than peroxide at this level of modification.

Figure 18:
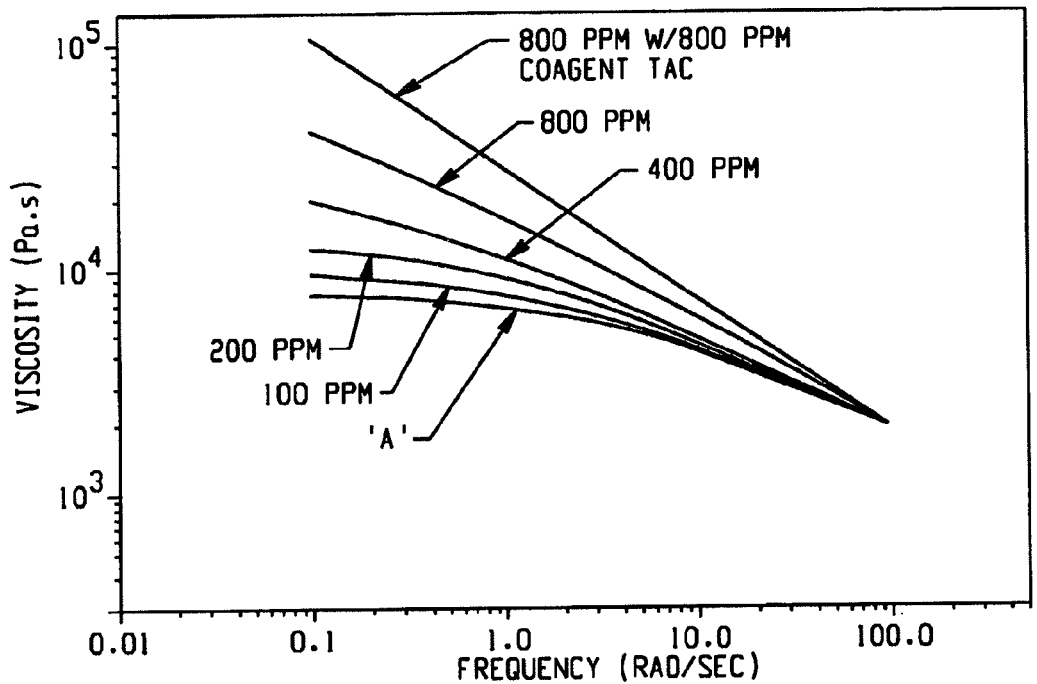
FIG. 18 is a graph showing the melt shear rheology (viscosity versus frequency) of a multi-block interpolymer functionalized with various amounts of peroxide.

FIG. 18 shows the melt shear rheology (viscosity versus frequency) modification of polymer 'A' with peroxide. With increasing amounts of peroxide, the zero shear viscosity and shear thinning increase. The rheology ratio, which is the ratio of viscosity at 0.1 rad/s to that at 100 rad/s, gives an estimate of shear thinning. This data is listed in the Table provided earlier where all the general properties are listed. With the addition of peroxide, the rheology ratio increases from 4 (for the untreated polymer 'A') to 23 at 800 ppm of peroxide modification. Interestingly, when 800 ppm of co-agent was added with the 800 ppm of peroxide, the rheology ratio was as high as 54. A higher rheology ratio or higher shear thinning implies higher throughput at higher shear rates.

Figure 19:
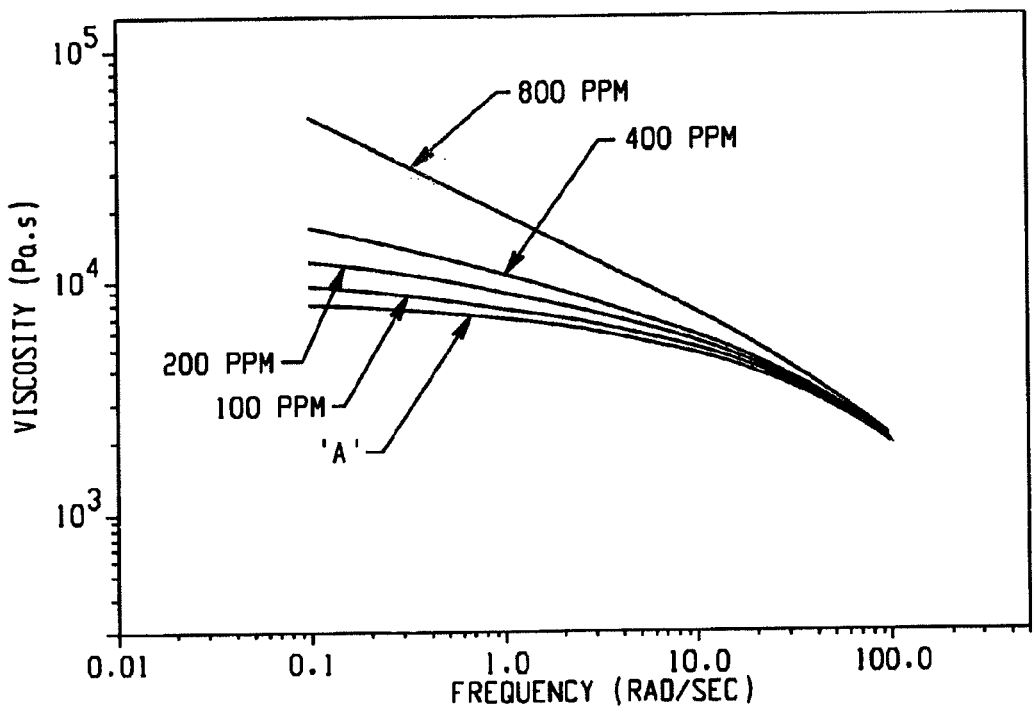
FIG. 19 is a graph showing the melt shear rheology (viscosity versus frequency) a multi-block interpolymer functionalized with various amounts of (bis) sulfonyl azide.

FIG. 19 shows the melt shear rheology (viscosity versus frequency) modification of polymer 'A' with BSA. With increasing amounts of BSA, the zero shear viscosity and shear thinning increase. With the addition of BSA, the rheology ratio increases from 4 (for the untreated polymer 'A') to 23 at 800 ppm of BSA modification.

Figure 20:
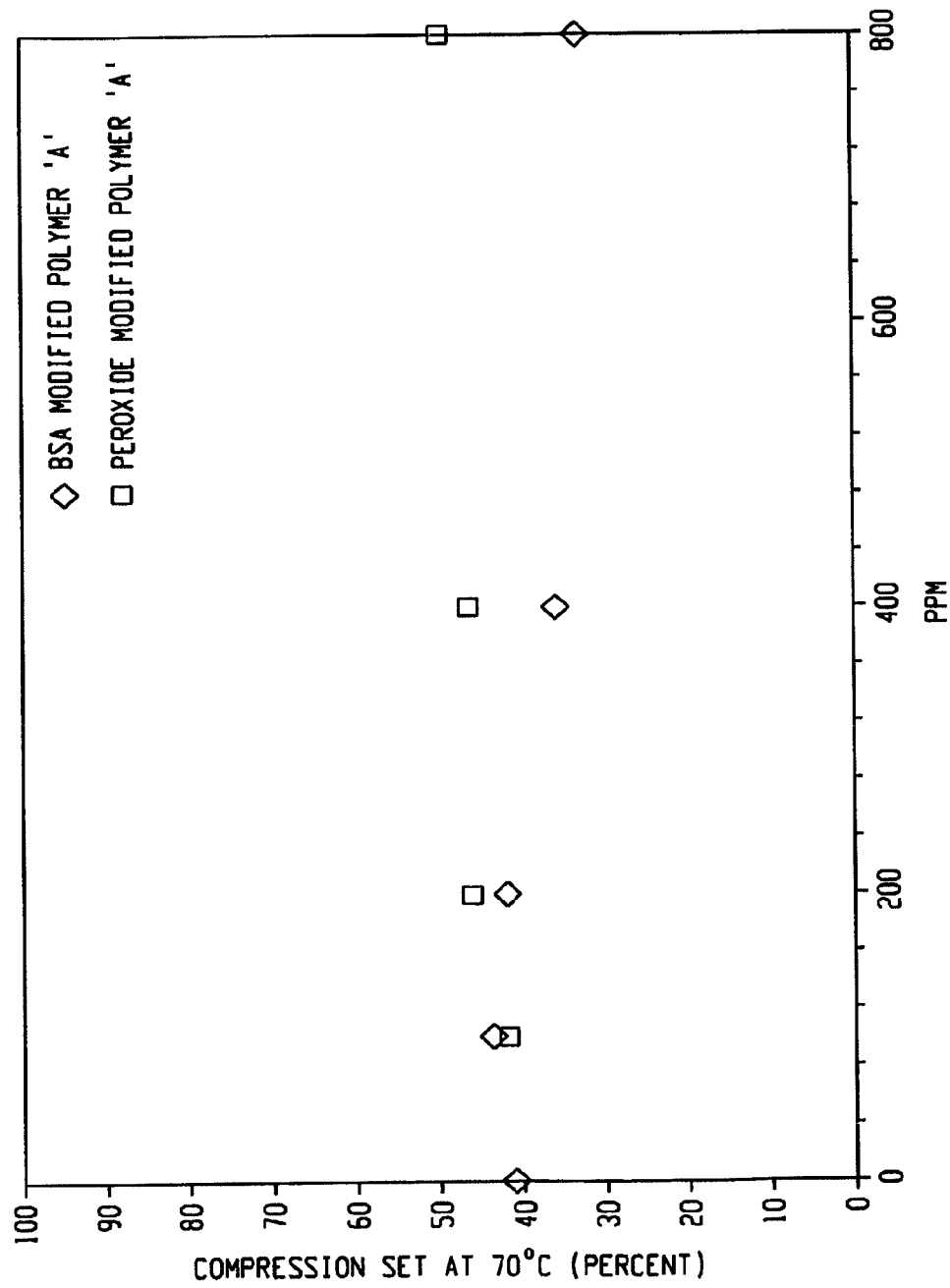
FIG. 20 is a graph showing the 70° C. compression set of a multi-block interpolymer functionalized with various amounts of (bis) sulfonyl azide and the 70° C. compression set of a multi-block interpolymer functionalized with various amounts of peroxide.

FIG. 20 shows the 70° C. compression set for the peroxide and BSA modified polymer 'A' as function of the ppm of the modifier. The compression set of the untreated polymer 'A' (also listed in the Table where all the general properties are listed) is ca. 41%. Modification with peroxide leads to a steady, but not significant, increase in the compression set, e.g., the compression set at 800 ppm of peroxide is ca. 50%. Interestingly, modification with BSA leads to lower compression set, especially at higher amounts of BSA in the formulation, e.g., at 400 and 800 ppm, the compression set was 36 and 33% respectively. Furthermore, it can be said that the modification with BSA is more effective in reducing the compression set of the untreated polymer 'A' than that by peroxide, especially at amounts equivalent or larger than 400 ppm in the formulation.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

We claim:

1. A composition comprising:
   at least one silane-grafted ethylene/α-olefin multi-block polymer, wherein the silane-grafted ethylene/α-olefin multi-block polymer is formed from an ethylene/α-olefin multi-block polymer having
   (i) a polydisperse block number distribution and a polydisperse distribution of block sizes;
   (ii) a melt viscosity less than 50,000 cP at 177° C.; and
   (iii) at least one melting point, $T_m$, in degrees Celsius, and a density, d*, in grams/cubic centimeter, and wherein the numerical values of the variables correspond to the relationship:

$$T_m > -2002.9 + 4538.5(d^*) - 2422.2(d^*)^2, \text{ and}$$

wherein ethylene/α-olefin multi-block polymer has a $M_w/M_n$ from 1.7 to 3.5.

2. The composition of claim 1, wherein the ethylene/α-olefin multi-block polymer has a number average molecular weight from 5,000 to 25,000.

3. The composition of claim 1, wherein the silane-grafted ethylene/α-olefin multi-block polymer has a density from 0.855 g/cc to 0.955 g/cc.

4. The composition of claim 1, wherein the ethylene/α-olefin multi-block polymer has a density from about 0.855 g/cc to about 0.93 g/cc.

5. The composition of claim 1 comprising greater than, or equal to, 0.05 wt % of a silane-grafted moiety based on the total weight of silane-grafted ethylene/α-olefin multi-block polymer.

6. The composition of claim 1, wherein the silane-grafted ethylene/α-olefin multi-block polymer is formed from a silane compound selected from the group consisting of vinyltrialkoxysilane, vinyltriacyloxysilane, and vinyltrichlorosilane.

7. The composition of claim 1, wherein the silane-grafted ethylene/α-olefin multi-block polymer is crosslinked.

8. The composition of claim 1, having a Peel Adhesion Failure Temperature (PAFT) of greater than, or equal to, 43° C.

9. The composition of claim 1 having a Shear Adhesion Failure Temperature (SAFT) of greater than, or equal to 60° C.

10. The composition of claim 1 comprising a second polymer.

11. A composition comprising:
    at least one silane-grafted ethylene/α-olefin multi-block polymer, wherein the silane-grafted ethylene/α-olefin multi-block polymer is formed from an ethylene/α-olefin multi-block polymer having
    (i) a polydisperse block number distribution and a polydisperse distribution of block sizes;
    (ii) a melt viscosity less than 50,000 cP at 177° C., and
    (iii) at least one melting point, $T_m$, in degrees Celsius, and a density, d*, in grams/cubic centimeter, and wherein the numerical values of the variables correspond to the relationship:

$$T_m > -2002.9 + 4538.5(d^*) - 2422.2(d^*)^2, \text{ and}$$

wherein ethylene/α-olefin multi-block polymer has a $M_w/M_n$ from 1.7 to 3.5;
    tackifier; and
    an oil.

12. The composition of claim 11 comprising a second polymer.

13. The composition of claim 12 wherein the second polymer is selected from the group consisting of polypropylene, polyethylene, ethylene-vinyl acetate, ethylene/vinyl alcohol copolymer, polystyrene, impact modified polystyrene, acrylonitrile-butadiene-styrene, styrene/butadiene block copolymer and hydrogenated derivatives thereof, thermoplastic polyurethane, polyamide, polyester, polycarbonate, engineering thermoplastic, polyvinyl alcohol, polyvinylidene chloride, polyvinyl chloride, cellulose fiber, and wool fibers.

14. The composition of claim 11 wherein the silane-grafted ethylene/α-olefin multi-block polymer is cross-linked.

15. A composition comprising:
    crosslinked silane-grafted ethylene/α-olefin multi-block interpolymer, wherein the silane-grafted ethylene/a-olefin multi-block interpolymer prior to crosslinking has a polydisperse block number distribution and a polydisperse distribution of block sizes and a $M_w/M_n$ from 1.7 to 3.5, at least one melting point, $T_m$, in degrees Celsius, and a density d*, in grams/cubic centimeter, and wherein the numerical values of the variables correspond to the relationship:

$$T_m > -2002.9 + 4538.5(d^*) - 2422.2(d^*)^2.$$

16. The composition of claim 15 wherein the silane-grafted ethylene/α-olefin multi-block polymer is formed from an olefin interpolymer having a melt viscosity less than 50,000 cP at 177° C.

17. The composition of claim 15 comprising a tackifier and an oil.

18. The composition of claim 15 comprising a second polymer.

* * * * *